US009839038B2

(12) United States Patent
Lin et al.

(10) Patent No.: US 9,839,038 B2
(45) Date of Patent: Dec. 5, 2017

(54) SYSTEM, METHOD, AND APPARATUS FOR SETTING A REGULATORY OPERATING MODE OF A DEVICE

(71) Applicant: NETWORK PERFORMANCE RESEARCH GROUP LLC, Campbell, CA (US)

(72) Inventors: Ming-Yi Lin, Hsinchu (TW); Kun Ting Tsai, Fremont, CA (US); Yung-Jui Chen, Hsinchu (TW); Peter Hong, Bellevue, WA (US)

(73) Assignee: NETWORK PERFORMANCE RESEARCH GROUP LLC, Campbell, CA (US)

( * ) Notice: Subject to any disclaimer, the term of this patent is extended or adjusted under 35 U.S.C. 154(b) by 0 days.

(21) Appl. No.: 15/428,658

(22) Filed: Feb. 9, 2017

(65) Prior Publication Data

US 2017/0156149 A1 Jun. 1, 2017

Related U.S. Application Data

(63) Continuation-in-part of application No. 15/214,437, filed on Jul. 19, 2016, now Pat. No. 9,622,089.
(Continued)

(51) Int. Cl.
*H04W 4/02* (2009.01)
*H04W 72/04* (2009.01)
(Continued)

(52) U.S. Cl.
CPC .......... *H04W 72/0453* (2013.01); *H04K 3/00* (2013.01); *H04W 4/021* (2013.01);
(Continued)

(58) Field of Classification Search
None
See application file for complete search history.

(56) References Cited

U.S. PATENT DOCUMENTS

| 5,978,669 A | 11/1999 | Sanmugam |
| 6,181,952 B1 | 1/2001 | Murata |

(Continued)

FOREIGN PATENT DOCUMENTS

| EP | 2512169 A1 | 10/2012 |
| EP | 1925108 B1 | 3/2014 |

(Continued)

OTHER PUBLICATIONS

Office Action for U.S. Appl. No. 14/920,568, dated Mar. 29, 2016, 29 pages.
(Continued)

*Primary Examiner* — Chi H Pham
*Assistant Examiner* — Shick Hom
(74) *Attorney, Agent, or Firm* — Amin, Turocy & Watson, LLP

(57) ABSTRACT

The present invention relates to wireless networks and more specifically directed to providing or acquiring an exemplary country code identifier or regulatory domain for a non-limiting device operating in a reduced functionality radio frequency (regulatory) mode based on exemplary location factors and exemplary confidence rankings. One embodiment includes an exemplary regulatory domain selection component configured to weigh location factors associated with a device, based on reliability associated with the location factors, and configured to determine an overall confidence of a country code identifier or a regulatory domain for the device. Another embodiment includes a device configured to operate in a reduced functionality radio frequency (regulatory) or world-wide compliant mode until
(Continued)

a regulatory domain can be determined through a trusted cloud service which can be configured to weigh one or more location factors or data sources to facilitate providing or acquiring an exemplary country code identifier or regulatory domain for the device.

20 Claims, 34 Drawing Sheets

Related U.S. Application Data

(60) Provisional application No. 62/259,981, filed on Nov. 25, 2015, provisional application No. 62/445,107, filed on Jan. 11, 2017.

(51) Int. Cl.
    *H04W 16/14*     (2009.01)
    *H04K 3/00*     (2006.01)
    *H04W 8/26*     (2009.01)
    *H04W 88/06*     (2009.01)

(52) U.S. Cl.
    CPC ............. *H04W 8/26* (2013.01); *H04W 16/14* (2013.01); *H04W 88/06* (2013.01)

(56) References Cited

U.S. PATENT DOCUMENTS

| | | |
|---|---|---|
| 7,548,750 B2 | 6/2009 | Kruys et al. |
| 7,606,193 B2 | 10/2009 | McFarland et al. |
| 7,813,744 B2 | 10/2010 | Johnson |
| 8,213,942 B2 | 7/2012 | Likar et al. |
| 8,239,337 B2 * | 8/2012 | Madani ............... H04W 4/02 706/45 |
| 8,260,357 B2 | 9/2012 | Likar et al. |
| 8,472,334 B2 | 6/2013 | Likar et al. |
| 8,483,059 B2 | 7/2013 | Likar et al. |
| 8,565,106 B2 | 10/2013 | Likar et al. |
| 8,654,782 B2 | 2/2014 | Meil et al. |
| 8,699,341 B2 | 4/2014 | Likar et al. |
| 8,867,490 B1 | 10/2014 | Krishna et al. |
| 8,879,996 B2 | 11/2014 | Kenney et al. |
| 8,885,511 B2 | 11/2014 | Likar et al. |
| 9,060,289 B2 | 6/2015 | Chandrasekhar et al. |
| 9,066,251 B2 | 6/2015 | Madan et al. |
| 9,131,391 B2 | 9/2015 | Madan et al. |
| 9,131,392 B2 | 9/2015 | Madan et al. |
| 9,131,504 B2 | 9/2015 | Kenney et al. |
| 9,439,197 B1 | 9/2016 | Ngo et al. |
| 2002/0116380 A1 * | 8/2002 | Chen ............... H04M 1/274566 |
| 2003/0107512 A1 | 6/2003 | McFarland et al. |
| 2003/0181213 A1 | 9/2003 | Sugar et al. |
| 2004/0033789 A1 | 2/2004 | Tsien |
| 2004/0151137 A1 | 8/2004 | McFarland et al. |
| 2004/0156336 A1 | 8/2004 | McFarland et al. |
| 2004/0242188 A1 * | 12/2004 | Uchida ............... H04M 3/4874 455/403 |
| 2005/0059364 A1 | 3/2005 | Hansen et al. |
| 2005/0192016 A1 | 9/2005 | Zimmermann et al. |
| 2005/0215266 A1 | 9/2005 | Tsien et al. |
| 2005/0272435 A1 | 12/2005 | Tsien et al. |
| 2006/0082489 A1 | 4/2006 | Liu et al. |
| 2007/0060065 A1 | 3/2007 | Kruys et al. |
| 2008/0016556 A1 | 1/2008 | Selignan |
| 2008/0089280 A1 | 4/2008 | Hu |
| 2009/0077620 A1 | 3/2009 | Ravi et al. |
| 2009/0116411 A1 | 5/2009 | Castagnoli et al. |
| 2009/0160696 A1 | 6/2009 | Pare et al. |
| 2009/0201851 A1 | 8/2009 | Kruys et al. |
| 2010/0061289 A1 | 3/2010 | Mun et al. |
| 2010/0216480 A1 | 8/2010 | Park et al. |
| 2010/0271948 A1 | 10/2010 | Challapali et al. |
| 2010/0302966 A1 | 12/2010 | Matsuura |
| 2012/0258749 A1 | 10/2012 | Lenzini et al. |
| 2012/0300759 A1 | 11/2012 | Patanapongpibul et al. |
| 2013/0072106 A1 | 3/2013 | Koskela et al. |
| 2013/0201928 A1 | 8/2013 | Kim et al. |
| 2013/0252640 A1 | 9/2013 | Kenney et al. |
| 2013/0314267 A1 | 11/2013 | Kenney et al. |
| 2014/0171060 A1 | 6/2014 | Cook et al. |
| 2014/0253361 A1 | 9/2014 | Rezk et al. |
| 2014/0301328 A1 | 10/2014 | Yacovitch |
| 2014/0328286 A1 | 11/2014 | Crowle et al. |
| 2014/0349669 A1 | 11/2014 | Qi et al. |
| 2014/0362782 A1 | 12/2014 | Yuk et al. |
| 2015/0023271 A1 | 1/2015 | Nakano |
| 2015/0063321 A1 | 3/2015 | Sadek et al. |
| 2015/0189528 A1 | 7/2015 | Carbajal |
| 2015/0208330 A1 | 7/2015 | Park et al. |
| 2015/0271829 A1 | 9/2015 | Amini et al. |
| 2016/0014613 A1 | 1/2016 | Ponnampalam et al. |
| 2016/0044673 A1 | 2/2016 | Liu et al. |
| 2016/0157168 A1 * | 6/2016 | Xue ............... H04W 48/18 370/329 |
| 2016/0261657 A1 | 9/2016 | Bruhn et al. |
| 2016/0345323 A1 | 11/2016 | Krishnamoorthy et al. |
| 2017/0026845 A1 | 1/2017 | Garg et al. |
| 2017/0041949 A1 | 2/2017 | Ngo et al. |
| 2017/0041954 A1 | 2/2017 | Tsai et al. |
| 2017/0079007 A1 | 3/2017 | Carbajal |

FOREIGN PATENT DOCUMENTS

| | | |
|---|---|---|
| EP | 3128779 A1 | 2/2017 |
| WO | 2007032790 A2 | 3/2007 |
| WO | 2007032790 A3 | 4/2009 |
| WO | 20140176503 A1 | 10/2014 |
| WO | 2014190004 A1 | 11/2014 |

OTHER PUBLICATIONS

Office Action for U.S. Appl. No. 15/085,573, dated Jun. 24, 2016, 15 pages.
Notice of Allowance dated Jul. 19, 2016 for U.S. Appl. No. 15/085,573, 27 pages.
Office Action for U.S. Appl. No. 14/920,568, dated Sep. 30, 2016, 28 pages.
Extended European Search Report for EP Patent Application Serial No. 16182672.2, dated Dec. 16, 2016, 8 pages.
Office Action for U.S. Appl. No. 15/214,437 dated Jan. 23, 2017, 33 pages.
Extended European Search Report for EP Patent Application Serial No. 16187611.5, dated Jan. 30, 2017, 8 pages.
Office Action for U.S. Appl. No. 15/259,386, dated Jan. 9, 2017, 37 Pages.
Kerry et al., "Liaison Statement on the Compatibility Between IEEE 802.11a and Radars in the Radiolocation and Radionavigation Service in the 5250-5350 MHz and 5470-5725 MHz bands", Jan. 2001, IEEE, 6 pages.
Office Action for U.S. Appl. No. 14/920,568, dated Jan. 20, 2017, 26 pages.
Extended European Search Report for EP Patent Application Serial No. 16182722.5, dated Dec. 15, 2016, 11 pages.
Office Action for U.S. Appl. No. 15/171,911, dated Feb. 28, 2017, 34 Pages.
Office Action for U.S. Appl. No. 15/263,985, dated Mar. 7, 2017, 33 Pages.
Notice of Allowance dated Apr. 12, 2017 for U.S. Appl. No. 15/171,911, 30 pages.
European Office Action dated Feb. 13, 2017 for European Application Serial No. 16182722.5, 2 pages.
Office Action for U.S. Appl. No. 15/454,805 dated May 11, 2017, 22 pages.
Office Action for U.S. Appl. No. 15/416,568. dated May 18, 2017, 39 pages.
Extended European Search Report for EP Patent Application 16200660.5, dated May 8, 2017, 6 pages.

(56) References Cited

OTHER PUBLICATIONS

Office Action for U.S. Appl. No. 14/920,568 dated Jun. 16, 2017, 51 pages.
Office Action for U.S. Appl. No. 15/225,966 dated Jul. 7, 2017, 37 pages.
Office Action for U.S. Appl. No. 15/259,386 dated Jul. 6, 2017, 43 pages.
Office Action for U.S. Appl. No. 15/588,474 dated Jul. 11, 2017, 21 pages.
Office Action for U.S. Appl. No. 15/483,406, dated Aug. 4, 2017, 29 pages.
European Search Report for European Application Serial No. 17163289.6 dated Jul. 12, 2017, 11 pages.
Holma, et al., "LTE for UMTS. Evolution to LTE-advanced, " Mar. 4, 2011, pp. 26-29, XP055386245.
Office Action for U.S. Appl. No. 15/450,940, dated Aug. 10, 2017, 28 pages.

* cited by examiner

SYSTEM, METHOD, AND APPARATUS FOR SETTING A REGULATORY OPERATING MODE OF A DEVICE

CROSS-REFERENCE TO RELATED APPLICATIONS

This application is a continuation in part application and claims priority to U.S. Pat. No. 9,622,089, titled "CLOUD DFS SUPER MASTER SYSTEMS AND METHODS" and filed on Jul. 19, 2016, which claims priority to U.S. Provisional Patent Application No. 62/259,981, titled CLOUD DFS SUPER MASTER SYSTEMS AND METHODS and filed on Nov. 25, 2015, and this application is a non-provisional application of U.S. Provisional Patent Application No. 62/445,107, titled "SYSTEM, METHOD, AND APPARATUS FOR SETTING A REGULATORY OPERATING MODE OF A DEVICE" and filed on Jan. 11, 2017, the entireties of which applications are hereby incorporated by reference.

BACKGROUND

The present invention relates to wireless networks and more specifically to systems and methods for selecting available channels free of occupying signals from a plurality of radio frequency channels. Embodiments of the present invention provide methods and systems for exploiting licensed and unlicensed bands requiring radar detection and detection of other occupying signals, such as the Dynamic Frequency Selection (DFS) channels in the Unlicensed National Information Infrastructure (U-NII) bands, to enable additional bandwidth for 802.11 a/n/ac and LTE in unlicensed spectrum (LTE-U) networks by using a cloud DFS super master.

Wi-Fi networks are crucial to today's portable modern life. Wi-Fi is the preferred network in the growing Internet-of-Things (IoT). But, the technology behind current Wi-Fi has changed little in the last ten years. The Wi-Fi network and the associated unlicensed spectrum are currently managed in inefficient ways. For example, there is little or no coordination between individual networks and equipment from different manufacturers. Such networks generally employ primitive control algorithms that assume the network consists of "self-managed islands," a concept originally intended for low density and low traffic environments. The situation is far worse for home networks, which are assembled in completely chaotic ad hoc ways. Further, with more and more connected devices becoming commonplace, the net result is growing congestion and slowed networks with unreliable connections.

Similarly, LTE-U networks operating in the same or similar unlicensed bands as 802.11 a/n/ac Wi-Fi suffer similar congestion and unreliable connection issues and will often create congestion problems for existing Wi-Fi networks sharing the same channels. Additional bandwidth and better and more efficient utilization of spectrum is key to sustaining the usefulness of wireless networks including the Wi-Fi and LTE-U networks in a fast growing connected world.

Devices operating in certain parts of the 5 GHz U-NII-2 band, known as the DFS bands or the DFS channels, require active radar detection. This function is assigned to a device capable of detecting radar known as a DFS master, which is typically an access point or router. The DFS master actively scans the DFS channels and performs a channel availability check (CAC) and periodic in-service monitoring (ISM) after the channel availability check. The channel availability check lasts 60 seconds as required by the Federal Communications Commission (FCC) Part 15 Subpart E and ETSI 301 893 standards. The DFS master signals to the other devices in the network (typically client devices) by transmitting a DFS beacon indicating that the channel is clear of radar. Although the access point can detect radar, wireless clients typically cannot. Because of this, wireless clients must first passively scan DFS channels to detect whether a beacon is present on that particular channel. During a passive scan, the client device switches through channels and listens for a beacon transmitted at regular intervals by the access point on an available channel.

Once a beacon is detected, the client is allowed to transmit on that channel. If the DFS master detects radar in that channel, the DFS master no longer transmits the beacon, and all client devices upon not sensing the beacon within a prescribed time must vacate the channel immediately and remain off that channel for 30 minutes. For clients associated with the DFS master network, additional information in the beacons (i.e. the channel switch announcement) can trigger a rapid and controlled evacuation of the channel. Normally, a DFS master device is an access point with only one radio and is able to provide DFS master services for just a single channel. Significant problems of the current approach include: (1) hidden nodes; (2) hidden radar; (3) false radar detections; (4) long delays in DFS channel switching at radar detection or false radar detection; (5) failure to support geo-fencing of areas of radar use based on external data; (6) underutilization of the DFS spectrum due to the dominance of private access points in the DFS spectrum; (7) interference between proximate LTE-U and Wi-Fi devices; and (8) lack of spectrum-use coordination between devices. The present systems and methods using a cloud DFS super master address these issues with prior art systems.

SUMMARY

The present invention relates to wireless networks and more specifically to systems and methods for selecting available channels free of occupying signals from a plurality of radio frequency channels. The present invention employs a cloud DFS super master to access additional bandwidth for wireless networks, such as IEEE 802.11 a/n/ac and LTE-U networks. The additional bandwidth is derived from channels that require avoidance of channels with occupying signals. For example, additional bandwidth is derived from special compliance channels that require radar detection, such as the DFS channels of the U-NII-2 bands, by employing multi-channel radar detection and in-service monitoring, and active channel selection controls.

In one embodiment of the cloud DFS super master system, the cloud DFS super master is communicatively coupled to a plurality of sensors that detect radar signals in the DFS band and detect wireless traffic information. The plurality of sensors may be in agility agents or may be standalone sensors. The sensors transmit information about detected radar signals, traffic information, and geo-location information from the sensor to the cloud DFS super master. The client devices then connect to the cloud DFS super master to request authorized DFS channels according to the location of the client devices. The client devices transmit geo-location information to the cloud DFS super master so that the cloud DFS super master can determine the appropriate channels based on that location information.

Additionally, a cloud DFS super master may a cloud-based computation and control element, which together with a wireless agility agent forms a split-intelligence architecture. In this architecture, the embedded sensor information from the agility agent—such as radar detection channel availability check and in-service monitoring together with measurements of interference, traffic, identification of neighboring devices, and other spectrum and location information—is location-tagged, time-stamped and communicated to and integrated over time within the cloud intelligence engine. Also the embedded sensor information from the agility agent may be fused with spectrum information from other agility agents distributed in space, filtered, and post-processed. The embedded sensor information from the agility agent may further be merged with other data from other sources to provide improvements to fundamental signal measurement and network reliability problems such as augmented radar sensitivity, reduced false-detect rates, and reliable discovery of hidden nodes. Further, the cloud-based computation and control element, together with wireless agility agents attached to a plurality of host access devices (e.g., a plurality of Wi-Fi routers or a plurality of LTE-U small cell base stations), may enable the host access devices to coordinate network configurations with same networks (e.g., Wi-Fi to Wi-Fi) and/or across different networks (e.g., Wi-Fi to LTE-U).

In further non-limiting embodiments, exemplary systems, methods, and apparatuses are provided that can facilitate providing or acquiring an exemplary country code identifier or regulatory domain for an exemplary device. In a non-limiting example, an exemplary device can comprise a radio configurable to operate in a reduced functionality radio frequency mode until a country code identifier or a regulatory domain can be determined for the device, a regulatory domain database comprising a set of radio parameters associated with the country code identifier or the regulatory domain for the device, wherein the set of radio parameters defines the regulatory mode of operation for the device consistent with the country code identifier or the regulatory domain, and a control agent configured to acquire the country code identifier or the regulatory domain and further configured to select the set of radio parameters associated with the country code identifier or the regulatory domain for the device to configure the radio in the regulatory mode. In a non-limiting aspect, the radio can be further configurable to communicate, scan, or operate in the regulatory mode associated with one or more Dynamic Frequency Selection (DFS) channels based on the country code identifier or the regulatory domain.

In another non-limiting example, an exemplary system can comprise a regulatory domain selection component configured to implement a regulatory domain selection algorithm using two or more data sources, comprising two or more of a logistics database, shipping manifest information, a unique device identifier, an Internet protocol (IP) address lookup service, a wireless fidelity (WiFi) positioning lookup service, a WiFi network scan, a location record, or information associated with a global positioning system (GPS), and a device configured to communicate securely with the regulatory domain selection component to facilitate providing or acquiring at least one of a country code identifier or a regulatory domain for the device based on the two or more data sources. In a non-limiting aspect, the device can be further configured to operate in a reduced functionality mode until the country code identifier or the regulatory domain can be determined by the regulatory domain selection component.

Other non-limiting examples provide exemplary methods, systems, and devices directed to providing or acquiring an exemplary country code identifier or regulatory domain for an exemplary device configured to operate in a reduced functionality mode until the country code identifier or the regulatory domain can be determined by the regulatory domain selection component.

Other embodiments and various examples, scenarios and implementations are described in more detail below. The following description and the drawings set forth certain illustrative embodiments of the specification. These embodiments are indicative, however, of but a few of the various ways in which the principles of the specification may be employed. Other advantages and novel features of the embodiments described will become apparent from the following detailed description of the specification when considered in conjunction with the drawings.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which.

DETAILED DESCRIPTION

The present invention relates to wireless networks and more specifically to systems and methods for selecting available channels free of occupying signals from a plurality of radio frequency channels. As used herein, a channel "free" of occupying signals may include a channel with occupying signals that are lower than a signal threshold including signal strength, quantity, or traffic. The present invention employs a cloud DFS super master to access additional bandwidth for wireless networks, such as IEEE 802.11 a/n/ac and LTE-U networks. The additional bandwidth is derived from channels that require avoidance of channels with occupying signals. For example, additional bandwidth is derived from special compliance channels that require radar detection, such as the DFS channels of the U-NII-2 bands, by employing multi-channel radar detection and in-service monitoring, and active channel selection controls.

Figure 1:
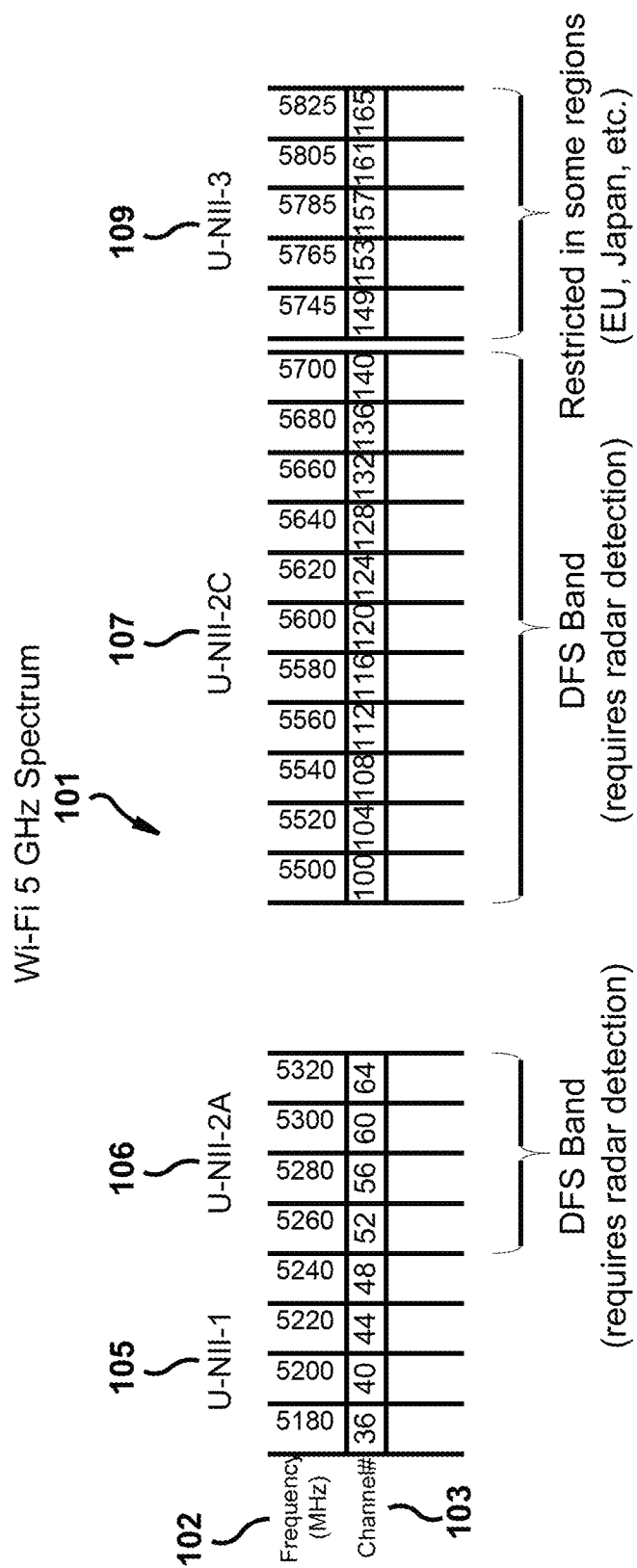
FIG. 1 illustrates portions of the 5 GHz Wi-Fi spectrum including portions that require active monitoring for radar signals.

FIG. 1 illustrates portions of the 5 GHz Wi-Fi spectrum 101. FIG. 1 shows the frequencies 102 and channels 103 that make up portions of the 5 GHz Wi-Fi spectrum 101. A U-NII band is a FCC regulatory domain for 5-GHz wireless devices and is part of the radio frequency spectrum used by IEEE 802.11 a/n/ac devices and by many wireless ISPs. It operates over four ranges. The U-NII-1 band 105 covers the 5.15-5.25 GHz range. The U-NII-2A band 106 covers the 5.25-5.35 GHz range. The U-NII-2A band 106 is subject to DFS radar detection and avoidance requirements. The U-NII-2C band 107 covers the 5.47-5.725 GHz range. The U-NII-2C band 107 is also subject to DFS radar detection and avoidance requirements. The U-NII-3 band 109 covers the 5.725 to 5.850 GHz range. Use of the U-NII-3 band 109 is restricted in some jurisdictions like the European Union and Japan.

When used in an 802.11 a/n/ac or LTE-U wireless network, the agility agent may function as an autonomous DFS master device. In contrast to conventional DFS master devices, the agility agent is not an access point or router, but rather is a standalone wireless device employing inventive scanning techniques described herein that provide DFS scan capabilities across multiple channels, enabling one or more access point devices and peer-to-peer client devices to exploit simultaneous multiple DFS channels. The standalone autonomous DFS master may be incorporated into another device such as an access point, LTE-U host, base station, cell, or small cell, media or content streamer, speaker, television, mobile phone, mobile router, software access point device, or peer to peer device but does not itself provide network access to client devices. In particular, in the event of a radar event, the enabled access point and clients or wireless device are able to move automatically, predictively and very quickly to another DFS channel.

Figure 2:
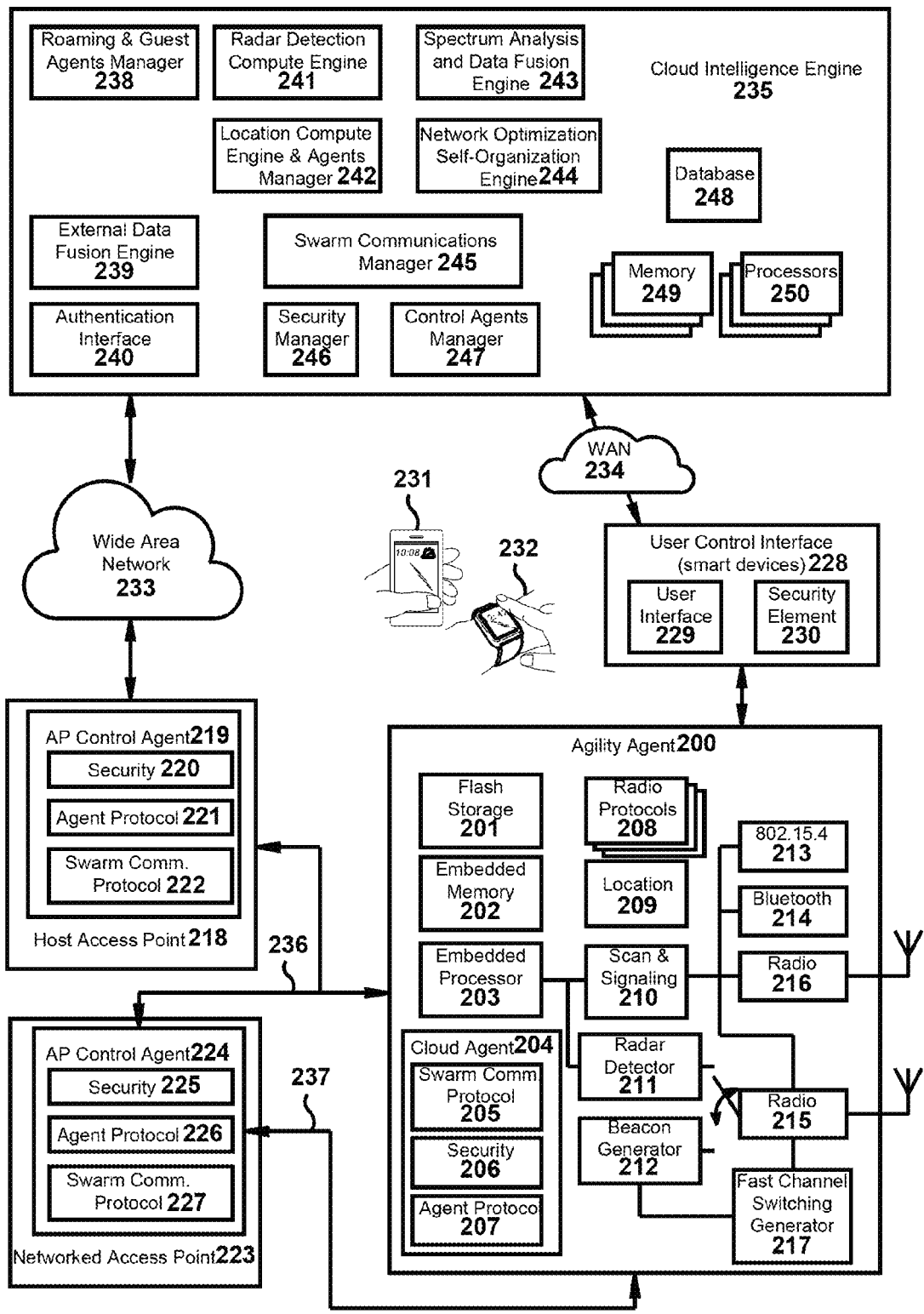
FIG. 2 illustrates how an exemplary cloud-based intelligence engine or cloud DFS super master may interface with a conventional host access point, an agility agent (an autonomous DFS master or radar detector), and client devices in accordance with the present invention.

FIG. 2 provides a detailed illustration of an exemplary system of the present invention. As illustrated in FIG. 2, the agility agent 200 may control at least one access point or LTE-U small cell base station to dictate channel (e.g., a communication channel associated with the 5 GHz Wi-Fi spectrum 101, a communication channel associated with a 5.9 GHz spectrum, a communication channel associated with a 3.5 GHz spectrum, etc.) selection primarily by (a) signaling availability of one or more DFS channels by simultaneous transmission of one or more beacon signals; (b) transmitting a listing of both the authorized available DFS channels, herein referred to as a whitelist, and the prohibited DFS channels in which a potential radar signal has been detected, herein referred to as a blacklist, along with control signals and a time-stamp signal, herein referred to as a dead-man switch timer via an associated non-DFS channel; (c) transmitting the same signals as (b) over a wired medium such as Ethernet or serial cable; and (d) receiving control, coordination and authorized and preferred channel selection guidance information from the cloud intelligence engine 235. It is to be appreciated that the cloud intelligence engine 235 can be a set of cloud intelligence devices associated with cloud-based distributed computational resources. For example, the cloud intelligence engine 235 can be associated with multiple devices, multiple servers, multiple machines and/or multiple clusters. As discussed in more detail below, in some embodiments the cloud intelligence engine 235 acts as a cloud DFS super master for connected client devices. The agility agent 200 sends the time-stamp signal, or dead-man switch timer, with communications to ensure that the access points 218, 223 do not use the information, including the whitelist, beyond the useful lifetime of the information. For example, a whitelist will only be valid for a certain period of time. The time-stamp signal avoids using noncompliant DFS channels by ensuring that an access point will not use the whitelist beyond its useful lifetime. The system allows currently available access points without radar detection—which cannot operate in the DFS channels—to operate in the DFS channels by providing the radar detection required by the FCC or other regulatory agencies. In an embodiment, the agility agent 200 may send a status signal (e.g., a heartbeat signal) to the access point control agent 219 to indicate a current status and/or a current state of the agility agent 200. The status signal provided by the agility agent 200 may act as a dead-man switch (e.g., in response to a local failure). Therefore, the access point control agent 219 can safely operate on non-DFS channels. In certain implementations, authorized available DFS channels can be associated with a set of enforcement actions that are time limited (e.g., authorized DFS channels for a certain geographic region can become unavailable for a few hours, etc.).

The host access point 218 and any other access point devices 223 under control of the autonomous DFS master 200 typically have the control agent portion 219, 224 installed within their communication stack. For example, the host access point 218 may have an access point control agent portion 219, 224 installed within a communication stack of the host access point 218. Furthermore, the network access point 223 may also have an access point control agent portion 219, 224 installed within a communication stack of the network access point 223. The control agent 219, 224 is an agent that acts under the direction of the agility agent 200 to receive information and commands from the agility agent 200. The control agent 219, 224 acts on information from the agility agent 200. For example, the control agent 219, 224 listens for information like a whitelist or blacklist from the agility agent. If a radar signal is detected by the agility agent 200, the agility agent 200 communicates that to the control agent 219, 224, and the control agent 219, 224 acts to evacuate the channel immediately. The control agent can also take commands from the agility agent 200. For example, the host access point 218 and network access point 223 can offload DFS monitoring to the agility agent 200 as long as they can listen to the agility agent 200 and take commands from the agility agent regarding available DFS channels.

The host access point 218 is connected to a wide area network 233 and includes an access point control agent 219 to facilitate communications with the agility agent 200. The access point control agent 219 includes a security module 220 and agent protocols 221 to facilitate communication with the agility agent 200, and swarm communication protocols 222 to facilitate communications between agility agents, access points, client devices, and other devices in the network. The agility agent 200 connects to the cloud intelligence engine 235 via the host access point 218 and the wide area network 233. The access point may set up a secure communications tunnel to communicate with the cloud intelligence engine 235 through, for example, an encrypted control channel associated with the host access point 218 and/or an encrypted control API in the host access point 218.

The agility agent 200 transmits information to the cloud intelligence engine 235 such as whitelists, blacklists, state information, location information, time signals, scan lists (for example, showing neighboring access points), congestion (for example, number and type of re-try packets), and traffic information. The cloud intelligence engine 235 communicates information to the agility agent 200 via the secure communications tunnel such as access point location (including neighboring access points), access point/cluster current state and history, statistics (including traffic, congestion, and throughput), whitelists, blacklists, authentication information, associated client information, and regional and regulatory information. The agility agent 200 uses the information from the cloud intelligence engine 235 to control the access points and other network devices.

The agility agent 200 may communicate via wired connections or wirelessly with the other network components. In the illustrated example, the agility agent 200 includes a primary radio 215 and a secondary radio 216. The primary radio 215 is for DFS and radar detection and is typically a 5 GHz radio. The agility agent 200 may receive radar signals, traffic information, and/or congestion information through the primary radio 215. And the agility agent 200 may transmit information such as DFS beacons via the primary radio 215. The second radio 216 is a secondary radio for sending control signals to other devices in the network and is typically a 2.4 GHz radio. The agility agent 200 may receive information such as network traffic, congestion, and/or control signals with the secondary radio 216. And the agility agent 200 may transmit information such as control signals with the secondary radio 216. The primary radio 215 is connected to a fast channel switching generator 217 that includes a switch and allows the primary radio 215 to switch rapidly between a radar detector 211 and beacon generator 212. The channel switching generator 217 allows the radar detector 211 to switch sufficiently fast to appear to be on multiple channels at a time. In certain implementations, the agility agent 200 may also include coordination 253. The coordination 253 may provide cross-network coordination between the agility agent 200 and another agility agent (e.g., agility agent(s) 251). For example, the coordination 253 may provide coordination information (e.g., precision location, precision position, channel allocation, a time-slice duty cycle request, traffic loading, etc.) between the agility agent 200 and another agility agent (e.g., agility agent(s) 251) on a different network. In one example, the coordination 253 may enable an agility agent (e.g., agility agent 200) attached to a Wi-Fi router to coordinate with a nearby agility (e.g., agility agent(s) 251) attached to a LTE-U small cell base station.

A standalone multi-channel DFS master may include a beacon generator 212 to generate a beacon in each of a plurality of radio channels (e.g., a plurality of 5 GHz communication channels, a plurality of 5.9 GHz communication channels, a plurality of 3.5 GHz communication channels, etc., for simplicity the following examples use 5 GHz), a radar detector 211 to scan for a radar signal in each of the plurality of 5 GHz radio channels, a 5 GHz radio transceiver 215 to transmit the beacon in each of the plurality of 5 GHz radio channels and to receive the radar signal in each of the plurality of 5 GHz radio channels, and a fast channel switching generator 217 coupled to the radar detector, the beacon generator, and the 5 GHz radio transceiver. The fast channel switching generator 217 switches the 5 GHz radio to a first channel of the plurality of 5 GHz radio channels and then causes the beacon generator 212 to generate the beacon in the first channel of the plurality of 5 GHz radio channels. Then the fast channel switching generator 217 causes the radar detector 211 to scan for the radar signal in the first channel of the plurality of 5 GHz radio channels. The fast channel switching generator 217 then repeats these steps for each other channel of the plurality of 5 GHz radio channels during a beacon transmission duty cycle and, in some examples, during a radar detection duty cycle. The beacon transmission duty cycle is the time between successive beacon transmissions on a given channel and the radar detection duty cycle which is the time between successive scans on a given channel. Because the agility agent 200 cycles between beaconing and scanning in each of the plurality of 5 GHz radio channels in the time window between a first beaconing and scanning in a given channel and a subsequent beaconing and scanning the same channel, it can provide effectively simultaneous beaconing and scanning for multiple channels.

The agility agent 200 also may contain a Bluetooth radio 214 and an 802.15.4 radio 213 for communicating with other devices in the network. The agility agent 200 may include various radio protocols 208 to facilitate communication via the included radio devices.

The agility agent 200 may also include a location module 209 to geo-locate or otherwise determine the location of the agility agent 200. Information provided by the location module 209 may be employed to location-tag and/or time-stamp spectral information collected and/or generated by the agility agent 200. As shown in FIG. 2, the agility agent 200 may include a scan and signaling module 210. The agility agent 200 includes embedded memory 202, including for example flash storage 201, and an embedded processor 203. The cloud agent 204 in the agility agent 200 facilitates aggregation of information from the cloud agent 204 through the cloud and includes swarm communication protocols 205 to facilitate communications between agility agents, access points, client devices, and other devices in the network. The cloud agent 204 also includes a security module 206 to protect and secure the agility agent's 200 cloud communications as well as agent protocols 207 to facilitate communication with the access point control agents 219, 224.

As shown in FIG. 2, the agility agent 200 may control other access points, for example networked access point 223, in addition to the host access point 218. The agility agent 200 may communicate with the other access points 223 via a wired or wireless connection 236, 237. In one example, the agility agent 200 may communicate with the other access points 223 via a local area network. The other access points 223 include an access point control agent 224 to facilitate communication with the agility agent 200 and other access points. The access point control agent 224 includes a security module 225, agent protocols 226 and swarm communication protocols 227 to facilitate communications with other agents (including other access points and client devices) on the network.

The cloud intelligence engine 235 includes a database 248 and memory 249 for storing information from the agility agent 200, other agility agents (not shown) connected to the intelligence engine 235, and external data sources. The database 248 and memory 249 allow the cloud intelligence engine 235 to store information over months and years received from agility agents and external data sources. The data source(s) 252 may be associated with a set of databases. Furthermore, the data source(s) 252 may include regulatory information (e.g., non-spectral information) such as, but not limited to, geographical information system (GIS) information, other geographical information, FCC information regarding the location of radar transmitters, FCC blacklist information, National Oceanic and Atmospheric Administration (NOAA) databases, Department of Defense (DoD) information regarding radar transmitters, DoD requests to avoid transmission in DFS channels for a given location, and/or other regulatory information.

The cloud intelligence engine 235 also includes processors 250 to perform the cloud intelligence operations described herein. The roaming and guest agents manager 238 in the cloud intelligence engine 235 provides optimized connection information for devices connected to agility agents that are roaming from one access point to other or from one access point to another network. The roaming and guest agents manager 238 also manages guest connections to networks for agility agents connected to the cloud intelligence engine 235. The external data fusion engine 239 provides for integration and fusion of information from agility agents with information from external data sources for example GIS information, other geographical information, FCC information regarding the location of radar transmitters, FCC blacklist information, NOAA databases, DoD information regarding radar transmitters, and DoD requests to avoid transmission in DFS channels for a given location. The cloud intelligence engine 235 further includes an authentication interface 240 for authentication of received communications and for authenticating devices and users. The radar detection compute engine 241 aggregates radar information from agility agents and external data sources and computes the location of radar transmitters from those data to, among other things, facilitate identification of false positive radar detections or hidden nodes and hidden radar. The radar detection compute engine 241 may also guide or steer multiple agility agents to dynamically adapt detection parameters and/or methods to further improve detection sensitivity. The location compute and agents manager 242 determines the location the agility agent 200 and other connected devices through Wi-Fi lookup in a Wi-Fi location database, querying passing devices, triangulation based on received signal strength indication (RSSI), triangulation based on packet time-of-flight, scan lists from agility agents, or geometric inference.

The spectrum analysis and data fusion engine 243 and the network optimization self-organization engine 244 facilitate dynamic spectrum optimization with information from the agility agents and external data sources. Each of the agility agents connected to the cloud intelligence engine 235 have scanned and analyzed the local spectrum and communicated that information to the cloud intelligence engine 235. The cloud intelligence engine 235 also knows the location of each agility agent and the access points proximate to the agility agents that do not have a controlling agent as well as the channel on which each of those devices is operating. With this information, the spectrum analysis and data fusion engine 243 and the network optimization self-organization engine 244 can optimize the local spectrum by telling agility agents to avoid channels subject to interference. The swarm communications manager 245 manages communications between agility agents, access points, client devices, and other devices in the network. The cloud intelligence engine includes a security manager 246. The control agents manager 247 manages all connected control agents. In an implementation, the cloud intelligence engine 235 may enable the host access point 218 to coordinate network configurations with same networks (e.g., Wi-Fi to Wi-Fi) and/or across different networks (e.g., Wi-Fi to LTE-U). Furthermore, the cloud intelligence engine 235 may enable agility agents (e.g., agility agent 200 and agility agent(s) 251) connected to different host access devices to communicate within a same network (e.g., Wi-Fi to Wi-Fi) and/or across a different network (e.g., Wi-Fi to LTE-U).

Independent of a host access point 218, the agility agent 200, in the role of an autonomous DFS master device, may also provide the channel indication and channel selection control to one or more peer-to-peer client devices 231, 232 within the coverage area by (a) signaling availability of one or more DFS channels by simultaneous transmission of one or more beacon signals; (b) transmitting a listing of both the authorized available DFS channels, herein referred to as a whitelist and the prohibited DFS channels in which a potential radar signal has been detected, herein referred to as a blacklist along with control signals and a time-stamp signal, herein referred to as a dead-man switch timer via an associated non-DFS channel; and (c) receiving control, coordination and authorized and preferred channel selection guidance information from the cloud intelligence engine 235. The agility agent 200 sends the time-stamp signal, or dead-man switch timer, with communications to ensure that the devices do not use the information, including the whitelist, beyond the useful lifetime of the information. For example, a whitelist will only be valid for a certain period of time. The time-stamp signal avoids using noncompliant DFS channels by ensuring that a device will not use the whitelist beyond its useful lifetime. Alternatively, the cloud intelligence engine 235 acting as a cloud DFS super master may provide available channels to the client devices.

Such peer-to-peer devices may have a user control interface 228. The user control interface 228 includes a user interface 229 to allow the client devices 231, 232 to interact with the agility agent 200 via the cloud intelligence engine 235. For example, the user interface 229 allows the user to modify network settings via the agility agent 200 including granting and revoking network access. The user control interface 228 also includes a security element 230 to ensure that communications between the client devices 231, 232 and the agility agent 200 are secure. The client devices 231, 232 are connected to a wide area network 234 via a cellular network for example. In certain implementations, peer-to-peer wireless networks are used for direct communication between devices without an access point. For example, video cameras may connect directly to a computer to download video or images files using a peer-to-peer network. Also, device connections to external monitors and device connections to drones currently use peer-to-peer networks. Therefore, in a peer-to-peer network without an access point, DFS channels cannot be employed since there is no access point to control DFS channel selection and/or to tell devices which DFS channels to use. The present invention overcomes this limitation.

Figure 3:
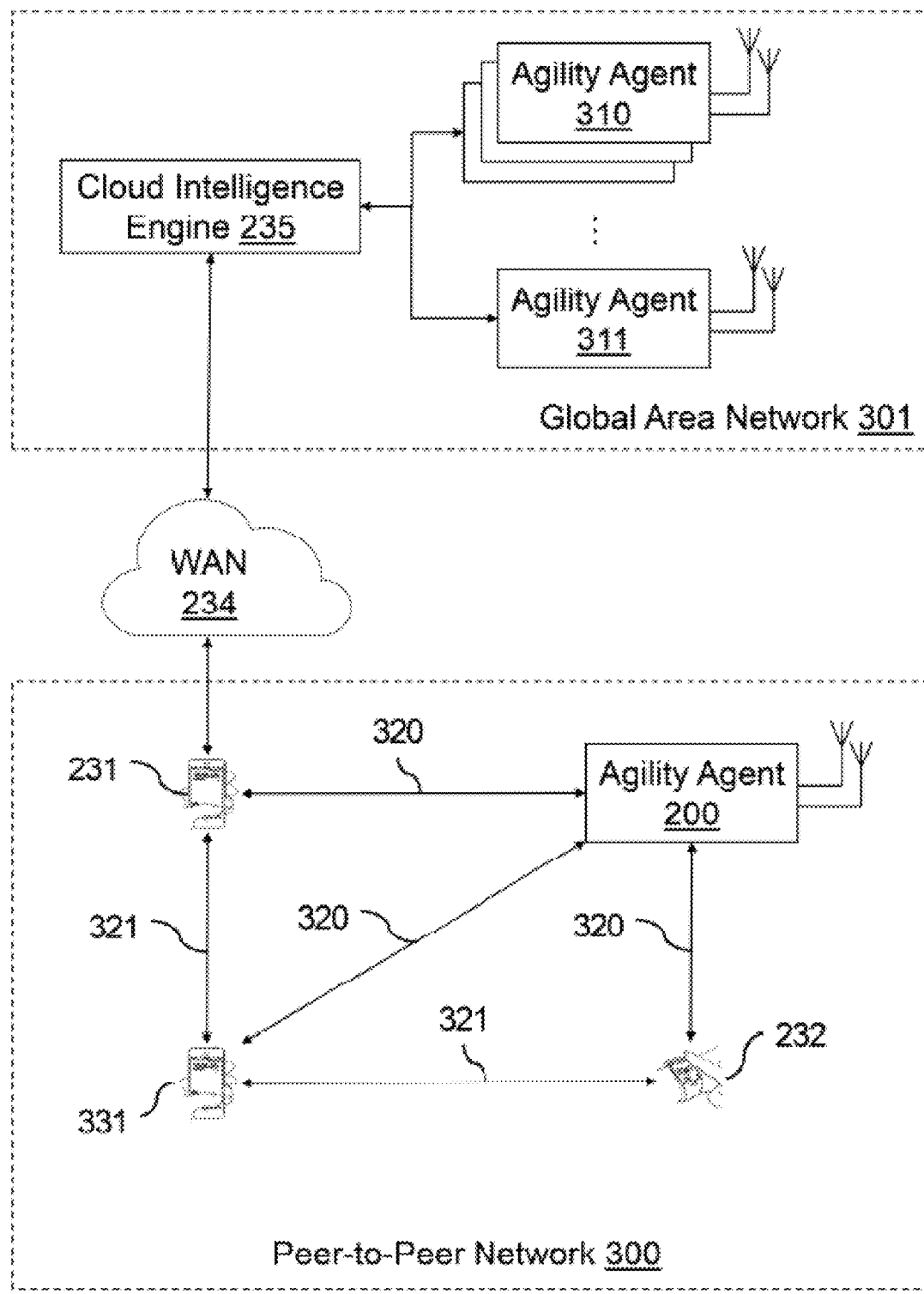
FIG. 3 illustrates how an exemplary cloud-based intelligence engine or cloud DFS super master in a peer-to-peer network may interface with client devices and an agility agent (an autonomous DFS master or radar detector) independent of any access point, in accordance with the present invention.

FIG. 3 illustrates how the agility agent 200 in a peer-to-peer network 300 (a local area network for example) would interface to client devices 231, 232, 331 and the cloud intelligence engine 235 independent of any access point. As shown in FIG. 3, the cloud intelligence engine 235 may be connected to a plurality of network-connected agility agents 200, 310. The agility agent 200 in the peer-to-peer network 300 may connect to the cloud intelligence engine 235 through one of the network-connected client devices 231, 331 by, for example, piggy-backing a message to the cloud intelligence engine 235 on a message send to the client devices 231, 331 or otherwise coopting the client devices' 231, 331 connection to the wide area network 234. In the peer-to-peer network 300, the agility agent 200 sends over-the-air control signals 320 to the client devices 231, 232, 331 including indications of channels free of occupying signals such as DFS channels free of radar signals. Alternatively, the agility agent communicates with just one client device 331 which then acts as the group owner to initiate and control the peer-to-peer communications with other client devices 231, 232. The client devices 231, 232, 331 have peer-to-peer links 321 through which they communicate with each other.

The agility agent may operate in multiple modes executing a number of DFS scan methods employing different algorithms. Two of these methods are illustrated in FIG. 4 and FIG. 5.

Figure 4:
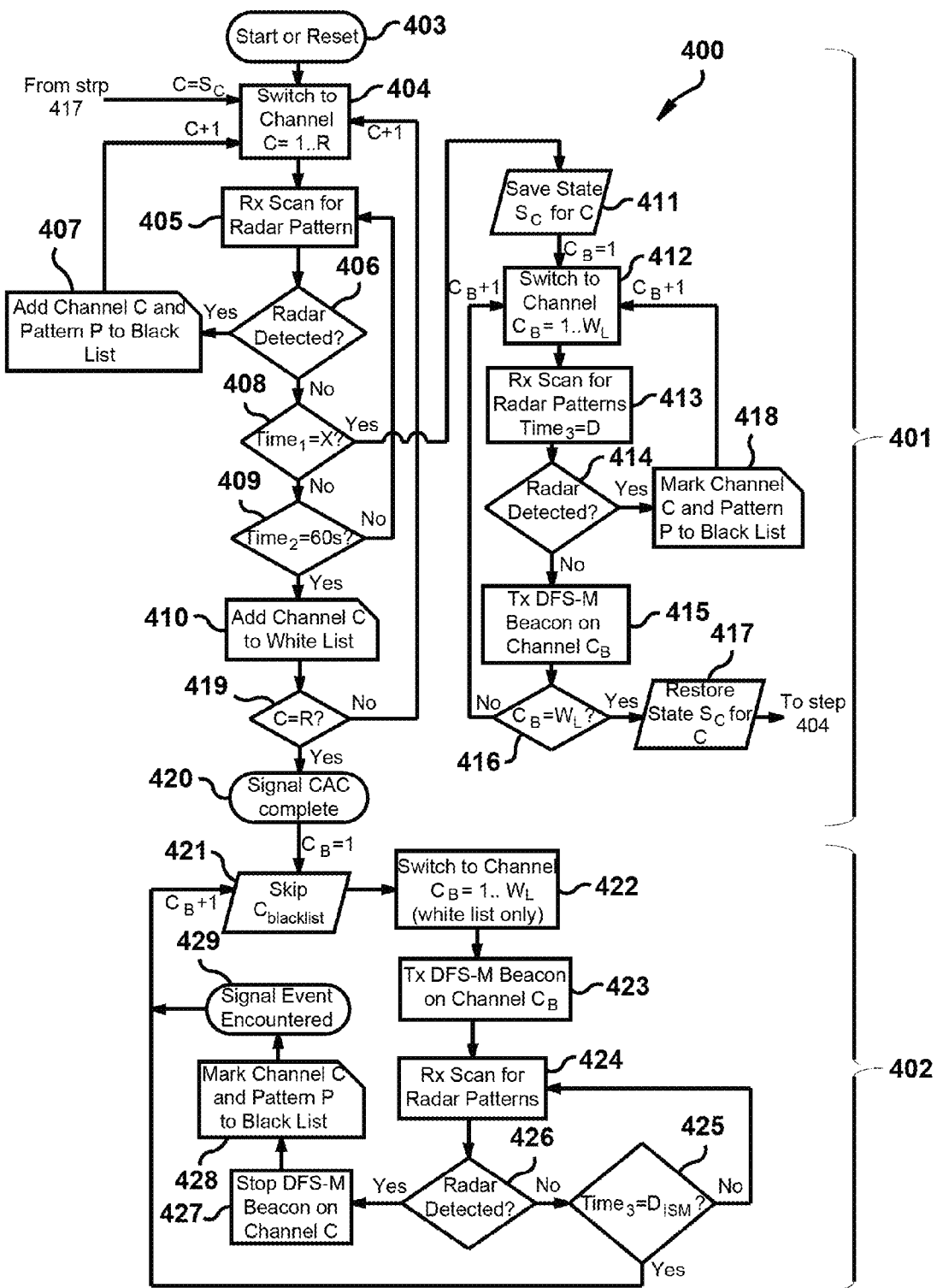
FIG. 4 illustrates a method of performing a channel availability check phase and in-service monitoring phase in a DFS scanning operation with an agility agent to make multiple DFS channels simultaneously available for use using a time-division multiplexed sequential channel availability check followed by continuous in-service monitoring.
Figure 5:
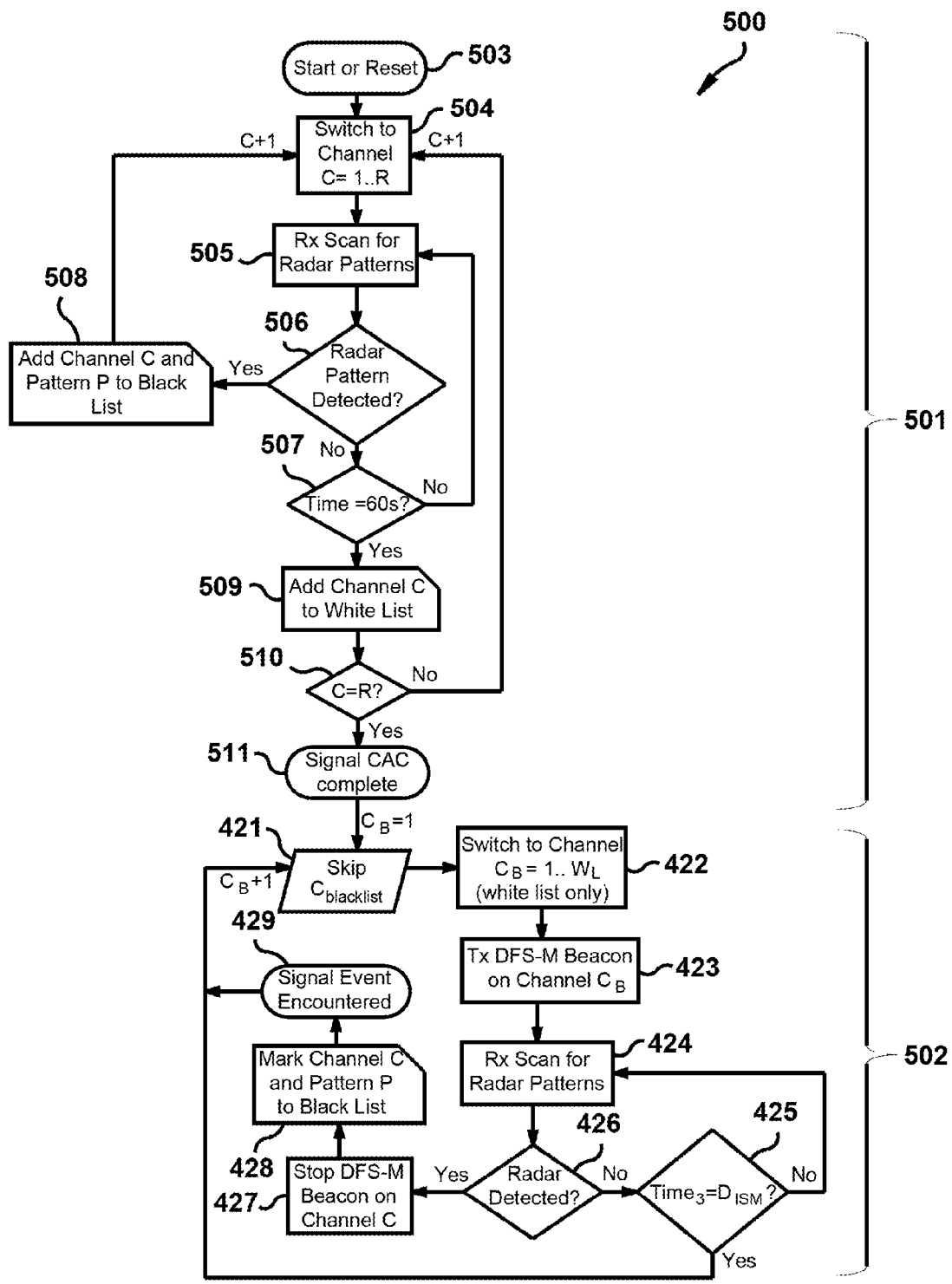
FIG. 5 illustrates a method of performing a channel availability check phase and in-service monitoring phase in a DFS scanning operation with an agility agent to make multiple DFS channels simultaneously available for use using a continuous sequential channel availability check followed by continuous in-service monitoring.

FIG. 4 illustrates a first DFS scan method 400 for a multi-channel DFS master. This method uses a time division sequential CAC 401 followed by continuous ISM 402. The method begins at step 403 with the multi-channel DFS master at startup or after a reset. At step 404 the embedded radio is set to receive (Rx) and is tuned to the first DFS channel (C=1). In one example, the first channel is channel 52. Next, because this is the first scan after startup or reset and the DFS master does not have information about channels free of radar, the DFS master performs a continuous CAC 405 scan for a period of 60 seconds (compliant with the FCC Part 15 Subpart E and ETSI 301 893 requirements). At step 406 the DFS master determines if a radar pattern is present in the current channel. If radar pattern is detected 407, then the DFS master marks this channel in the blacklist. The DFS master may also send additional information about the detected radar including the signal strength, radar pattern, type of radar, and a time stamp for the detection.

At the first scan after startup or reset, if a radar pattern is detected in the first channel scanned, the DFS master may repeat the above steps until a channel free of radar signals is found. Alternatively, after a startup or reset, the DFS master may be provided a whitelist indicating one or more channels that have been determined to be free of radar signals. For example, the DFS master may receive a message that channel 52 is free of radar signals from the cloud intelligence engine 235 along with information fused from other sources.

If at step 406 the DFS master does not detect a radar pattern 410, the DFS master marks this channel in the whitelist and switches the embedded radio to transmit (Tx) (not shown in FIG. 4) at this channel. The DFS master may include additional information in the whitelist including a time stamp. The DFS master then transmits (not shown in FIG. 4) a DFS master beacon signal for minimum required period of n (which is the period of the beacon transmission defined by IEEE 802.11 requirements, usually very short on the order of a few microseconds). A common SSID may be used for all beacons of our system.

For the next channel scan after the DFS master finds a channel free of radar, the DFS master sets the radio to receive and tunes the radio to the next DFS channel 404 (for example channel 60). The DFS master then performs a non-continuous CAC radar detection scan 405 for period of X, which is the maximum period between beacons allowable for a client device to remain associated with a network ($P_M$) less a period of n required for a quick radar scan and the transmission of the beacon itself ($X=P_M-n$) 408. At 411, the DFS master saves the state of current non-continuous channel state ($S_C$) from the non-continuous CAC scan so that the DFS master can later resume the current non-continuous channel scan at the point where the DFS master left off. Then, at step 412, the DFS master switches the radio to transmit and tunes to the first DFS channel (in this example it was CH 52), performs quick receive radar scan 413 (for a period of D called the dwell time) to detect radar 414. If a radar pattern is detected, the DFS master marks the channel to the blacklist 418. When marking the channel to the blacklist, the DFS master may also include additional information about the detected radar pattern including signal strength, type of radar, and a time stamp for the detection. The type of radar detected includes information such as burst duration, number of bursts, pulses per burst, burst period, scan pattern, pulse repetition rate and interval, pulse width, chirp width, beam width, scan rate, pulse rise and fall times, frequency modulation, frequency hopping rate, hopping sequence length, and pulses per hop.

If no radar pattern is detected, the DFS master transmits again 415 the DFS master beacon for the first channel (channel 52 in the example). Next, the DFS master determines if the current channel ($C_B$) is the last channel in the whitelist ($W_L$) 416. In the current example, the current channel, channel 52, is the only channel in the whitelist at this point. Then, the DFS master restores 417 the channel to the saved state from step 411 and switches the radio back to receive mode and tunes the radio back to the current non-continuous CAC DFS channel (channel 60 in the example) 404. The DFS master then resumes the non-continuous CAC radar scan 405 for period of X, again accommodating the period of n required for the quick scan and transmission of the beacon. This is repeated until 60 seconds of non-continuous CAC scanning is accumulated 409—in which case the channel is marked in the whitelist 410—or until a radar pattern is detected—in which case this channel is marked in the blacklist 407.

Next, the DFS master repeats the procedure in the preceding paragraph for the next DFS channel (for example channel 100). The DFS master periodically switches 412 to previous whitelisted DFS channels to do a quick scan 413 (for a period of D called the dwell time), and if no radar pattern detected, transmits a beacon 415 for period of n in each of the previously CAC scanned and whitelisted DFS channels. Then the DFS master returns 404 to resume the non-continuous CAC scan 405 of the current CAC channel (in this case CH 100). The period X available for non-continuous CAC scanning before switching to transmit and sequentially beaconing the previously whitelisted CAC scanned channels is reduced by n for each of the previously whitelisted CAC scanned channels, roughly $X=P_M-n*(W_L)$ where $W_L$ is the number of previously whitelisted CAC scanned channels. This is repeated until 60 seconds of non-continuous CAC scanning is accumulated for the current channel 409. If no radar pattern is detected the channel is marked in the whitelist 410. If a radar pattern is detected, the channel is marked in the blacklist 407 and the radio can immediately switch to the next DFS channel to be CAC scanned.

The steps in the preceding paragraph are repeated for each new DFS channel until all desired channels in the DFS band have been CAC scanned. In FIG. 4, step 419 checks to see if the current channel C is the last channel to be CAC scanned R. If the last channel to be CAC scanned R has been reached, the DFS master signals 420 that the CAC phase 401 is complete and begins the ISM phase 402. The whitelist and blacklist information may be communicated to the cloud intelligence engine where it is integrated over time and fused with similar information from other agility agents.

During the ISM phase, the DFS master does not scan the channels in the blacklist 421. The DFS master switches 422 to the first channel in the whitelist and transmits 423 a DFS beacon on that channel. Then the DFS master scans 424 the first channel in the whitelist for a period of $D_{ISM}$ (the ISM dwell time) 425, which may be roughly $P_M$ (the maximum period between beacons allowable for a client device to remain associated with a network) minus n times the number of whitelisted channels, divided by the number of whitelisted channels ($D_{ISM}=(P_M-n*W_L)/n$). Then the DFS master transmits 423 a beacon and scans 424 each of the channels in the whitelist for the dwell time and then repeats starting at the first channel in the whitelist 422 in a round robin fashion for each respective channel. If a radar pattern is detected 426, the DFS master beacon for the respective channel is stopped 427, and the channel is marked in the blacklist 428 and removed from the whitelist (and no longer ISM scanned). The DFS master sends alert messages 429, along with the new whitelist and blacklist to the cloud intelligence engine. Alert messages may also be sent to other access points and/or client devices in the network.

FIG. 5 illustrates a second DFS scan method 500 for a multi-channel DFS master. This method uses a continuous sequential CAC 501 followed by continuous ISM 502. The method begins at step 503 with the multi-channel DFS master at startup or after a reset. At step 504 the embedded radio is set to receive (Rx) and is tuned to the first DFS channel (C=1). In this example, the first channel is channel 52. The DFS master performs a continuous CAC scan 505 for a period of 60 seconds 507 (compliant with the FCC Part 15 Subpart E and ETSI 301 893 requirements). If radar pattern is detected at step 506 then the DFS master marks this channel in the blacklist 508.

If the DFS master does not detect radar patterns, it marks this channel in the whitelist 509. The DFS master determines if the current channel C is the last channel to be CAC scanned R at step 510. If not, then the DFS master tunes the receiver to the next DFS channel (for example channel 60) 504. Then the DFS master performs a continuous scan 505 for full period of 60 seconds 507. If a radar pattern is detected, the DFS master marks the channel in the blacklist 508 and the radio can immediately switch to the next DFS channel 504 and repeat the steps after step 504.

If no radar pattern is detected 509, the DFS master marks the channel in the whitelist 509 and then tunes the receiver next DFS channel 504 and repeats the subsequent steps until all DFS channels for which a CAC scan is desired. Unlike the method depicted in FIG. 4, no beacon is transmitted between CAC scans of sequential DFS channels during the CAC scan phase.

The ISM phase 502 in FIG. 5 is identical to that in FIG. 4 described above.

Figure 6A:
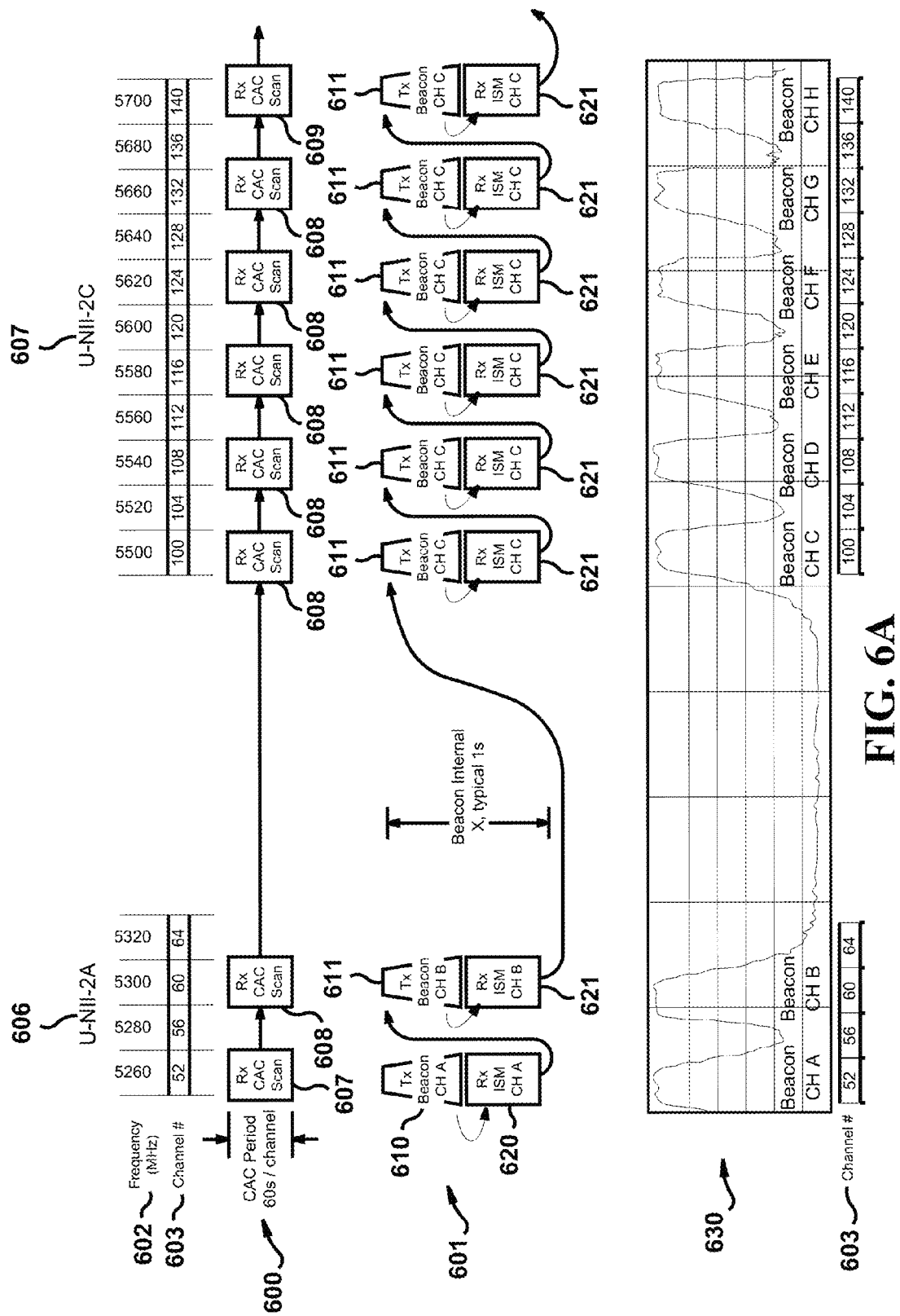
FIG. 6A illustrates a method of performing a channel availability check phase and in-service monitoring phase in a DFS scanning operation with an agility agent to make multiple DFS channels simultaneously available for use.

FIG. 6A illustrates how multiple channels in the DFS channels of the 5 GHz band are made simultaneously available by use of an agility agent. FIG. 6A illustrates the process of FIG. 5 wherein the autonomous DFS Master performs the DFS scanning CAC phase 600 across multiple channels and upon completion of CAC phase, the autonomous DFS Master performs the ISM phase 601. During the ISM phase the DFS master transmits multiple beacons to indicate the availability of multiple DFS channels to nearby host and non-host (ordinary) access points and client devices.

FIG. 6A shows the frequencies 602 and channels 603 that make up portions of the DFS 5 GHz Wi-Fi spectrum. U-NII-2A 606 covers the 5.25-5.35 GHz range. U-NII-2C 607 covers the 5.47-5.725 GHz range. The first channel to undergo CAC scanning is shown at element 607. The subsequent CAC scans of other channels are shown at elements 608. And the final CAC scan before the ISM phase 601 is shown at element 609.

In the ISM phase 601, the DFS master switches to the first channel in the whitelist. In the example in FIG. 6A, each channel 603 for which a CAC scan was performed was free of radar signals during the CAC scan and was added to the whitelist. Then the DFS master transmits 610 a DFS beacon on that channel. Then the DFS master scans 620 the first channel in the whitelist for the dwell time. Then the DFS master transmits 611 a beacon and scans 621 each of the other channels in the whitelist for the dwell time and then repeats starting 610 at the first channel in the whitelist in a round robin fashion for each respective channel. If a radar pattern is detected, the DFS master beacon for the respective channel is stopped, and the channel is marked in the blacklist and removed from the whitelist (and no longer ISM scanned).

FIG. 6A also shows an exemplary waveform 630 of the multiple beacon transmissions from the DFS master to indicate the availability of the multiple DFS channels to nearby host and non-host (ordinary) access points and client devices.

Figure 6B:
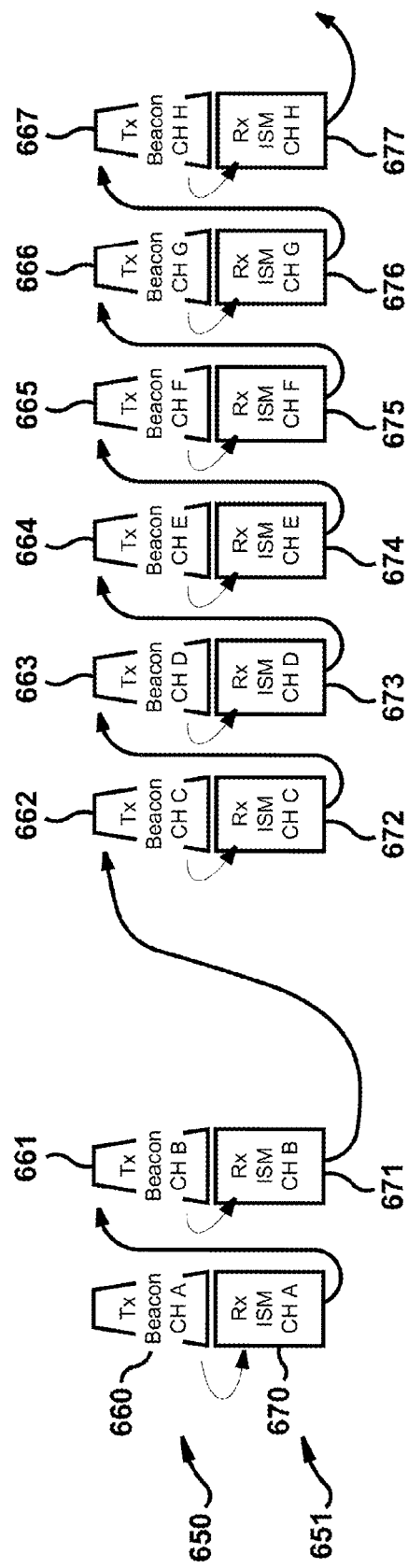
FIG. 6B illustrates an exemplary beacon transmission duty cycle and an exemplary radar detection duty cycle.

FIG. 6B illustrates a beacon transmission duty cycle 650 and a radar detection duty cycle 651. In this example, channel A is the first channel in a channel whitelist. In FIG. 6B, a beacon transmission in channel A 660 is followed by a quick scan of channel A 670. Next a beacon transmission in the second channel, channel B, 661 is followed by a quick scan of channel B 671. This sequence is repeated for channels C 662, 672; D 663, 673; E 664, 674; F 665, 675; G 666, 676, and H 667, 677. After the quick scan of channel H 677, the DFS master switches back to channel A and performs a second beacon transmission in channel A 660 followed by a second quick scan of channel A 670. The time between starting the first beacon transmission in channel A and starting the second beacon transmission in channel A is a beacon transmission duty cycle. The time between starting the first quick scan in channel A and starting the second quick scan in channel A is a radar detection duty cycle. In order to maintain connection with devices on a network, the beacon transmission duty cycle should be less than or equal to the maximum period between the beacons allowable for a client device to remain associated with the network.

A standalone multi-channel DFS master may include a beacon generator 212 to generate a beacon in each of a plurality of 5 GHz radio channels, a radar detector 211 to scan for a radar signal in each of the plurality of 5 GHz radio channels, a 5 GHz radio transceiver 215 to transmit the beacon in each of the plurality of 5 GHz radio channels and to receive the radar signal in each of the plurality of 5 GHz radio channels, and a fast channel switching generator 217 and embedded processor 203 coupled to the radar detector, the beacon generator, and the 5 GHz radio transceiver. The fast channel switching generator 217 and embedded processor 203 switch the 5 GHz radio transceiver 215 to a first channel of the plurality of 5 GHz radio channels and cause the beacon generator 212 to generate the beacon in the first channel of the plurality of 5 GHz radio channels. The fast channel switching generator 217 and embedded processor 203 also cause the radar detector 211 to scan for the radar signal in the first channel of the plurality of 5 GHz radio channels. The fast channel switching generator 217 and embedded processor 203 then repeat these steps for each of the other channels of the plurality of 5 GHz radio channels. The fast channel switching generator 217 and embedded processor 203 perform all of the steps for all of the plurality of 5 GHz radio channels during a beacon transmission duty cycle which is a time between successive beacon transmissions on a specific channel and, in some examples, a radar detection duty cycle which is a time between successive scans on the specific channel.

Figure 7:
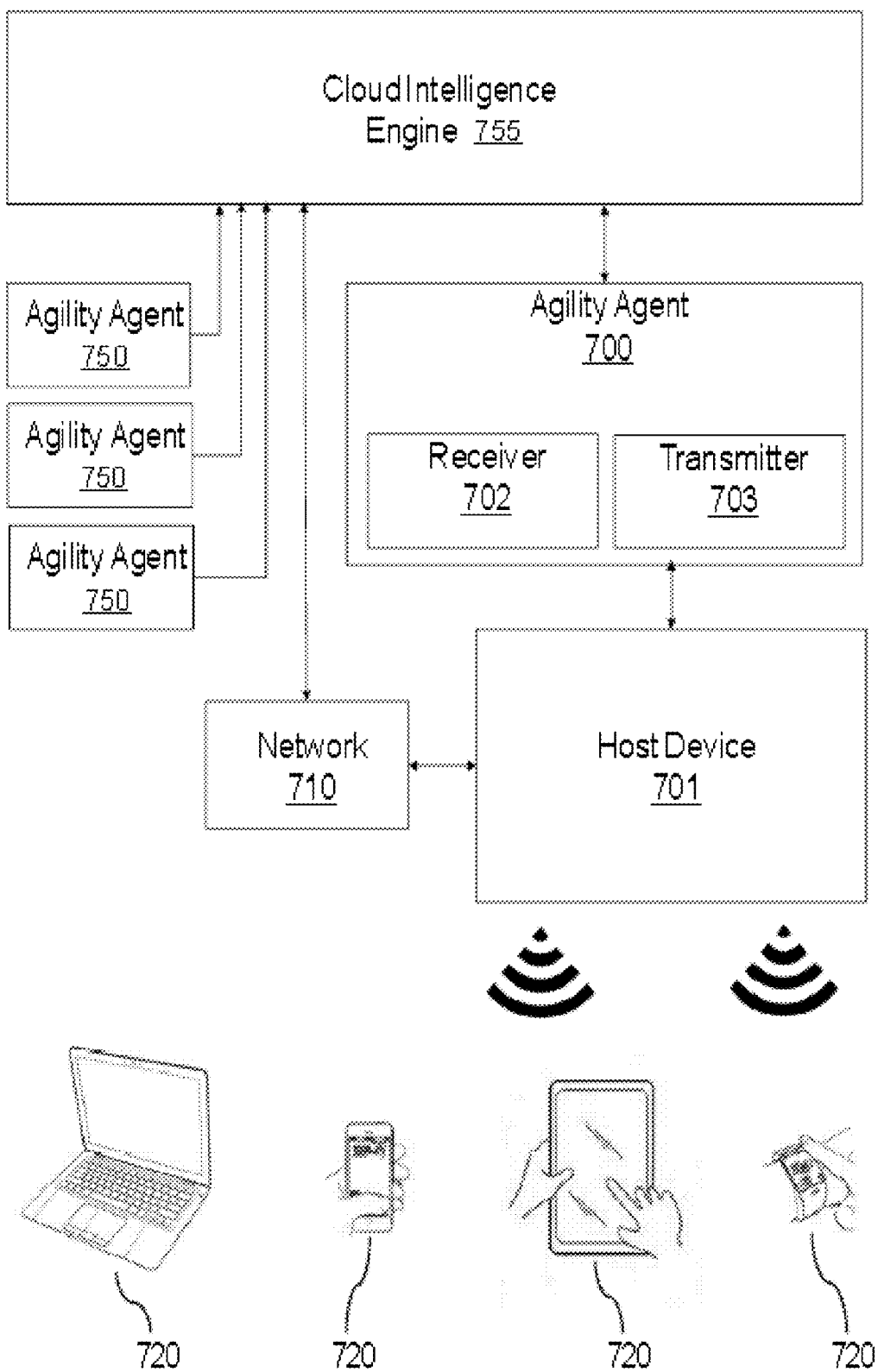
FIG. 7 illustrates an example in which an agility agent is connected to a host device and connected to a network via the host device.

The example in FIG. 7 illustrates systems and methods for selecting available channels free of occupying signals from a plurality of radio frequency channels. The system includes an agility agent 700 functioning as an autonomous frequency selection master that has both an embedded radio receiver 702 to detect the occupying signals in each of the plurality of radio frequency channels and an embedded radio transmitter 703 to transmit an indication of the available channels and an indication of unavailable channels not free of the occupying signals. The agility agent 700 is programmed to connect to a host device 701 and control a selection of an operating channel selection of the host device by transmitting the indication of the available channels and the indication of the unavailable channels to the host device. The host device 701 communicates wirelessly with client devices 720 and acts as a gateway for client devices to a network 710 such as the Internet, other wide area network, or local area network. The host device 701, under the control of the agility agent 700, tells the client devices 720 which channel or channels to use for wireless communication. Additionally, the agility agent 700 may be programmed to transmit the indication of the available channels and the indication of the unavailable channels directly to client devices 720.

The agility agent 700 may operate in the 5 GHz band and the plurality of radio frequency channels may be in the 5 GHz band and the occupying signals are radar signals. The host device 701 may be a Wi-Fi access point or an LTE-U host device.

Further, the agility agent 700 may be programmed to transmit the indication of the available channels by transmitting a channel whitelist of the available channels and to transmit the indication of the unavailable channels by transmitting a channel blacklist of the unavailable channels. In addition to saving the channel in the channel blacklist, the agility agent 700 may also be programmed to determine and save in the channel blacklist information about the detected occupying signals including signal strength, traffic, and type of the occupying signals.

Figure 8:
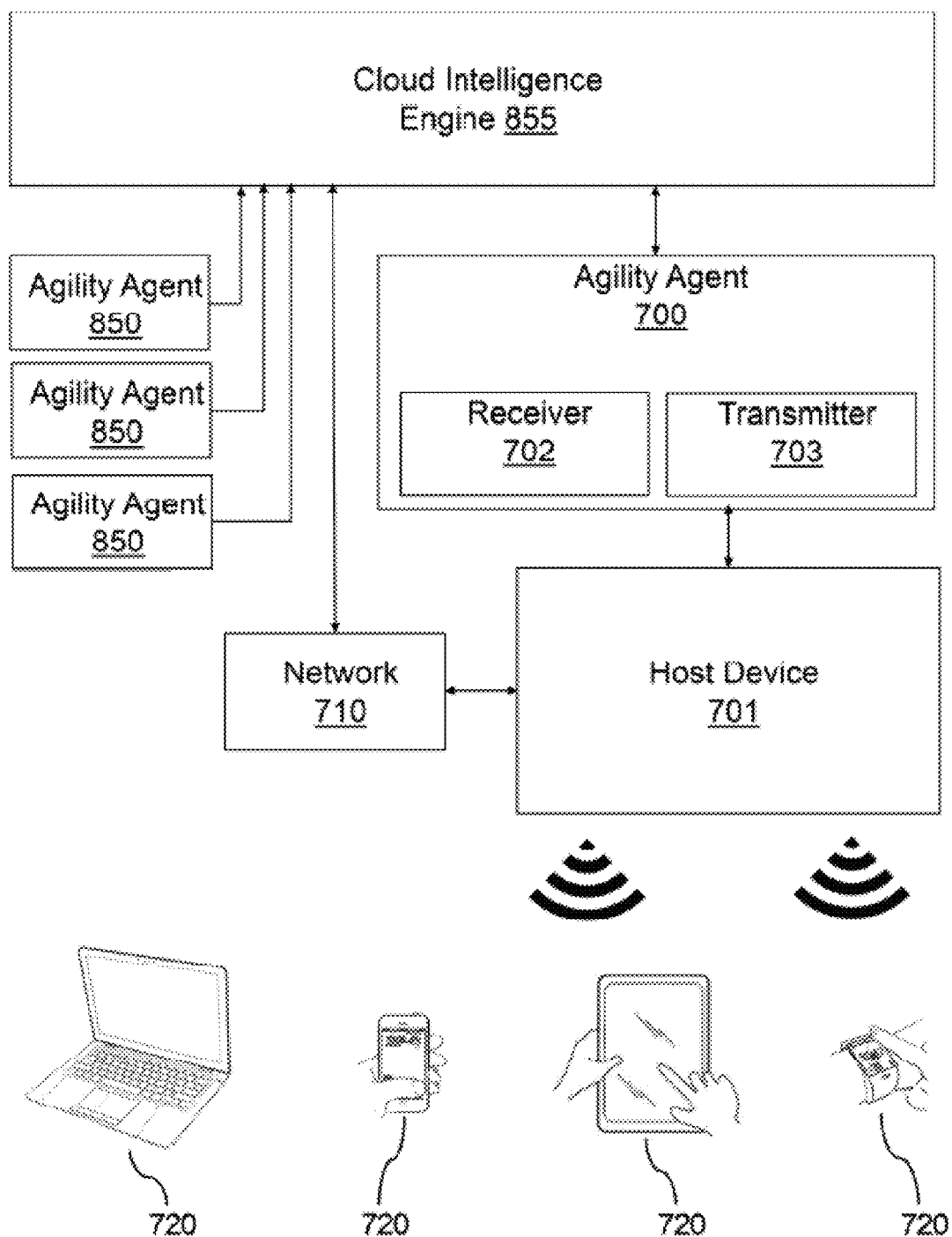
FIG. 8 illustrates an example in which an agility agent is connected to a host device and connected to a network and a cloud intelligence engine or cloud DFS super master via the host device.

As shown in FIG. 8, the agility agent 700 may be connected to a cloud-based intelligence engine 855. The agility agent 700 may connect to the cloud intelligence engine 855 directly or through the host device 701 and network 710. The cloud intelligence engine 855 integrates time distributed information from the agility agent 700 and combines information from a plurality of other agility agents 850 distributed in space and connected to the cloud intelligence engine 855. The agility agent 700 is programmed to receive control and coordination signals and authorized and preferred channel selection guidance information from the cloud intelligence engine 755.

Figure 9:
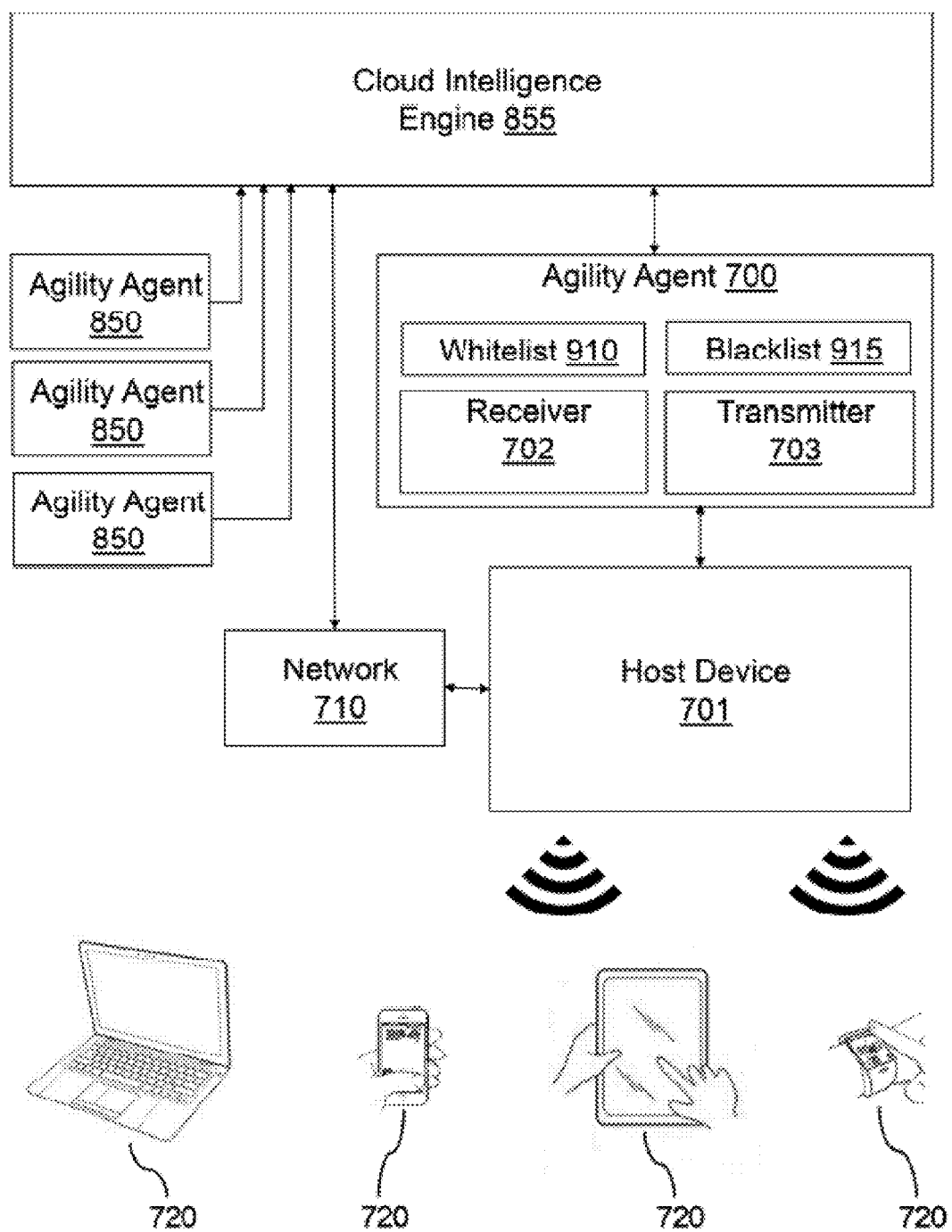
FIG. 9 illustrates an example in which an agility agent is connected to a host device and connected to a network and a cloud intelligence engine or cloud DFS super master via the host device.

The example shown in FIG. 9 shows a system and method for selecting available channels free of occupying signals from a plurality of radio frequency channels in which an agility agent 700 functioning as an autonomous frequency selection master includes an embedded radio receiver 702 to detect the occupying signals in each of the plurality of radio frequency channels and an embedded radio transmitter 703 to indicate the available channels and unavailable channels not free of the occupying signals. The agility agent 700 contains a channel whitelist 910 of one or more channels scanned and determined not to contain an occupying signal. The agility agent 700 may receive the whitelist 910 from another device including a cloud intelligence engine 855. Or the agility agent 700 may have previously derived the whitelist 910 through a continuous CAC for one or more channels. In this example, the agility agent 700 is programmed to cause the embedded radio receiver 702 to scan each of the plurality of radio frequency channels non-continuously interspersed with periodic switching to the channels in the channel whitelist 910 to perform a quick occupying signal scan in each channel in the channel whitelist 910. The agility agent 700 is further programmed to cause the embedded radio transmitter 703 to transmit a first beacon transmission in each channel in the channel whitelist 910 during the quick occupying signal scan and to track in the channel whitelist 910 the channels scanned and determined not to contain the occupying signal during the non-continuous scan and the quick occupying signal scan. The agility agent 700 is also programmed to track in a channel blacklist 915 the channels scanned and determined to contain the occupying signal during the non-continuous scan and the quick occupying signal scan and then to perform in-service monitoring for the occupying signal, including transmitting a second beacon for each of the channels in the channel whitelist 910, continuously and sequentially.

Figure 10:
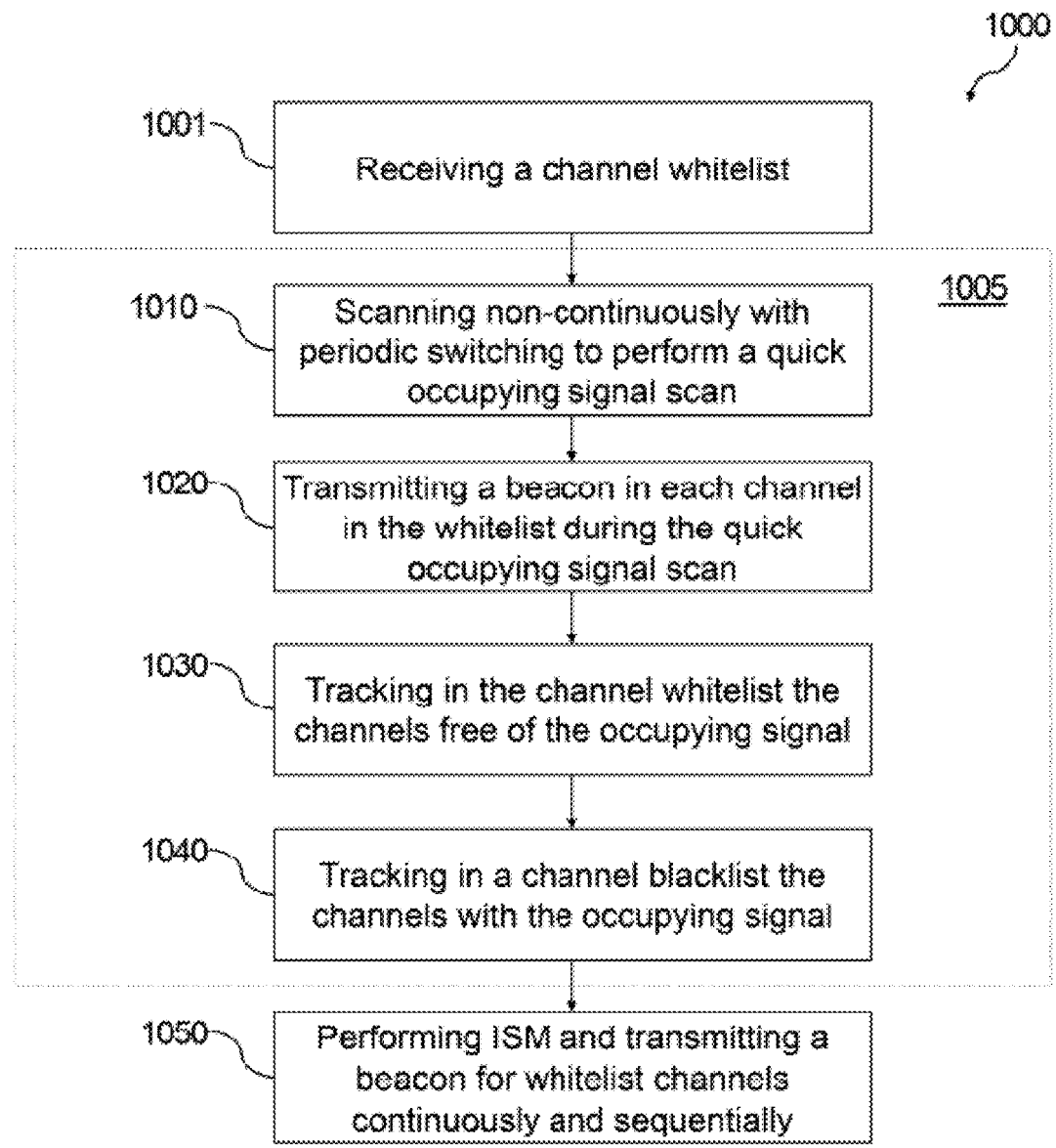
FIG. 10 illustrates a method of performing a channel availability check and in-service monitoring.

FIG. 10 illustrates an exemplary method 1000 for selecting an operating channel from a plurality of radio frequency channels in an agility agent functioning as an autonomous frequency selection master. The method includes receiving a channel whitelist of one or more channels scanned and determined not to contain an occupying signal 1010. Next, the agility agent performs a channel availability check 1005 for the plurality of radio frequency channels in a time-division manner. The time-division channel availability check includes scanning 1010 with an embedded radio receiver in the agility agent each of the plurality of radio frequency channels non-continuously interspersed with periodic switching to the channels in the channel whitelist to perform a quick occupying signal scan and transmitting 1020 a first beacon with an embedded radio transmitter in the agility agent in each channel in the channel whitelist during the quick occupying signal scan. The agility agent also tracks 1030 in the channel whitelist the channels scanned in step 1010 and determined not to contain the occupying signal and tracks 1040 in a channel blacklist the channels scanned in step 1010 and determined to contain the occupying signal. Finally, the agility agent performs in-service monitoring for the occupying signal and a second beaconing transmission for each of the channels in the channel whitelist continuously and sequentially 1050.

Figure 11:
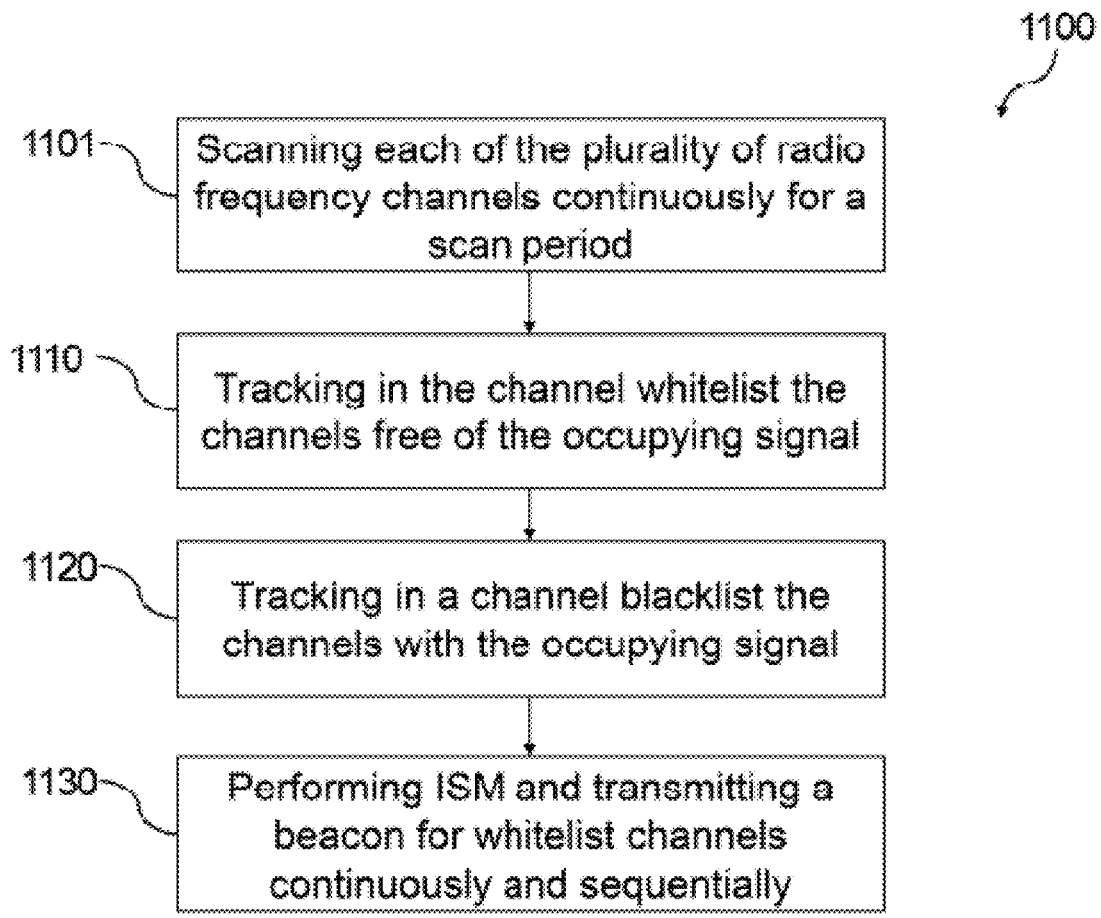
FIG. 11 illustrates another method of performing a channel availability check and in-service monitoring.

FIG. 11 illustrates another exemplary method 1100 for selecting an operating channel from a plurality of radio frequency channels in an agility agent functioning as an autonomous frequency selection master. The method 1100 includes performing a channel availability check for each of the plurality of radio frequency channels by scanning 1101 with an embedded radio receiver in the agility agent each of the plurality of radio frequency channels continuously for a scan period. The agility agent then tracks 1110 in a channel whitelist the channels scanned and determined not to contain an occupying signal and tracks 1120 in a channel blacklist the channels scanned and determined to contain the occupying signal. Then the agility agent performs in-service monitoring for the occupying signal and transmits a beacon with an embedded radio transmitter in the agility agent for each of the channels in the channel whitelist continuously and sequentially 1130.

Figure 12:
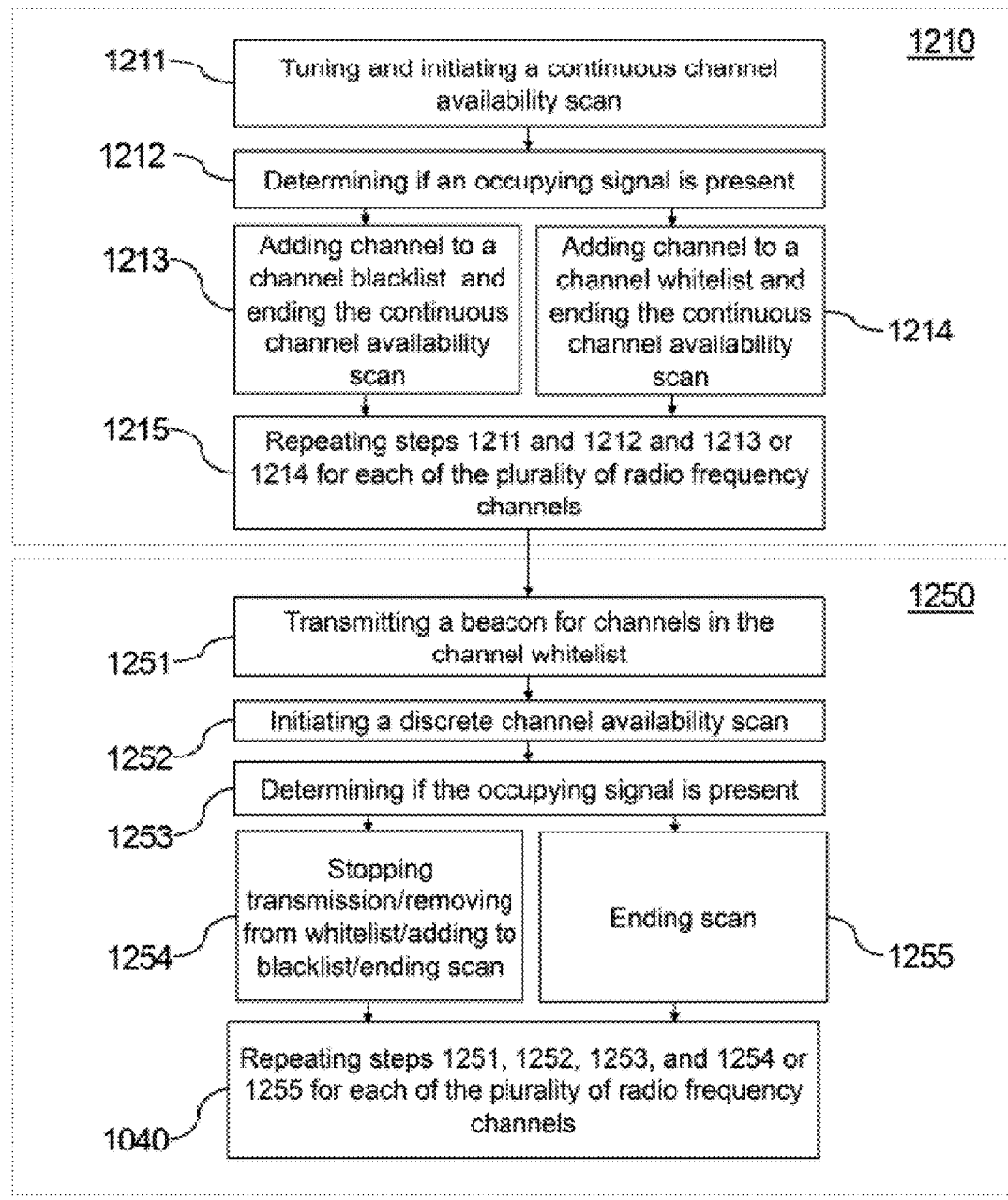
FIG. 12 illustrates another method of performing a channel availability check and in-service monitoring.

FIG. 12 illustrates a further exemplary method 1200 for selecting an operating channel from a plurality of radio frequency channels in an agility agent functioning as an autonomous frequency selection master. The method 1200 includes performing a channel availability check 1210 for each of the plurality of radio frequency channels and performing in-service monitoring and beaconing 1250 for each of the plurality of radio frequency channels. The channel availability check 1210 includes tuning an embedded radio receiver in the autonomous frequency selection master device to one of the plurality of radio frequency channels and initiating a continuous channel availability scan in the one of the plurality of radio frequency channels with the embedded radio receiver 1211. Next, the channel availability check 1210 includes determining if an occupying signal is present in the one of the plurality of radio frequency channels during the continuous channel availability scan 1212. If the occupying signal is present in the one of the plurality of radio frequency channels during the continuous channel availability scan, the channel availability check 1210 includes adding the one of the plurality of radio frequency channels to a channel blacklist and ending the continuous channel availability scan 1213. If the occupying signal is not present in the one of the plurality of radio frequency channels during the continuous channel availability scan during a first scan period, the channel availability check 1210 includes adding the one of the plurality of radio frequency channels to a channel whitelist and ending the continuous channel availability scan 1214. Next, the channel availability check 1210 includes repeating steps 1211 and 1212 and either 1213 or 1214 for each of the plurality of radio frequency channels.

The in-service monitoring and beaconing 1250 for each of the plurality of radio frequency channels includes determining if the one of the plurality of radio frequency channels is in the channel whitelist and if so, tuning the embedded radio receiver in the autonomous frequency selection master device to the one of the plurality of radio frequency channels and transmitting a beacon in the one of the plurality of radio frequency channels with an embedded radio transmitter in the autonomous frequency selection master device 1251. Next, the in-service monitoring and beaconing 1250 includes initiating a discrete channel availability scan (a quick scan as described previously) in the one of the plurality of radio frequency channels with the embedded radio receiver 1252. Next, the in-service monitoring and beaconing 1250 includes determining if the occupying signal is present in the one of the plurality of radio frequency channels during the discrete channel availability scan 1253. If the occupying signal is present, the in-service monitoring and beaconing 1250 includes stopping transmission of the beacon, removing the one of the plurality of radio frequency channels from the channel whitelist, adding the one of the plurality of radio frequency channels to the channel blacklist, and ending the discrete channel availability scan 1254. If the occupying signal is not present in the one of the plurality of radio frequency channels during the discrete channel availability scan for a second scan period, the in-service monitoring and beaconing 1250 includes ending the discrete channel availability scan 1255. Thereafter, the in-service monitoring and beaconing 1250 includes repeating steps 1251, 1252, and 1253 as well as either 1254 or 1255 for each of the plurality of radio frequency channels.

As discussed herein, the disclosed systems are fundamentally different from the current state of art in that: (a) the disclosed wireless agility agents enable multiple simultaneous dynamic frequency channels, which is significantly more bandwidth than provided by conventional standalone DFS master access points or small cell base stations; (b) the additional DFS channels may be shared with nearby (suitably equipped with a control agent) access points or small cells, enabling the network as a whole to benefit from the additional bandwidth; and (c) the selection of operating channels by the access points and/or small cell base stations can be coordinated by a centralized network organization element (the cloud intelligence engine) to avoid overlapping channels thus avoiding interference and relieving congestion.

The capability and functions in (a) to (c) are enabled by the centralized cloud intelligence engine which collects and combines the DFS radar and other spectrum information from each agility agent and geo-tags, stores, filters, and integrates the data over time, and combines it together by data fusion technique with information from a plurality of other agility agents distributed in space, and performs filtering and other post-processing on the collection with proprietary algorithms, and merges with other data from vetted sources (such as GIS, Federal Aviation Administration (FAA), FCC, and DoD databases, etc.).

Specifically, the cloud intelligence engine performs the following: continuously collects the spectrum, location and network congestion/traffic information from all wireless agility agents, the number and density of which grows rapidly as more access points and small cell base stations are deployed; continuously applying sophisticated filtering, spatial and time correlation and integration operations, and novel array-combining techniques, and pattern recognition, etc. across the data sets; applying inventive network analysis and optimization techniques to compute network organization decisions to collectively optimize dynamic channel selection of access points and small cell base stations across networks; and directing the adaptive control of dynamic channel selection and radio configuration of 802.11 a/n/ac access points and/or LTE-U small cell base stations via said wireless agility agents.

Agility agents, due to their attachment to Wi-Fi access points and LTE-U small cell base stations, are by nature deployed over wide geographical areas in varying densities and often with overlapping coverage. Thus the spectrum information collected by agility agents, in particular the signatures of DFS radar and congestion conditions of local networks, similarly represent multi-point overlapping measurements of the radio spectrum over wide areas, or viewed a different way, the information represents spectrum measurements by random irregular arrays of sensors measuring radar and sources of interference and/or congestion from different angles (see FIG. 13).

Figure 13:
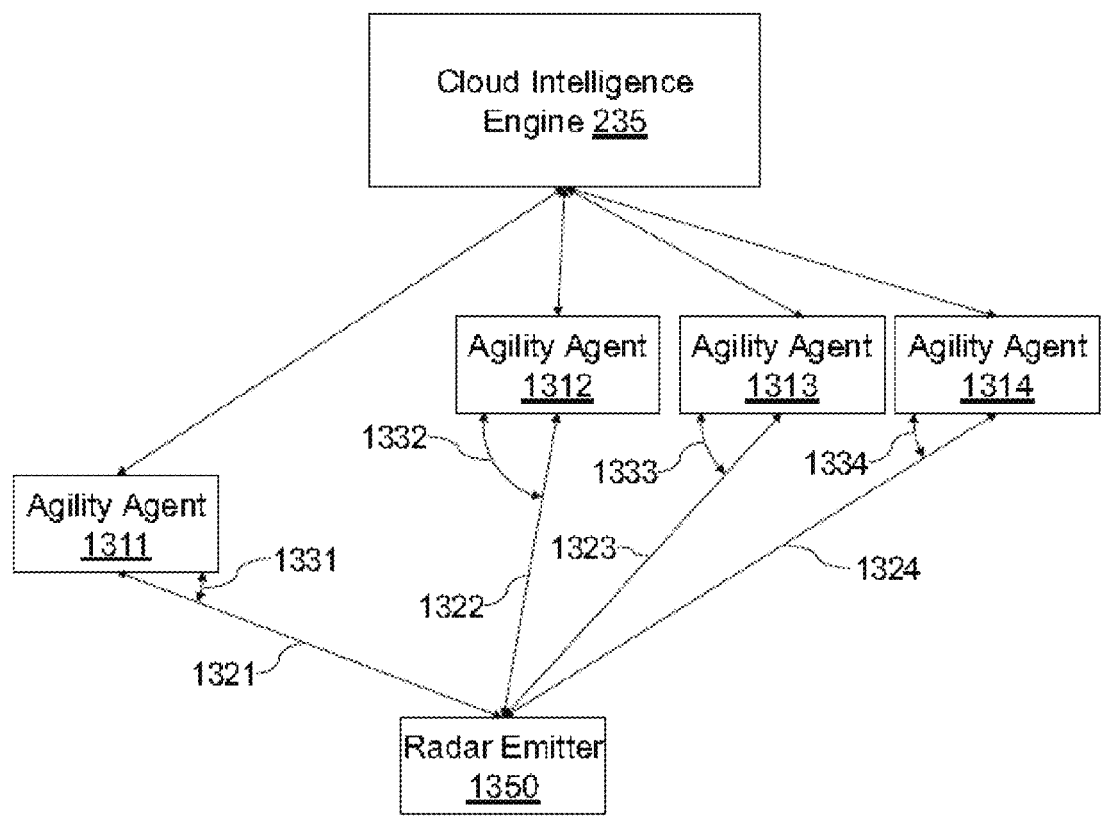
FIG. 13 illustrates how multiple agility agents provide geographically distributed overlapping views of a radar emitter.

FIG. 13 illustrates how multiple agility agents 1311, 1312, 1313, 1314 (for example, each attached to an 802.11 a/n/ac Wi-Fi network) provide geographically distributed overlapping views (sets of sensor data) of a radar emitter 1350. The FIG. also shows how by reporting to the centralized cloud intelligence engine 235, the collective multiple view data when pieced together by the cloud intelligence engine 235 takes on the attributes of both spatial diversity (different range and fading/reflective channel conditions 1321, 1322, 1323, 1324) and angular diversity (for example, look angles 1331, 1332, 1333, 1334) all of which can thus be leveraged to generate a pseudo synthetic aperture view of the target radar 1350 or any other emitter source with considerably more effective gain and sensitivity than was represented by any single view from a single access point or small cell base station. Different positions 1321, 1322, 1323, 1324 and look angles 1331, 1332, 1333, 1334 results in different timing offset of received radar pulse train and different distortion of received signal due to different fading and reflective channel conditions. A subset of the agility agents 1311, 1312, 1313, 1314 may form a pseudo-synthetic antenna array that provides improved sensitivity to radar signals due to effective higher gain and robustness in radar detection due to redundancy. The data from the agility agents 1311, 1312, 1313, 1314 are transmitted to the cloud intelligence engine 235 which performs data correlation and integration to determine the location of the target radar 1350.

The cloud intelligence engine having considerable processing capabilities and infinitely scalable memory/storage, is able to store the time-stamped spectrum information from each agility agent over very long periods of time, thus enabling the cloud intelligence engine to also integrate and correlate the signatures of DFS radar and congestion conditions of the local network over time as well as over geographic space. Given a sufficient number of agility agents continuously acquiring spectral information over time, the cloud intelligence engine can construct an increasingly accurate and reliable spatial map of spectrum information in the 5 GHz band, including the presence or absence of radar signals. The spectral information may be location-tagged and/or time-stamped. The device may be, for example, an access point device, a DFS slave device, a peer-to-peer group owner device, a mobile hotspot device, a radio access node device or a dedicated sensor node device. With this information, client devices can directly query the cloud intelligence engine to find out what DFS channels are available and free of radar at the location of the client device. With this system, the client device no longer needs to wait for a beacon that would have otherwise been provided by an access point or agility agent as the client device can communicate with the cloud intelligence engine via a network connection to determine the available channels. In this situation, the cloud intelligence engine becomes a cloud DFS super master as it can provide DFS channel selection information for a plurality of client devices distributed over a wide range of geographies.

Further, the cloud intelligence engine is also able to access and combine data from other sources (data fusion), such as topographic and map information from GIS (Geographical Information System) servers, FCC databases, NOAA databases, etc. enabling the cloud intelligence engine to further compare, correlate, overlay and otherwise polish the baseline spectrum data from agility agents and augment the network self-organization algorithm to further improve the overall accuracy and robustness of the invention.

The cloud intelligence engine having thus formed a detailed picture of the dynamic spectrum conditions of 802.11 a/n/ac and LTE-U networks is able to use this data to compute optimal network configurations, in particular the selection of operating channels (in both DFS and non-DFS bands) and radio parameters, of individual access points and/or small cell base stations to avoid overlap with other nearby access points or base stations, interferers, and noisy or congested channels. The overall system embodied by this can thus be viewed as a large wide-area closed control system, as illustrated in FIG. 14.

In one example, a system of the present invention includes a cloud DFS super master and a plurality of radar detectors communicatively coupled to the cloud DFS super master. The radar detectors are programmed to scan for a radar signal in each of a plurality of 5 GHz radio channels, to transmit the results of the scan for the radar signal to the cloud DFS super master, and to transmit geo-location information for each of the plurality of radar detectors to the cloud DFS super master. The cloud DFS super master is programmed to receive the results of the scan for the radar signal from each of the plurality of radar detectors and the geo-location information for the plurality of radar detectors and determine if a first radar detector of the plurality of radar detectors detected the radar signal in a first channel of the plurality of 5 GHz radio channels. If the cloud DFS super maser determines that the radar signal is present in the first channel, the cloud DFS super master is programmed to determine one or more radar detector (e.g., second radar detectors) of the plurality of radar detectors to evaluate the first radar detector's detection of the radar signal in the first channel based on the geo-location information for the first radar detector and the geo-location for the second radar detector. In one example, the cloud DFS super master is programmed to cause the one or more second radar detectors to switch to the first channel and scan for radar in the first channel. And in another example, the cloud DFS super master is programmed to cause the one or more second radar detectors increase a dwell time in the first channel. In these examples, the cloud DFS super master can coordinate the radar detectors when any one detector sees radar. The cloud DFS super master and network of radar detectors acts like a large synthetic aperture array, and the cloud DFS super master can control the radar detectors to take action. Some of the actions include moving one or more radar detector to the channel in which radar was detected and looking for radar or causing one or more radar detectors to dwell longer in the channel in which radar was detected. The more sensors looking at the radar signal, the better the radar signal can be characterized. Further, through geo-location the cloud DFS supertaster may determine that there are other detectors in a better position to measure or characterize the radar and may use data from one or more detectors (e.g., fusing data from multiple detectors). This could be driven by historical data or by knowing the type/model of detectors. Indeed, as sensors are upgraded their sensitivity may be better than previous generation of products. The cloud DFS supertaster may track what detectors (and their capabilities) are deployed in a given area and optimally select which ones will provide the secondary verifying radar scans.

Figure 14:
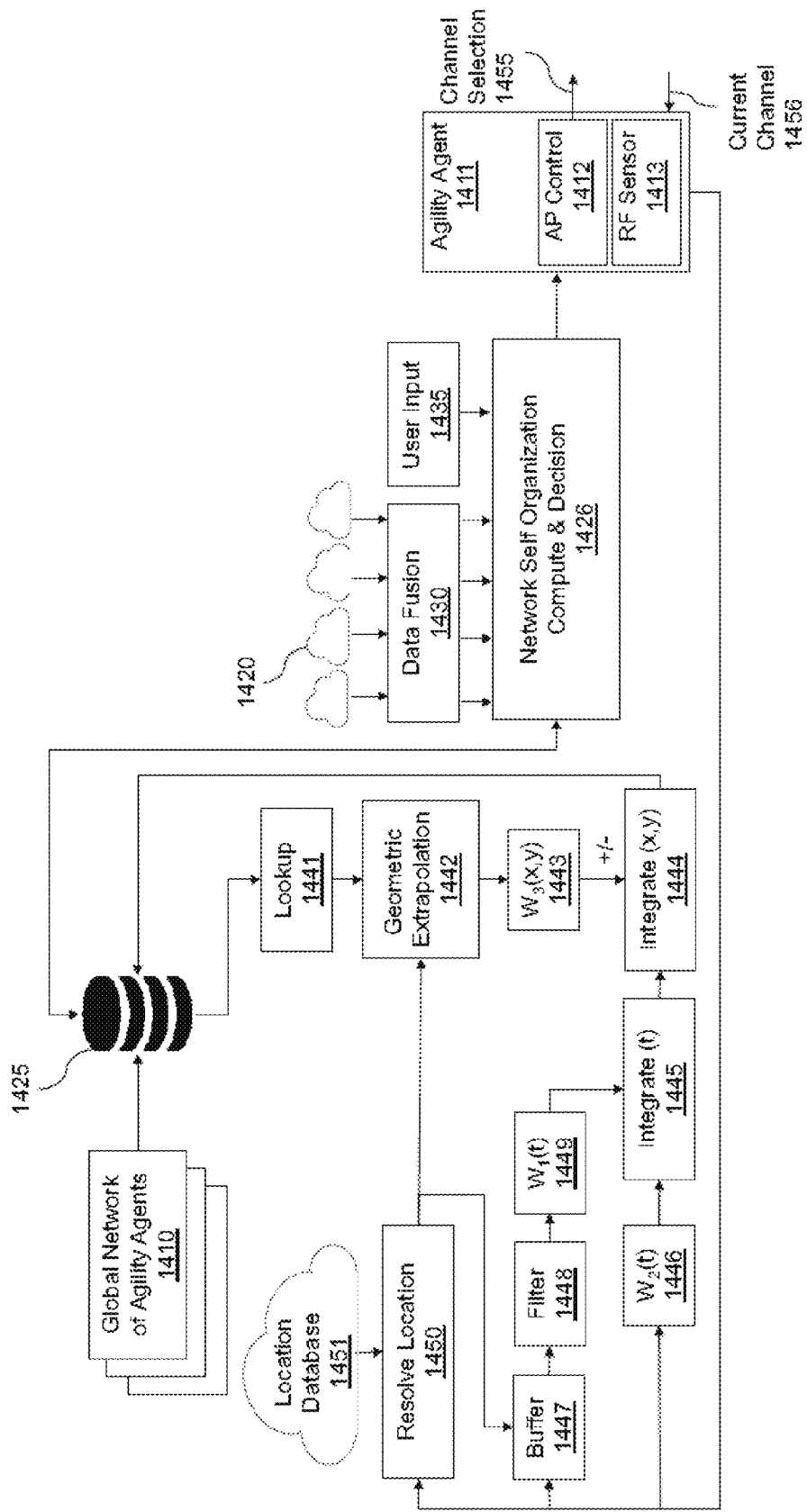
FIG. 14 illustrates in a control loop diagram how the cloud intelligence engine takes the spectrum data from each agility agent, and after storing and filtering the data, combines it with similar data from a plurality of other agility agents and cloud data from other sources.

FIG. 14 illustrates in a control loop diagram how the cloud intelligence engine takes the spectrum data (radar lists and patterns, whitelists, blacklists, RSSI, noise floor, nearest neighbors, congestion & traffic signatures, etc.) from a network of agility agents (e.g., each of the global network of agility agents 1410), and after storing (in storage 1425) and filtering the data, combines them with similar data from an agility agent 1411, cloud data 1420 from other sources (such as the GIS, FCC, FAA, DoD, NOAA, etc.), and user input 1435. Then applying the data to the network self-organization compute process 1426, the control loop performs optimum dynamic channel selection 1455 for each of the 802.11 a/n/ac access points or LTE-U small cell base stations in the network(s) and under control of the system embodied by this invention. In this way, the cloud intelligence engine tells the agility agent 1411 to change to the selected channel 1455 for the access point (using access point control 1412) from the current channel 1456 (the channel previously used by the access point). In contrast, conventional access points and small cell base stations behave as open control loops with limited single-source sensor input and without the benefit of the cloud intelligence engine to close the control loop.

Information (including spectral and location information) from the agility agent 1411 is used with information from a location database 1451 to resolve the location 1450 of the agility agent 1411 and the 802.11 a/n/ac access points or LTE-U small cell base stations in the network(s) and under control of the agility agent 1411. The lookup 1441 accesses stored data from the agility agents 1410. This information can be combined with the information from the resolve location step 1450 for geometric extrapolation 1442 of spectral conditions applicable for agility agent 1411 and the 802.11 a/n/ac access points or LTE-U small cell base stations in the network(s) and under control of the agility agent 1411.

As illustrated in FIG. 14, the control loop includes time integration of data 1445 from the agility agents 1411, spatial integration of data 1444 from the agility agents 1411, and fusion 1430 with data from other sources and user input 1435 to make an operating channel selection 1455 for agility agent 1411. As shown, the control loop also may include buffers 1447, 1449 (temporal), 1443 (spatial), 1446 (temporal) and filters 1448 as needed. The other agility agents 1410 may also have their own control loops similar to that illustrated in FIG. 14.

As previously discussed, the agility agent transmits information to the cloud intelligence engine including information about the detected radar pattern including signal strength, type of radar, and a time stamp for the detection. The type of radar detected includes information such as burst duration, number of bursts, pulses per burst, burst period, scan pattern, pulse repetition rate and interval, pulse width, chirp width, beam width, scan rate, pulse rise and fall times, frequency modulation, frequency hopping rate, hopping sequence length, and pulses per hop. The cloud intelligence engine uses this information to improve its false detection algorithms. For example, if an agility agent detects a particular radar type that it knows cannot be present in a certain location, the cloud intelligence engine can use that information in it probability algorithm for assessing the validity of that signal. The agility agent may transmit information to the cloud intelligence engine via an access point or via a client device as shown in FIG. 2.

Because the cloud intelligence engine has location information for the attached radar sensors, when the cloud intelligence engine receives a radar detection signal from one sensor, the cloud intelligence engine may use the location information for that sensor to verify the signal. The cloud intelligence engine may determine nearby sensors in the vicinity of the first sensor that detected the radar signal and search for the whitelist/blacklist channel history in the other sensors, and if the nearby sensors have current and sufficient information, the cloud intelligence engine may validate or invalidate the original radar detection from the first sensor.

Alternatively, the cloud intelligence engine or the first sensor may instruct nearby sensors (either through the cloud or locally) to focus on the detected channel and report their whitelist and blacklist back to the cloud. If the nearby sensors have current and sufficient information, the cloud intelligence engine may validate or invalidate the original radar detection from the first sensor. Further, based on the location information for the first sensor, the cloud intelligence engine may direct other nearby sensors to modify their scan times or characteristics or signal processing to better detect the signal detected by the first sensor.

Figure 15A:
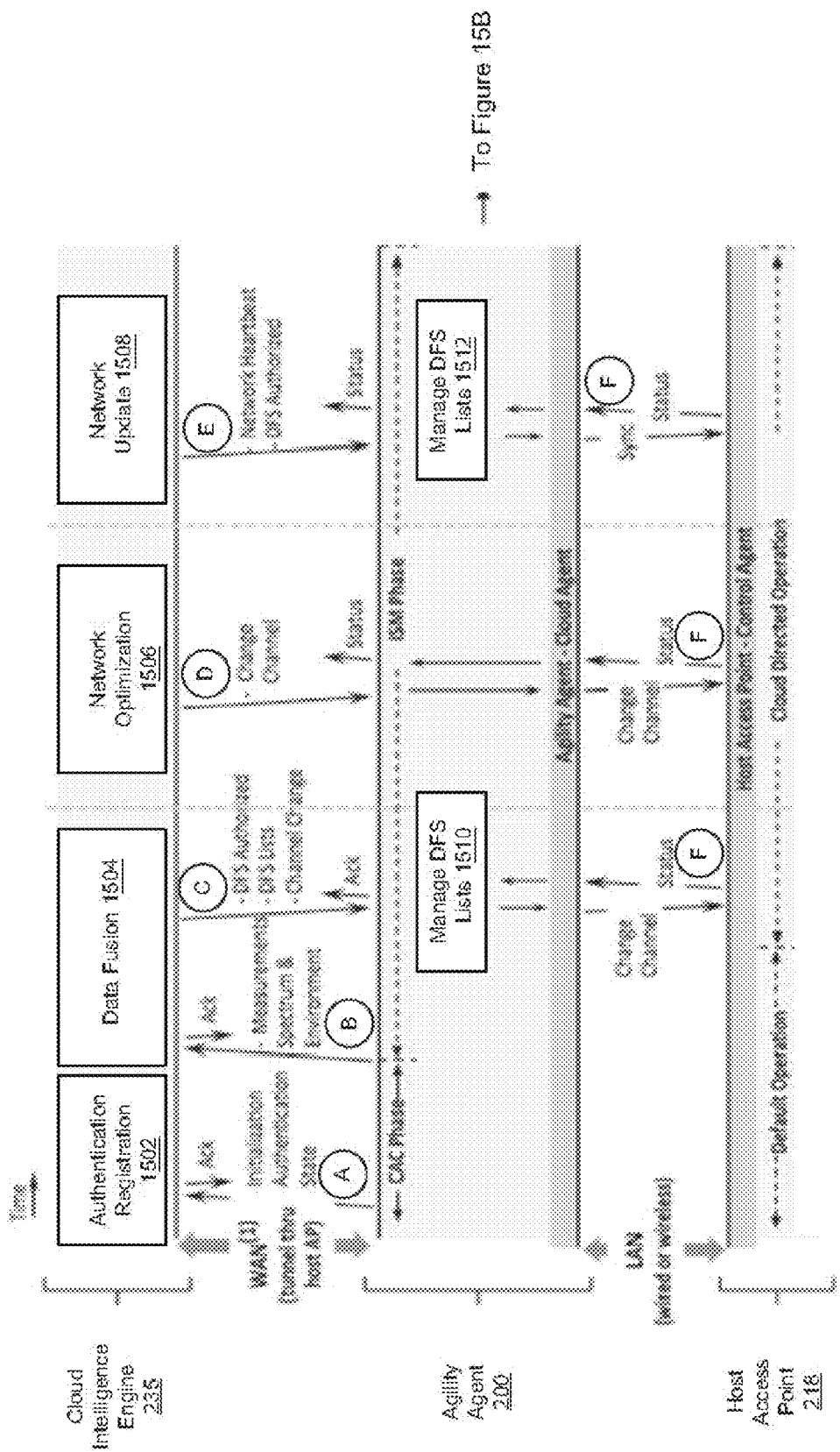
FIGS. 15A and 15B illustrates the logical interface between the wireless agility agent, the cloud intelligence engine, and an access point (or similarly a small cell LTE-U base station).
Figure 15B:
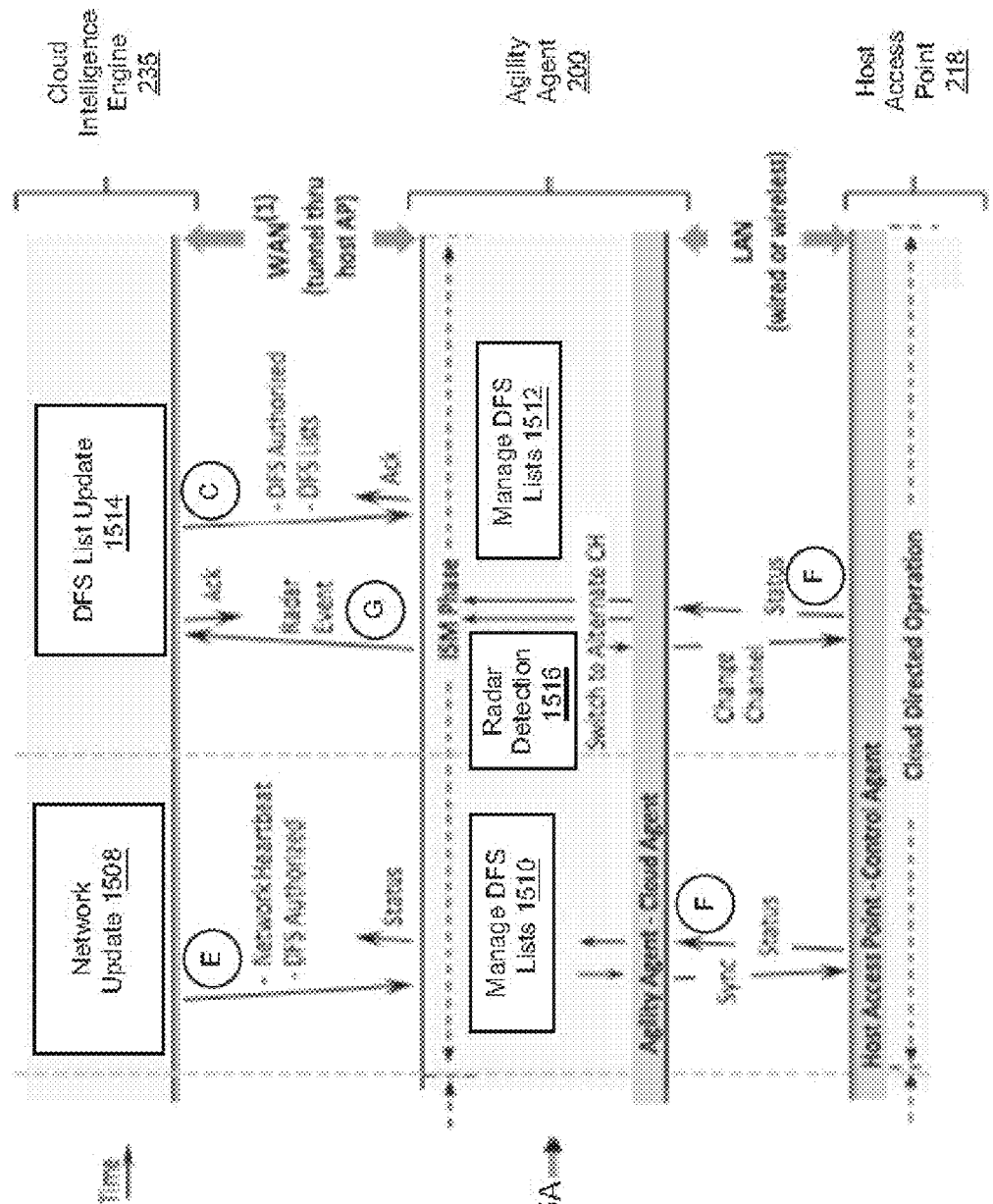

FIGS. 15A and 15B illustrates the logical interface between the wireless agility agent, the cloud intelligence engine, and an access point (or similarly a small cell LTE-U base station). In particular this FIG. illustrates examples of the signaling and messages that can be exchanged between the agility agent and the cloud intelligence engine, and between the cloud intelligence engine and an access point (via the agility agent) during the phases of DFS scan operations, In-Service Monitoring (ISM) and when a radar event occurs forcing a channel change.

FIG. 15A illustrates an interface between the cloud intelligence engine 235, the agility agent 200 and the host access point 218, in accordance with the present invention. For example, signaling and/or messages may be exchanged between the cloud intelligence engine 235 and the agility agent 200. The signaling and/or messages between the cloud intelligence engine 235 and the agility agent 200 may be exchanged during a DFS scan operation, during an ISM operation and/or when a radar event occurs that results in changing of a radio channel. In an aspect, the signaling and/or messages between the cloud intelligence engine 235 and the agility agent 200 may be exchanged via a WAN (e.g., WAN 234) and/or a secure communication tunnel.

An authentication registration process 1502 of the cloud intelligence engine 235 may be associated with a message A. The message A may be exchanged between the cloud intelligence engine 235 and the agility agent 200. Furthermore, the message A may be associated with one or more signaling operations and/or one or more messages. The message A may facilitate an initialization and/or authentication of the agility agent 200. For example, the message may include information associated with the agility agent 200 such as, but not limited to, a unit identity, a certification associated with the agility agent 200, a nearest neighbors scan list associated with a set of other agility agents within a certain distance from the agility agent 200, service set identifiers, a received signal strength indicator associated with the agility agent 200 and/or the host access point 218, a maker identification associated with the host access point 218, a measured location (e.g., a global positioning system location) associated with the agility agent 200 and/or the host access point 218, a derived location associated with the agility agent 200 and/or the host access point 218 (e.g., derived via a nearby AP or a nearby client), time information, current channel information, status information and/or other information associated with the agility agent 200 and/or the host access point 218. In one example, the message A can be associated with a channel availability check phase.

A data fusion process 1504 of the cloud intelligence engine 235 may facilitate computation of a location associated with the agility agent 200 and/or the host access point 218. Additionally or alternatively, the data fusion process 1504 of the cloud intelligence engine 235 may facilitate computation of a set of DFS channel lists. The data fusion process 1504 may be associated with a message B and/or a message C. The message B and/or the message C may be exchanged between the cloud intelligence engine 235 and the agility agent 200. Furthermore, the message B and/or the message C may be associated with one or more signaling operations and/or one or more messages. The message B may be associated with spectral measurement and/or environmental measurements associated with the agility agent 200. For example, the message B may include information such as, but not limited to, a scanned DFS white list, a scanned DFS black list, scan measurements, scan statistics, congestion information, traffic count information, time information, status information and/or other measurement information associated with the agility agent 200. The message C may be associated with an authorized DFS, DFS lists and/or channel change. For example, the message C may include information such as, but not limited to, a directed (e.g., approved) DFS white list, a directed (e.g., approved) DFS black list, a current time, a list valid time, a computed location associated with the agility agent 200 and/or the host access point 218, a network heartbeat and/or other information associated with a channel and/or a dynamic frequency selection.

A network optimization process 1506 of the cloud intelligence engine 235 may facilitate optimization of a network topology associated with the agility agent 200. The network optimization process 1506 may be associated with a message D. The message D may be exchanged between the cloud intelligence engine 235 and the agility agent 200. Furthermore, the message D may be associated with one or more signaling operations and/or one or more messages. The message D may be associated with a change in a radio channel. For example, the message D may be associated with a radio channel for the host access point 218 in communication with the agility agent 200. The message D can include information such as, but not limited to, a radio channel (e.g., a command to switch to a particular radio channel), a valid time of a list, a network heartbeat and/or other information for optimizing a network topology.

A network update process 1508 of the cloud intelligence engine 235 may facilitate an update for a network topology associated with the agility agent 200. The network update process 1508 may be associated with a message E. The message E may be exchanged between the cloud intelligence engine 235 and the agility agent 200. Furthermore, the message E may be associated with one or more signaling operations and/or one or more messages. The message E may be associated with a network heartbeat and/or a DFS authorization. For example, the message E may include information such as, but not limited to, a nearest neighbors scan list associated with a set of other agility agents within a certain distance from the agility agent 200, service set identifiers, a received signal strength indicator associated with the agility agent 200 and/or the host access point 218, a maker identification associated with the host access point 218, a measured location update (e.g., a global positioning system location update) associated with the agility agent 200 and/or the host access point 218, a derived location update (e.g., derived via a nearby AP or a nearby client) associated with the agility agent 200 and/or the host access point 218, time information, current channel information, status information and/or other information. In one example, the message B, the message C, the message D and/or the message E can be associated with an ISM phase.

A manage DFS lists process 1510 of the agility agent 200 may facilitate storage and/or updates of DFS lists. The manage DFS lists process 1510 may be associated with a message F. The message F may be exchanged between the agility agent 200 and the host access point 218. In one example, the message F may be exchanged via a local area network (e.g., a wired local area network and/or a wireless local area network). Furthermore, the message F may be associated with one or more signaling operations and/or one or more messages. The message F may facilitate a change in a radio channel for the host access point 218. For example, the message F may include information such as, but not limited to, a nearest neighbors scan list associated with a set of other agility agents within a certain distance from the agility agent 200, service set identifiers, a received signal strength indicator associated with the agility agent 200 and/or the host access point 218, a maker identification associated with the host access point 218, a measured location update (e.g., a global positioning system location update) associated with the agility agent 200 and/or the host access point 218, a derived location update (e.g., derived via a nearby AP or a nearby client) associated with the agility agent 200 and/or the host access point 218, time information, current channel information, status information and/or other information. In one example, the message F may be associated with a cloud directed operation (e.g., a cloud directed operation where DFS channels are enabled).

FIG. 15B also illustrates an interface between the cloud intelligence engine 235, the agility agent 200 and the host access point 218, in accordance with the present invention. For example, FIG. 15B may provide further details in connection with FIG. 15A. As shown in FIG. 15B, signaling and/or messages may be exchanged between the cloud intelligence engine 235 and the agility agent 200. The signaling and/or messages between the cloud intelligence engine 235 and the agility agent 200 may be exchanged during a DFS scan operation, during ISM and/or when a radar event occurs that results in changing of a radio channel. In an aspect, the signaling and/or messages between the cloud intelligence engine 235 and the agility agent 200 may be exchanged via a WAN (e.g., WAN 234) and/or a secure communication tunnel.

As also shown in FIG. 15B, the network update process 1508 of the cloud intelligence engine 235 may facilitate an update for a network topology associated with the agility agent 200. The network update process 1508 may be associated with the message E. Then, a DFS list update process 1514 of the cloud intelligence engine 235 may facilitate an update to one or more DFS channel lists. The DFS list update process 1514 may be associated with a message G. The message G may be exchanged between the cloud intelligence engine 235 and the agility agent 200. In one example, the message G may be exchanged via a WAN (e.g., WAN 234) and/or a secure communication tunnel. Furthermore, the message G may be associated with one or more signaling operations and/or one or more messages. The message G may be associated with a radar event. For example, the message G may signal a radar event. Additionally or alternatively, the message G may include information associated with a radar event. For example, the message G may include information such as, but not limited to, a radar measurement channel, a radar measurement pattern, a time associated with a radar event, a status associated with a radar event, other information associated with a radar event, etc. The radar event may associated with one or more channels from a plurality of 5 GHz communication channels (e.g., a plurality of 5 GHz communication channels associated with the 5 GHz Wi-Fi spectrum 101). In one example, the message G can be associated with an ISM phase. The DFS list update process 1514 may also be associated with the message C.

Moreover, as also shown in FIG. 15B, the manage DFS lists process 1510 may be associated with the message F. The message F may be exchanged between the agility agent 200 and the host access point 218. A radar detection process 1516 of the agility agent 200 may detect and/or generate the radar event. Additionally, the radar detection process 1516 may notify the host access point 218 to change a radio channel (e.g., switch to an alternate radio channel). The message F and/or a manage DFS lists process 1512 may be updated accordingly in response to the change in the radio channel. In an aspect, signaling and/or messages may be exchanged between the cloud intelligence engine 235 and the host access point 218 during a DFS scan operation, during an ISM operation and/or when a radar event occurs that results in changing of a radio channel for the host access point 218.

In addition to traditional infrastructure network topologies (e.g., host Access point and clients and peer-to-peer networks or Wi-Fi-Direct), the present inventions apply to extended infrastructure network topologies (e.g., mesh networks). For example, the host access points discussed herein could be a mesh peer participating in a mesh network and simultaneously providing infrastructure connectivity.

Figure 16A:
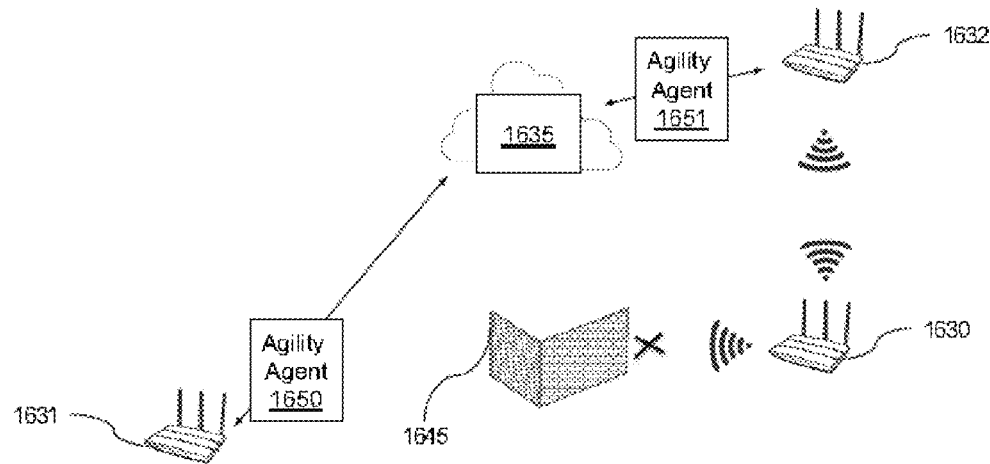
FIG. 16A illustrates the hidden node problem where an access points or small cell base station is hidden from view of other access points or small cell base stations by topography, obstruction, distance or channel conditions.

FIG. 16A illustrates the hidden node problem where an access points or small cell base station 1630 is hidden from view of other access points or small cell base stations 1631 by topography, obstruction, distance or channel conditions 1645. The hidden node problem is a particularly difficult issue with mesh networks or peer-to-peer sessions where these access points are communicating with each other; the hidden node 1630 may not detect the frame and would be unable to synchronize its network allocation vector (NAV). With this impairment the hidden node 1630 transmissions can potentially collide and interfere with communications between the other two nodes 1631, 1632. As shown in FIG. 16A, the agility agent 1650 reports scan lists to the cloud intelligence engine 1635 but cannot detect the hidden node 1630. Accordingly, the agility agent 1650 does not report the hidden node 1630 to the cloud intelligence engine 1635 in the reported scan lists. Agility agents 1651 associated with access points 1632 in neighboring networks also report scan lists to the cloud intelligence engine 1635. Because the hidden node 1630 may be detected by these agility agents 1651, the reported scan lists include the hidden node 1630. The cloud intelligence engine 1635 collects scan lists, from all agility agents 1650, 1651 including geographic information about the agility agents 1650, 1651. The cloud intelligence engine 1635 then determines the presence of the hidden node 1630 and reports the presence of the hidden node 1630 to agility agents 1650, 1651.

Figure 16B:
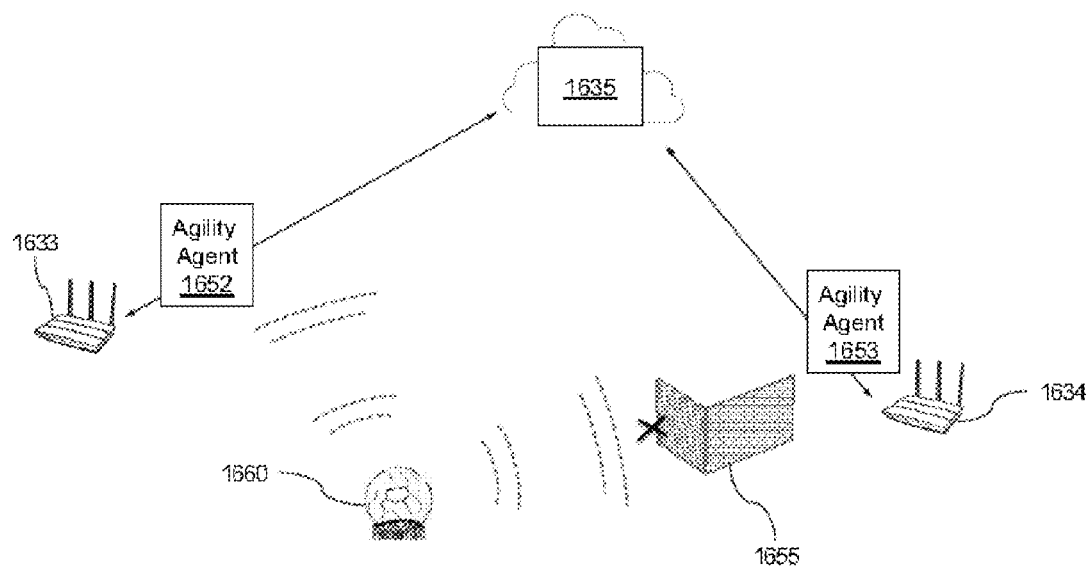
FIG. 16B illustrates the hidden radar problem, where a radar emitter is unseen by an agility agent due to topography or obstruction.

FIG. 16B illustrates the hidden radar problem, where a radar emitter 1660 is unseen by an agility agent 1653 due to topography or obstruction 1655. The hidden radar problem is a very serious concern of the FCC (and other regulators) because agility agent 1653 acting as a DFS master device for access points 1634 but not seeing the hidden radar 1660 may cause unintended interference. Agility agents 1652 near exposed nodes 1633 detect radar from a radar emitter 1660 and report to the cloud intelligence engine 1635 via an uplink back list message for example. The cloud intelligence engine 1635 informs agility agents 1653 near hidden nodes 1634 of the radar via a downlink black list message for example.

Figure 16C:
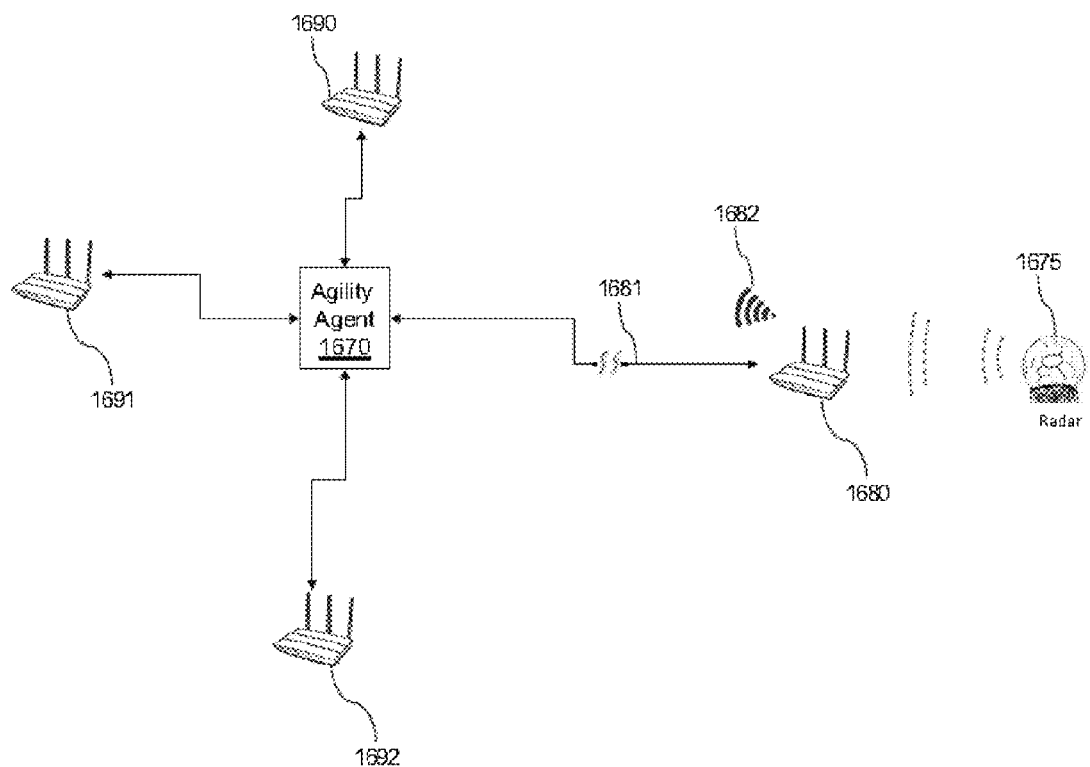
FIG. 16C illustrates the hidden radar problem where a radar emitter is unseen by an agility agent due to distance.

In some embodiments, an agility agent may be linked to multiple host access points. In one such possible configuration, a significant issue arises when the networking connection between the agility agent and an access point over Ethernet is long. FIG. 16C illustrates the hidden radar problem where a radar emitter is unseen by an agility agent due to distance. Networked nodes 1690, 1691, 1692 are far from a radar emitter 1675 and therefore do not detect the presence of radar signals. The nodes 1690, 1691, 1692 communicate this information to the agility agent 1670. The agility agent 1670 causes corresponding white lists and black lists to be broadcast wirelessly and over wired connections. A hidden node 1680 receives the lists from the agility agent 1670 but is in the presence of radar from the radar emitter 1675. The hidden node 1680 is separated from the agility agent 1670 by a long distance and is connected to the agility agent by a very long Ethernet connection 1681 for example.

Because the hidden node 1680 is distant from the agility agent 1670, its signature 1682 is not on the agility agent's 1670 scan list. Also, because the hidden node 1680 is too distant from the agility agent 1670, the hidden node 1680 cannot receive the wireless white list and/or black list from the agility agent 1670 or the time stamps of the wireless lists do not match those received via Ethernet when received by the hidden node 1680. To solve this problem, the white lists and/or black lists broadcast over wired Ethernet must match with the lists and timing broadcast over wireless in order for the node 1680 to use DFS channels. Also, the agility agent 1670 may broadcast list of authorized access points (e.g., 1690, 1691, 1692), and the control agent in the access point must see its SSID in the authorization list in order to use DFS channels. The agility agent 1670 only authorizes access points (e.g., 1690, 1691, 1692) which it sees by scan list and above a certain RSSI threshold. Access points 1680 who are not seen or have RSSI too low are deemed too far to use the agility agent's 1670 white list.

FIGS. 16A-C illustrate how a cloud intelligence engine collecting data from a plurality of wireless agility agents proximal to the hidden node or hidden radar is able to discover the said hidden node or hidden radar. Any access point or small cell base station that is now aware that there is a hidden node to another access point on the same channel can now react to the node being hidden, and similarly any (and all) access points or small cells within probable range of a radar signal, even though hidden to some of the nodes, could be directly prevented from using a radar-occupied channel.

In one embodiment of a system using a cloud DFS super master, the cloud DFS super master receives information from a plurality of agility agents and/or access points. Additionally, because the cloud DFS super master provides the DFS channel information for client devices, some agility agents and access points will no longer need to transmit a beacon identifying available channels. In this situation, the system using a cloud DFS super master may include sensors that are radar detectors that perform the radar-sensing function of the agility agent described herein but do not transmit a beacon to identify the available channels.

The cloud DFS super master may provide the DFS super master function for a region for which the cloud DFS super master has sufficient information. For example, if agility agents and/or radar detecting sensors are distributed with a sufficient density in a given locality and the cloud DFS super master has received enough information for enough time for the locality to determine the radar signal signature for the locality with enough certainty to comply with FCC or other applicable requirements, the cloud DFS super master may provide DFS master services for devices located in the locality.

With a cloud DFS super master system, traditional DFS masters and agility agents can be eliminated or operate as sensors that continue to do radar detection, but do not tell client devices what channels to use. In this system, client devices do not have to look for a beacon, but instead can query the cloud DFS super master to determine what channels are available to use.

This cloud DFS super master systems solve several problems inherent to prior-art DFS master systems. For example, the cloud DFS super master system may receive information from external sources (such as topographic and map information from GIS servers, FCC databases, NOAA databases, DoD databases) that the cloud DFS super master uses to geo-fence an area from DFS communications in one or more channels. In one example, the DoD instructs the cloud DFS super master to prevent communications in the DFS spectrum in a given area for a time period. The cloud DFS super master system would instruct client devices not to use the DFS spectrum when the devices are in that area. In another example, the cloud DFS super master is programmed to receive a request to vacate one or more 5 GHz radio channels from a priority user. A priority user can be a radar producer that includes a system of a radar producing entity such as an airport or military body, or the priority user can be a government or emergency entity that needs priority access to the DFS spectrum. In this example, the cloud DFS super master is also programmed to transmit a message to the client devices within the affected areas of the request instructing the client devices to vacate the 5 GHz radio channels in response to the request from the priority user. Using this system, an airplane or airport could request the cloud DFS super master to block out a 5 GHz channel along its route as it is taking off. In another embodiment, the request to vacate one or more 5 GHz radio channels could come from governmental, regulatory, or emergency systems. For example, an ambulance or other emergency vehicle can send real time requests to the cloud DFS super master to block out a 5 GHz channel along its route in order to optimize communications for the emergency vehicle. Current beaconing systems cannot efficiently solve this problem unlike the disclosed cloud DFS super master. The cloud DFS super master can further receive and use location information for the priority user to dynamically change the area in which the DFS super master instructs devices to vacate the channel(s) requested by the priority user. This allows the DFS super master to geo-fence a limited area to maximize the availability of the DFS channels to other devices while still complying with the request to vacate from the priority user.

Additionally, the cloud DFS super master systems addresses current limitations of use of the DFS spectrum. Currently, many DFS master devices are private access points that only provide access to the DFS spectrum to member client devices. Accordingly, most users in the area cannot utilize the available DFS spectrum because they are not members of the group with access to the access point acting as the DFS master. In this situation, even though the DFS spectrum is unlicensed and generally available to the public for use, only a select group with access to the private access point can use the DFS spectrum. The cloud DFS super master addresses this inefficiency by providing DFS channel availability information directly to client devices in any area for which the cloud DFS super master has sufficient spectral information.

Further, the cloud DFS super master systems addresses problems with proliferation of LTE-U devices and interoperability of LTE-U devices and Wi-Fi devices. LTE-U devices use the same bands as Wi-Fi devices. However, Wi-Fi devices cannot detect LTE-U devices, and LTE-U devices cannot detect Wi-Fi devices. Consequentially, signals from LTE-U and proximate Wi-Fi devices collide and interfere with each other. The cloud DFS super master can control the timing and frequencies used by connected devices. And because the cloud DFS super master can see all of the client devices—including LTE-U and Wi-Fi devices—the cloud DFS super master can coordinate traffic to mitigate collisions for, by example, making sure that two devices in the same area are not on the same channel. The cloud DFS super master addresses the issue of proximate LTE-U and Wi-Fi devices without a need for the LTE-U and Wi-Fi devices to talk to each other.

Also, as discussed above, the cloud DFS super master solves the hidden node issue. And the cloud DFS super master can coordinate traffic among client devices.

In one embodiment of the cloud DFS super master system, the cloud DFS super master is connected to an access point that receives channel selection information from the cloud DFS super master (such as a whitelist or blacklist) and transmits beacons according to the received channel selection information. In this case the cloud DFS super master still controls the channel selection for the access point.

Figure 17:
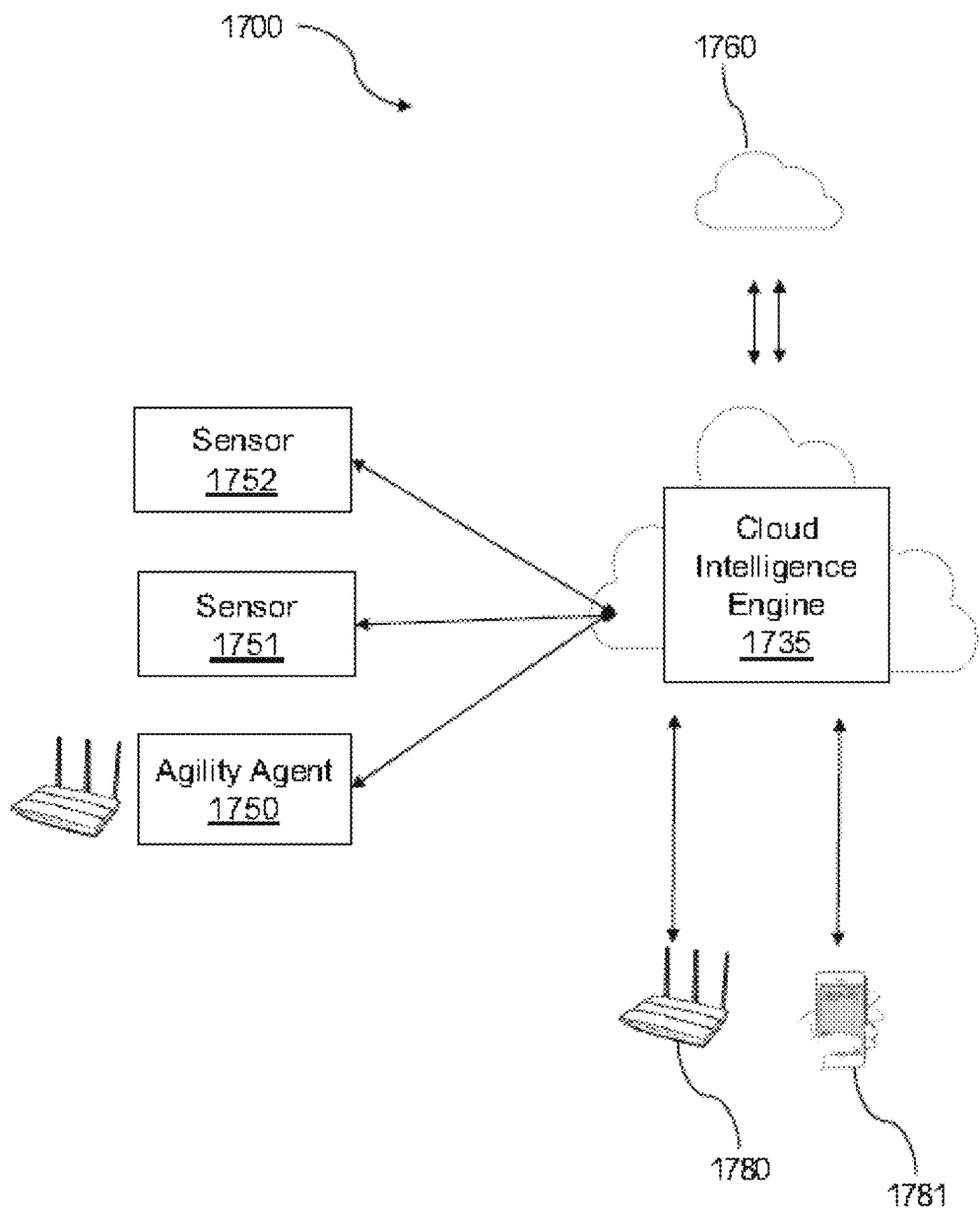
FIG. 17 illustrates an exemplary embodiment of the cloud DFS super master system in which the cloud DFS super master is communicatively coupled to a plurality of sensors that detect radar signals in the DFS band and detect wireless traffic information and is communicatively coupled to one or more client devices.

FIG. 17 illustrates an exemplary embodiment of the cloud DFS super master system 1700 in which the cloud intelligence engine 1735 operates as a cloud DFS super master. In the system 1700, the cloud DFS super master 1735 is communicatively coupled to a plurality of sensors 1750, 1751, 1752 that detect radar signals in the DFS band and detect wireless traffic information. The plurality of sensors 1750, 1751, 1752 may be in agility agents or may be standalone sensors. In one example, the standalone sensor includes a power supply and is self-contained in an enclosure and comprises a self-contained plug-in device. The sensors' communication with the cloud DFS super master 1735 may be continuous or intermittent. The sensors transmit information about detected radar signals, traffic information, and geo-location information for the sensor to the cloud DFS super master 1735. The cloud DFS super master 1735 may also be connected to external data sources 1760 such as topographic and map information from GIS servers, FCC databases, NOAA databases, DoD databases. The cloud DFS super master 1735 uses the information from the sensors 1750, 1751, 1752 and the external databases 1760 to determine available DFS channels for the areas for which the cloud DFS super master has sufficient information. Then as shown in FIG. 17, client devices 1780, 1781 then connect to the cloud DFS super master 1735 to request authorized DFS channels according to the location of the client devices 1780, 1781. The client devices 1780, 1781 transmit geo-location information to the cloud DFS super master 1735 so that the cloud DFS super master 1735 can determine the appropriate channels based on that location information.

In one embodiment, the cloud DFS super master system is a system for detecting radar signals and avoiding interference with the radar signals that includes a cloud DFS super master, a plurality of radar detectors, and at least one client device. The plurality of radar detectors (or radar sensors) are communicatively coupled to the cloud DFS super master and programmed to scan for a radar signal in each of a plurality of 5 GHz radio channels, to transmit the results of the scan for the radar signal to the cloud DFS super master, and to transmit geo-location information for each of the plurality of radar detectors to the cloud DFS super master. The client device (or client devices) is communicatively coupled to the cloud DFS super master and programmed to transmit geo-location information for the client device and a request for available 5 GHz radio channels to the cloud DFS super master. The cloud DFS super master is programmed to receive the results of the scan for the radar signal from each of the plurality of radar detectors, the geo-location information for the plurality of radar detectors, the geo-location information for the client device and the request for available 5 GHz radio channels and is programmed to determine one or more 5 GHz radio channels that are free of radar signals within a distance of the client device from the results of the scan for the radar signal from each of the plurality of radar detectors, the geo-location information for the plurality of radar detectors, and the geo-location information for the client device and to transmit the one or more 5 GHz radio channels that are free of radar signals within a distance of the client device to the client device.

In another embodiment, the cloud DFS super master is programmed to receive information from an external data source and is programmed to determine which of the one or more 5 GHz radio channels that are free of radar signals within a distance of the client device from the information from the external data source and the results of the scan for the radar signal from each of the plurality of radar detectors, the geo-location information for the plurality of radar detectors, and the geo-location information for the client device. The external data source can be a GIS, an FAA radar database, a DoD radar database, an FCC database, or a NOAA database for example.

Along with radar detection information, the plurality of radar detectors may be programmed to transmit wireless spectrum information (such as traffic, congestion, channels used by proximate access points) to the cloud DFS super master and the cloud DFS super master is programmed to coordinate transmissions of the client device. This way, the cloud DFS super master can coordinate traffic for several devices including access points to reduce congestion and collisions from using the same channel at the same time. The cloud DFS super master may apply time division and/or frequency division coordination to improve the client devices' performance.

In addition to various drawbacks identified above regarding conventional systems and methods, it can be appreciated that current devices such as wireless access points are typically shipped with the intended country of operation and/or regulatory domain embedded in a device non-volatile memory such as a flash memory, electrically erasable programmable read-only memory, (EEPROM), etc. For example, conventional wireless access points are preprogrammed or hardcoded in the flash memory with an intended country of operation country code at the factory, which can be used to determine a regulatory operating mode or regulatory domain in which the devices will be operated. Thus, this fixed country code locks the product to a fixed stock-keeping unit (SKU), for which inventory management is complicated by the fact that the product is locked for sale to a specific country or region it was manufactured for, even though the product could support additional regulatory domains if properly configured in the field. As another non-limiting example, if an original equipment manufacturer (OEM) forecast too many units for a particular country, and if a shipment destined for that country can be rerouted, then those units shipped to the rerouted country can be reprogrammed for the new destination country, regulatory operating mode, and/or regulatory domain.

As another non-limiting example, because the U.S. and Canada have enjoyed the same or similar regulatory treatment when it comes to routers (e.g., common operating rules) a single SKU can be shipped the U.S. and/or Canada without complicating warehousing logistics. Although both operate under compatible regulatory domains, recent FCC changes differentiate the U.S. and Canada (e.g., as of June 2015). A device could be configured to operate in both the U.S. and Canada, but if it can be determined with confidence the device is operating in the U.S., more optimal FCC regulatory parameters can be employed, which can provide improved performance in the U.S. even though the unit may have been shipped from a logistics warehouse in Canada. That is, rather than programming the country code for a device at the factory, the country code can be delivered from a cloud based device, system, or service based on a set of factors determined at initial power up.

As a non-limiting example, on power up, a cloud based device, system, or service can employ multiple mechanisms to determine the location of the device, and can facilitate programming the programming the country code or regulatory domain. As non-limiting examples, multiple mechanisms can include neighboring access point scan lists, a wireless fidelity (WiFi) location database, GPS coordinates from an associated and/or authorized device, cellular carrier location data from an associated and/or authorized device, Internet protocol (IP) address reverse lookup, shipping manifest for country of destination, etc., to facilitate determining what country the device is located and/or operating in.

In addition, if a device user moves to another country, the operating mode for a fixed regulatory mode could be incompatible with the new regulatory regime, unless the user is able to have the device adjust the regulatory mode based on their new location, the user can give permission to a cloud service as described herein to adjust settings, etc. As a result, allows users who relocate frequently (e.g., Military) can continue to operate such equipment in a compliant manner while enjoying optimal performance under the proper regulatory regime. This can further reduce generation of e-Waste associated with multiple SKUs for different countries and disposal in the event that the device may no longer be suitable for the existing fixed regulatory regime.

Accordingly, various non-limiting embodiments can employ multiple mechanisms to facilitate determining a device's location. Exemplary devices that can employ one or more exemplary embodiments, in a non-limiting aspect, can comprise a device comprising a radio that can be configured based on the device's location (e.g., country), as determined based on the multiple mechanisms. As a result, further non-limiting implementations as described herein can provide systems, methods, and apparatuses directed to providing or acquiring an exemplary country code identifier or regulatory domain for a non-limiting device operating in a reduced functionality radio frequency (regulatory) mode based on exemplary location factors and exemplary confidence rankings, in non-limiting aspects.

Figure 18:
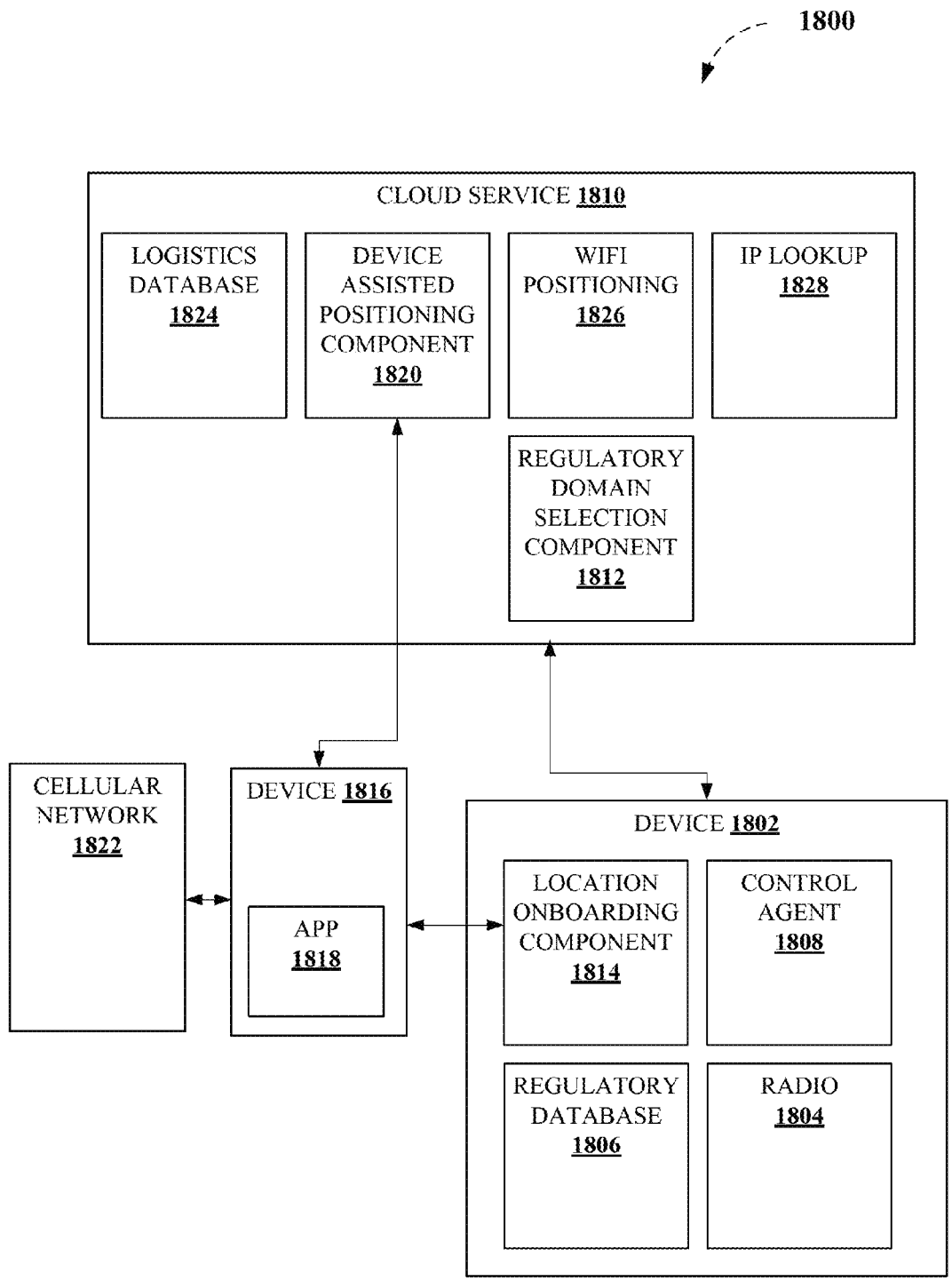
FIG. 18 depicts exemplary systems suitable for incorporation of various aspects directed to providing or acquiring an exemplary country code identifier or regulatory domain for a non-limiting device operating in a reduced functionality radio frequency (regulatory) mode, in a non-limiting aspect.

For example, FIG. 18 depicts exemplary systems 1800 suitable for incorporation of various aspects directed to providing or acquiring an exemplary country code identifier or regulatory domain for a non-limiting device 1802 operating in a reduced functionality radio frequency (regulatory) mode, in a non-limiting aspect. For instance, in a non-limiting aspect, an exemplary system 1800 for providing or acquiring an exemplary country code identifier or regulatory domain for a non-limiting device 1802 operating in a reduced functionality radio frequency (regulatory) mode based on exemplary location factors and exemplary confidence rankings can comprise a device 1802 (e.g., shipped to an end customer comprising a radio 1804 that can be configured to operate in a reduced functionality or worldwide radio frequency (regulatory) mode. In a non-limiting aspect, such mode can provide basic device functionality with a set of restrictive limitations in performance and capability (e.g., as defined by one or more regulatory agencies). Exemplary device 1802 can comprise or be associated with exemplary regulatory database 1806 that can further comprise a set of radio operating parameters for two or more desired regulatory domains defined for the product (e.g., all the desired regulatory domains defined for the product, a subset thereof, etc.). In another non limiting aspect, exemplary device 1802 comprising or associated with exemplary regulatory database 1806 that further comprises a set of radio operating parameters for two or more desired regulatory domains defined for the product (e.g., all the desired regulatory domains defined for the product, a subset thereof, etc.) can enable device 1802 to perform optimally in any number of the desired regulatory domains defined for the product.

In yet another non-limiting aspect, device 1802 can be configured to operate in any of those regulatory domains (e.g., FCC, IC, ETSI, Japan) when properly configured shortly after power on at the final destination. As a non-limiting example, exemplary device 1802 can comprise an exemplary control agent 1808 that can be configured to register with and communicate with an exemplary cloud service 1810, for example, as further described herein, which can comprise, be associated with, and/or be in communication with an exemplary regulatory domain selection component 1812. Exemplary device 1802 can also comprise exemplary hardware, software, and/or other radios to perform device onboarding and location recording tasks via an exemplary location/onboarding component 1814, as further described herein. Exemplary onboarding or location recording can be facilitated via an exemplary location/onboarding component 1814 associated with and/or in communication with an exemplary device 1816 (e.g., mobile device, smart phone, etc.), which can contribute one of the many exemplary location factors in determining an exemplary country code identifier or regulatory domain for exemplary device 1802.

As a non-limiting example, exemplary device 1816 can comprise an exemplary application, app 1818, etc., that can be communicatively coupled to and authorized to configure exemplary device 1802, wherein exemplary device 1816 is in close proximity to exemplary device 1802, and wherein exemplary device 1816 can be configured to transmit a location record to cloud service 1810, or portions thereof, such as device assisted positioning component 1820, regulatory domain selection component 1812, etc. on behalf of exemplary device 1802, based at least in part on exemplary device 1816 being in close proximity to exemplary device 1802 and being authorized to configure exemplary device 1802.

For example, in a non-limiting aspect, exemplary device onboarding can comprise a user using app 1818 on exemplary device 1816 (e.g., mobile device, smart phone, an Android mobile device, an IOS mobile device, another non-mobile device, configurable to facilitate a user employing the app to setup the device to be configured, etc.) to set up exemplary device 1802. As a result of tying or pairing exemplary device 1816 to exemplary device 1802 to allow authorized access to exemplary device 1802 for certain functions (e.g., configuration functions, etc.), and by virtue of close proximity of exemplary device 1816 to exemplary device 1802 (e.g., via close proximity communications, infrared, bluetooth, etc.), a trusted location of exemplary device 1816 can be attributed to exemplary device 1802 and a location record can be transmitted to cloud service 1810, or portions thereof, such as device assisted positioning component 1820, regulatory domain selection component 1812, etc. on behalf of exemplary device 1802. In non-limiting aspects, an exemplary location record can be based on information associated with a global positioning system (GPS), location information associated with a cellular network 1822 communicatively coupled to exemplary device 1816, etc.

In yet another non-limiting aspect, an exemplary cloud service 1810 can be configured to comprise, be associated with, be in communication with, and/or maintain any number of data sources to facilitate providing or acquiring an exemplary country code identifier or regulatory domain for exemplary device 1802. As non-limiting examples, exemplary cloud service 1810 can be configured to comprise, be associated with, be in communication with, and/or maintain an exemplary database of logistics and/or supply chain information 1824, an exemplary WiFi positioning or location service 1826, an exemplary internet protocol geo-location or IP lookup service 1828, and/or an exemplary device assisted positioning component 1820, for example, as further describe herein, and/or other information associated with location suitable to comprise or facilitate inferences about exemplary location factors.

As non-limiting aspects, exemplary database of logistics and/or supply chain information 1824 can be configured to comprise, be associated with, be in communication with, and/or maintain any of device manufacturer, shipping manifest information, location of manufacture, device serial number, device universal unique identifier, OEM assigned number, device destination (e.g., country, city, etc.), device current location (e.g., shipping scan information), and/or combinations thereof, as well as other information to facilitate providing or acquiring an exemplary country code identifier or regulatory domain for exemplary device 1802, and/or ancillary thereto.

In further non-limiting aspects, exemplary WiFi positioning or location service 1826 can employ exemplary information associated with a WiFi network scan such as performed by exemplary device 1802. In another non-limiting aspect, exemplary information associated with a WiFi network scan can comprise a list of devices (not shown), and/or information associated therewith, within WiFi range of exemplary device 1802. In non-limiting embodiments, exemplary information associated with a WiFi network scan can be transmitted to exemplary cloud service 1810 and can be compared with existing location records for the list of devices (not shown), and/or information associated therewith, within WiFi range of exemplary device 1802, and or a subset thereof, via exemplary WiFi positioning or location service 1826. In a non-limiting aspect, exemplary WiFi positioning or location service 1826 can facilitate determining location (e.g., typically within 50-1000 meters) by employing exemplary information associated with a WiFi network scan such as performed by exemplary device 1802. Accordingly, exemplary device 1802, or portions thereof (e.g., control agent 1808, etc.) can be configured to direct or perform a WiFi network scan, and configured to determine a list of devices (not shown) (e.g., wireless access points, etc.), and/or information associated therewith, within WiFi range of exemplary device 1802. It can be understood that such WiFi network scan can be performed by exemplary device 1802 while in a reduced functionality radio frequency mode (e.g., without a determined country code identifier or a regulatory domain) or otherwise.

In further non-limiting embodiments, the exemplary database of logistics and/or supply chain information 1824, an exemplary WiFi positioning or location service 1826, an exemplary internet protocol geo-location or IP lookup service 1828, and/or an exemplary device assisted positioning component 1820, and so on can comprise a number of location factors, which can be employed (e.g., via regulatory domain selection component 1812, etc. on behalf of exemplary device 1802) to determine a country code identifier and/or a regulatory domain for exemplary device 1802, according to an exemplary regulatory domain selection algorithm.

Accordingly, such exemplary databases and/or services can be represented and/or employed as weighted factors in determining and/or inferring geographic location of exemplary device 1802, based in part on such determinations and/or inferences, which can facilitate inferring the regulatory domain of exemplary device 1802 at a particular moment in time, to facilitate providing or acquiring an exemplary country code identifier or regulatory domain for exemplary device 1802, for example, as further described herein.

Figure 19:
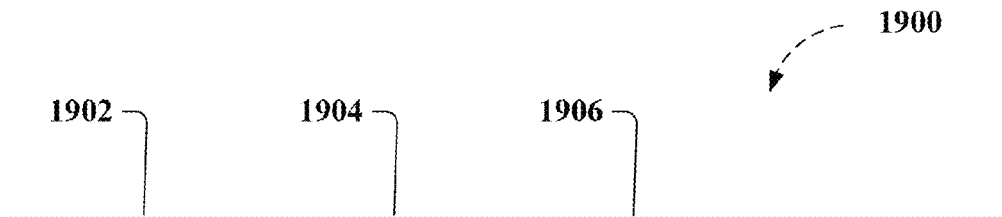
FIG. 19 tabulates exemplary location factors and exemplary confidence rankings suitable for use in determining an exemplary country code identifier or regulatory domain for a non-limiting device operating in a reduced functionality radio frequency (regulatory) mode, in a further non-limiting aspect.

FIG. 19 tabulates exemplary location factors 1902 and exemplary confidence rankings 1904 suitable for use in determining an exemplary country code identifier or regulatory domain for a non-limiting device 1802 operating in a reduced functionality radio frequency (regulatory) mode, in a further non-limiting aspect. As a non-limiting example, the exemplary location factors 1902 associated with exemplary database of logistics and/or supply chain information 1824, an exemplary WiFi positioning or location service 1826, an exemplary internet protocol geo-location or IP lookup service 1828, and/or an exemplary device assisted positioning component 1820, and so on, can be ranked or weighted according to trustworthiness or confidence in the location factor, and exemplary regulatory domain selection component 1812 can be configured to perform an exemplary regulatory domain selection algorithm to weigh exemplary location factors 1902, based at least in part on a determined reliability or reason 1906 respectively associated with the exemplary location factors 1902, and exemplary regulatory domain selection component 1812 can be configured to determine the country code or the regulatory domain for exemplary device 1802 and an overall confidence of the country code or the regulatory domain for exemplary device 1802.

Figure 20:
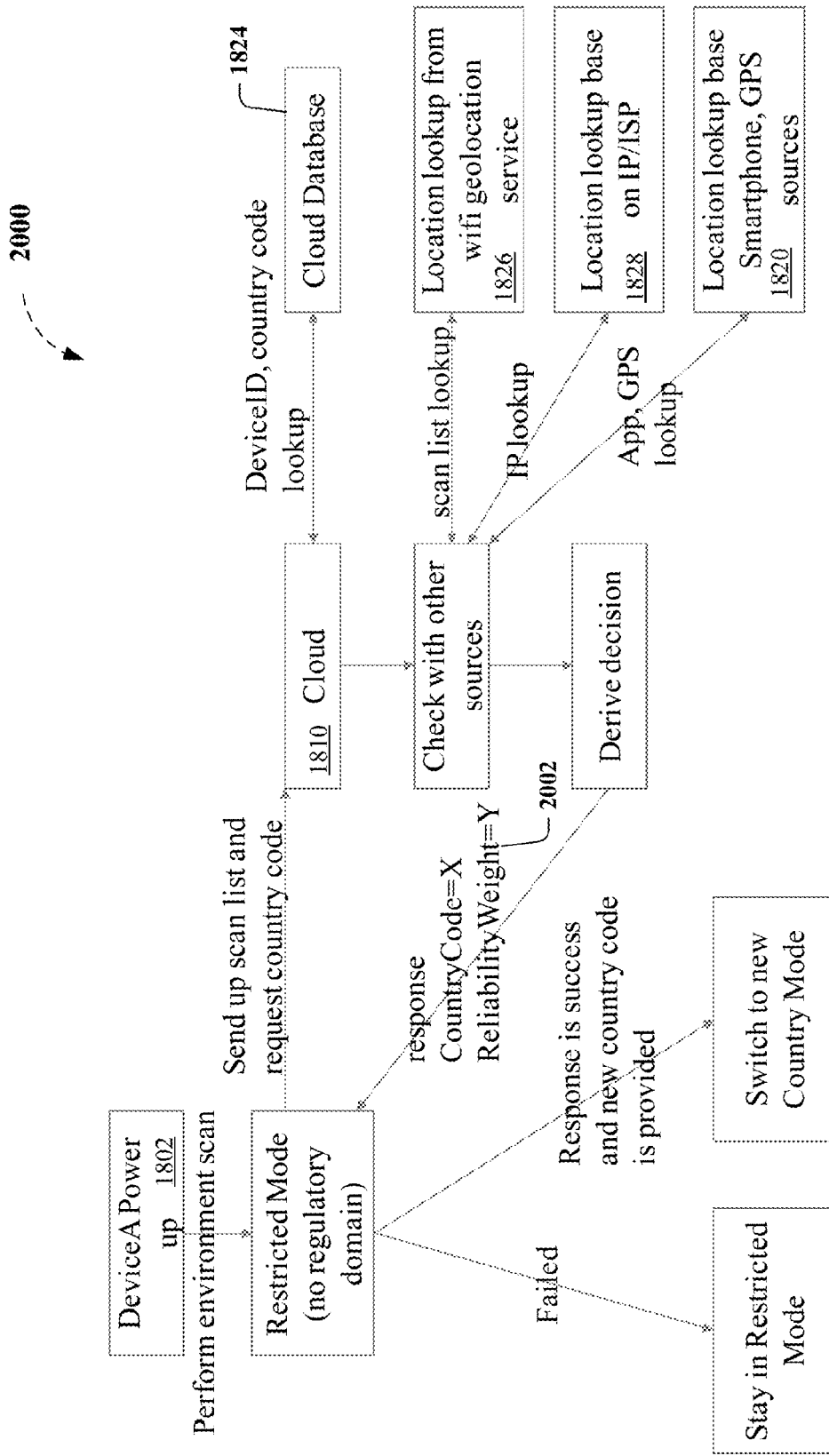
FIG. 20 depicts an exemplary functional block diagram depicting exemplary systems and methods directed to providing or acquiring an exemplary country code identifier or regulatory domain for a non-limiting device operating in a reduced functionality radio frequency (regulatory) mode based on exemplary location factors and exemplary confidence rankings, in a non-limiting aspect.

FIG. 20 depicts an exemplary functional block diagram 2000 depicting exemplary systems and methods directed to providing or acquiring an exemplary country code identifier or regulatory domain for a non-limiting device 1802 operating in a reduced functionality radio frequency (regulatory) mode based on exemplary location factors 1902 and exemplary confidence rankings 1904, in a non-limiting aspect. As a non-limiting example, exemplary steps that facilitate providing or acquiring an exemplary country code identifier or regulatory domain for a non-limiting device 1802 can comprise one or more of the following steps, which can be further understood with reference to FIGS. 20-24

Exemplary control agent 1808 can be configured to notify exemplary cloud service 1810 of its current reduced functionality radio frequency (regulatory) setting (e.g., on power up, etc.), from which it can be understood that exemplary device 1802 is attempting to acquire an exemplary country code identifier or regulatory domain. Exemplary control agent 1808, with a network connection to cloud service 1810, can be configured to supply an internet address (e.g., IP address) associated with exemplary device 1802 to exemplary cloud service 1810, to facilitate employing exemplary internet protocol geo-location or IP lookup service 1828, in a non-limiting aspect. In addition, exemplary control agent 1808 can be configured to direct or perform a passive over-the-air WiFi network scan, for example, as described above, the information associated therewith can be provided to exemplary cloud service 1810, to facilitate employing an exemplary WiFi positioning or location service 1826.

Exemplary device 1816 can also be configured to provide cellular or GPS location information, for example, based on inferences about exemplary device 1802 location via a close-proximity communications channel during exemplary device 1802 on-boarding process (non-mobile devices) or through normal operational interaction, for example, as further described above. For instance, a trusted location of exemplary device 1816 can be attributed to exemplary device 1802 and a location record can be transmitted to cloud service 1810, or portions thereof, such as device assisted positioning component 1820, regulatory domain selection component 1812, etc. on behalf of exemplary device 1802. In a further non-limiting aspect, an exemplary location record can comprise a country identifier (e.g., provided by cellular infrastructure) or global positioning record (longitude/latitude) provided by an exemplary GPS subsystem associated with exemplary device 1816. Accordingly, exemplary location record can be stored in an exemplary device assisted positioning component 1820. In a non-limiting aspect, exemplary location record stored in or on behalf of exemplary device assisted positioning component 1820 can provide or be associated with a time stamped record with one or more of coarse and fine positioning information that can be employed by exemplary regulatory domain selection component 1812.

Exemplary regulatory domain selection component 1812 can be configured to compute a country location, can send a country code identifier, can send a regulatory domain (based on a lookup), etc. to exemplary control agent 1808. In addition, exemplary control agent 1808 can be configured to store the domain information in a non-volatile storage device or component (e.g., stored in an EEPROM, etc.). Exemplary control agent 1808 can be further configured to instruct, direct, and/or configure exemplary radio 1804 to use exemplary radio parameters stored in exemplary regulatory database 1806, which can be indexed by country code, by regulatory domain identifier, etc. provided by exemplary cloud service 1810. In a non-limiting aspect, exemplary control agent 1808 can continue to use the value stored in non-volatile memory, for example, until cloud service 1810, regulatory domain selection component 1812, etc. on behalf of exemplary device 1802, determines an update in the country code identifier and/or regulatory domain is necessary.

Referring again to FIG. 19, exemplary regulatory domain selection component 1812 can be configured to employ various, non-limiting, available location factors 1902 (e.g., databases, lookup services, etc.) as described above, or otherwise, and can be further configured to perform a weighted calculation to facilitate providing or acquiring an exemplary country code identifier or regulatory domain for exemplary device 1802 operating in a reduced functionality radio frequency (regulatory) mode. In another non-limiting aspect, exemplary location factors 1902 can have an associated degree of confidence (e.g., confidence rankings 1904, etc.) that can contribute to the determination of exemplary country code identifier or regulatory domain via exemplary regulatory domain selection component 1812. In a non-limiting aspect, an exemplary database of logistics and/or supply chain information 1824 can have the highest confidence and/or the highest weight, which can be employed as a reliable "anchor" to the determination of exemplary country code identifier or regulatory domain via exemplary regulatory domain selection component 1812. In another non-limiting aspect, exemplary database of logistics and/or supply chain information 1824 can stand on its own as a single factor in the determination of exemplary country code identifier or regulatory domain via exemplary regulatory domain selection component 1812, even in the absence of all the other services and/or data sources.

Thus, according to various non-limiting embodiments, exemplary information stored in exemplary cloud service 1810 can be applied "just in time" when exemplary device 1802 is first powered up or activated, for example, as depicted in FIG. 20. In another non-limiting aspect, other location factors 1902 (e.g., other than exemplary database of logistics and/or supply chain information 1824) can be employed to influence exemplary regulatory domain selection component 1812 to refine or override the regulatory domain suggested by exemplary database of logistics and/or supply chain information 1824, for example. In still other non-limiting embodiments, the various, non-limiting, available location factors 1902 can be weighted (e.g., weighted based on confidence (e.g., confidence rankings 1904, etc.), weighted based on reliability of the data, weighted based on age or other time interval or aging criteria, etc.). However, as described above, to meet existing regulatory requirements, exemplary database of logistics and/or supply chain information 1824 can provide a reliable anchor location, whereas final adjustments of region can be made "just-in-time" to provide the improved compliance and operational performance for exemplary device 1802 operating in a reduced functionality radio frequency (regulatory) mode, over an improperly regulated exemplary device 1802 (e.g., due to regulatory domain and location mismatch, etc.). Accordingly, in further non-limiting implementations, exemplary regulatory domain selection component 1812 can be configured to periodically scan the various, non-limiting, available location factors 1902 (e.g., databases, lookup services, etc.), for example, to check for changes and determine whether a revision to exemplary device 1802 country code identifier or regulatory domain is necessary. In a non-limiting example, various embodiments can be configured to notify an associated user that a domain change is recommended, which notification can be acknowledged or ignored, can be configured to perform a domain change automatically (e.g., if new local regulations require it), and so on.

In another non-limiting aspect, various embodiments as described herein (e.g., cloud service 1810, regulatory domain selection component 1812, etc. on behalf of exemplary device 1802) can be further configured to determine and/or transmit an overall confidence (e.g., reliability weight 2002) of the country code or the regulatory domain for exemplary device 1802. For instance, exemplary device 1802 can be configured to store and/or forward (e.g., via control agent 1808, etc.) an exemplary overall confidence (e.g., reliability weight 2002) of the country code or the regulatory domain for exemplary device 1802, as determined herein. Thus, exemplary device 1802 can be further configured (e.g., via control agent 1808, etc.) to communicate the country code identifier or the regulatory domain to another trusted device (e.g., device 2102), a subcomponent of exemplary device 1802 (not shown), and so on, via a local secure messaging protocol, or otherwise, where the circumstances warrant (e.g., where close proximity between exemplary device 1802 and the other trusted device 2102 can be inferred, etc.) to facilitate operating the trusted device (e.g., device 2102) in a regulatory mode consistent with the country code identifier or the regulatory domain and the location of the trusted device (e.g., device 2102). For instance, exemplary device 1802, for which the location, country code identifier or regulatory domain has been determined as described herein, with associated overall confidence (e.g., reliability weight 2002), can be employed to determine the location of the trusted device (e.g., device 2102), for example as depicted in FIG. 21.

Figure 21:
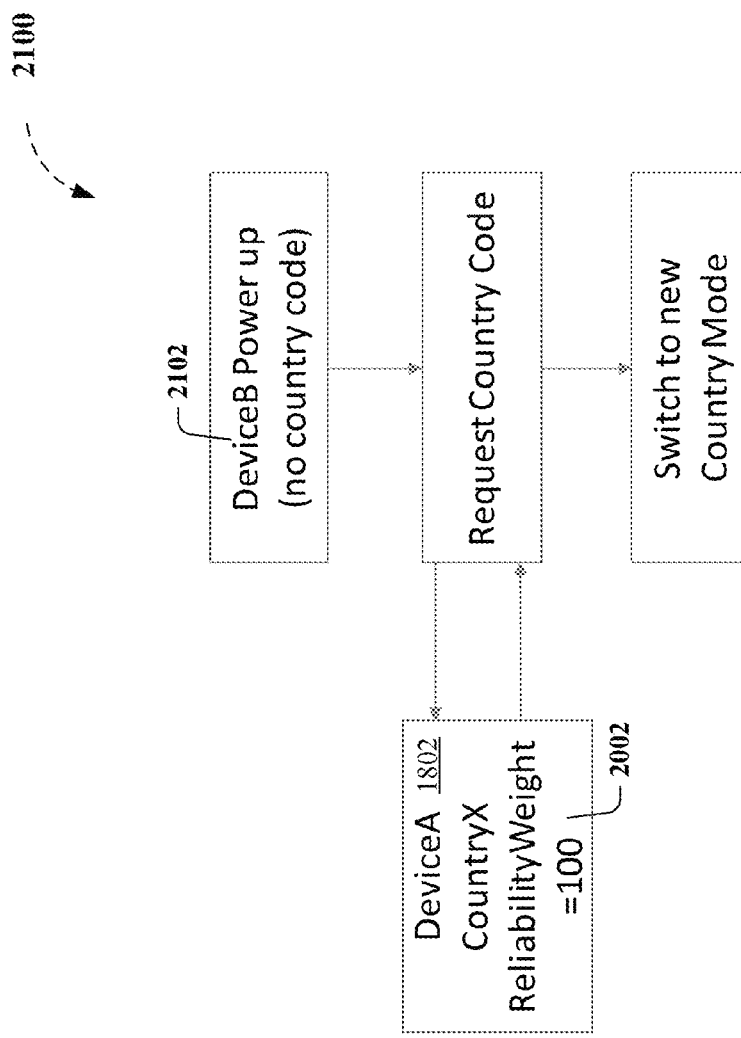
FIG. 21 depicts an exemplary functional block diagram depicting exemplary systems and methods directed to providing or acquiring an exemplary country code identifier or regulatory domain for a non-limiting device operating in a reduced functionality radio frequency (regulatory) mode based on exemplary location factors and exemplary confidence rankings, via an exemplary device location and overall confidence as determined herein, according to a further non-limiting aspect.

Thus, FIG. 21 depicts an exemplary functional block diagram 2100 depicting exemplary systems and methods directed to providing or acquiring an exemplary country code identifier or regulatory domain for a non-limiting device 2101 operating in a reduced functionality radio frequency (regulatory) mode based on exemplary location factors 1902 and exemplary confidence rankings 1904, via an exemplary device 1802 location and overall confidence 2002 as determined herein, according to a further non-limiting aspect.

Figure 22:
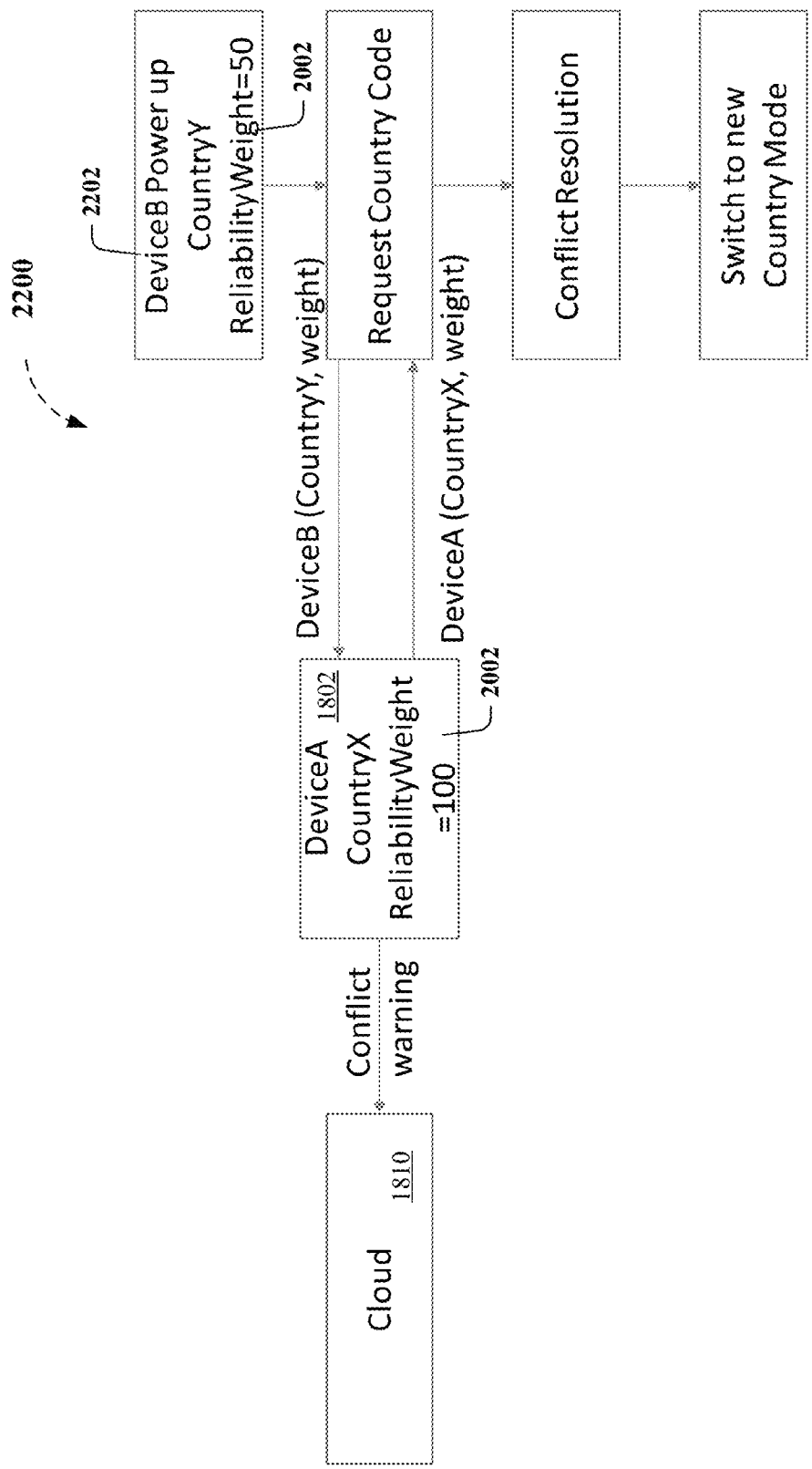
FIG. 22 depicts an exemplary functional block diagram depicting exemplary systems and methods directed to providing or acquiring an exemplary country code identifier or regulatory domain for a non-limiting device operating in a reduced functionality radio frequency (regulatory) mode based on exemplary location factors and exemplary confidence rankings, according to further non-limiting aspects, wherein the non-limiting device acquires a new country code based on an exemplary discrepancy associated with the non-limiting device environment.

FIG. 22 depicts an exemplary functional block diagram 2200 depicting exemplary systems and methods directed to providing or acquiring an exemplary country code identifier or regulatory domain for a non-limiting device operating in a reduced functionality radio frequency (regulatory) mode based on exemplary location factors 1902 and exemplary confidence rankings 1904, via an exemplary device 1802 location and overall confidence 2002 as determined herein, according to further non-limiting aspects, wherein the non-limiting device 2202 acquires a new country code based on an exemplary discrepancy associated with the non-limiting device environment. For instance, exemplary device 1802, for which the location, country code identifier or regulatory domain has been determined as described herein, with associated overall confidence (e.g., reliability weight 2002), can be employed to determine the location of the trusted device (e.g., device 2202), for which the associated overall confidence (e.g., reliability weight 2002) is less than the overall confidence (e.g., reliability weight 2002) associated with exemplary device 1802. As a non-limiting example, cloud service 1810, regulatory domain selection component 1812, etc. on behalf of exemplary device 1802 and exemplary device 2202, may determine that a conflict exists between determined country code identifier or regulatory domain between exemplary device 1802 and exemplary device 2202, for which it is expected by cloud service 1810, regulatory domain selection component 1812, etc. that exemplary device 1802 and exemplary device 2202 would be identical (e.g., as opposed to CountryX for exemplary device 1802 and CountryY for exemplary device 2202). Cloud service 1810, regulatory domain selection component 1812, etc. can be configured to take corrective action, such as, for example, requesting updates to one or more of location factor 1902 associated with one or more of exemplary device 1802 and exemplary device 2202, etc. In a non-limiting example, cloud service 1810, regulatory domain selection component 1812 can determine that there is no need to update the country code identifier or regulatory domain associated with exemplary device 1802, and as such, rely on exemplary device 1802 as a proxy for determining the location of exemplary device 2202, for example, as described above.

Figure 23:
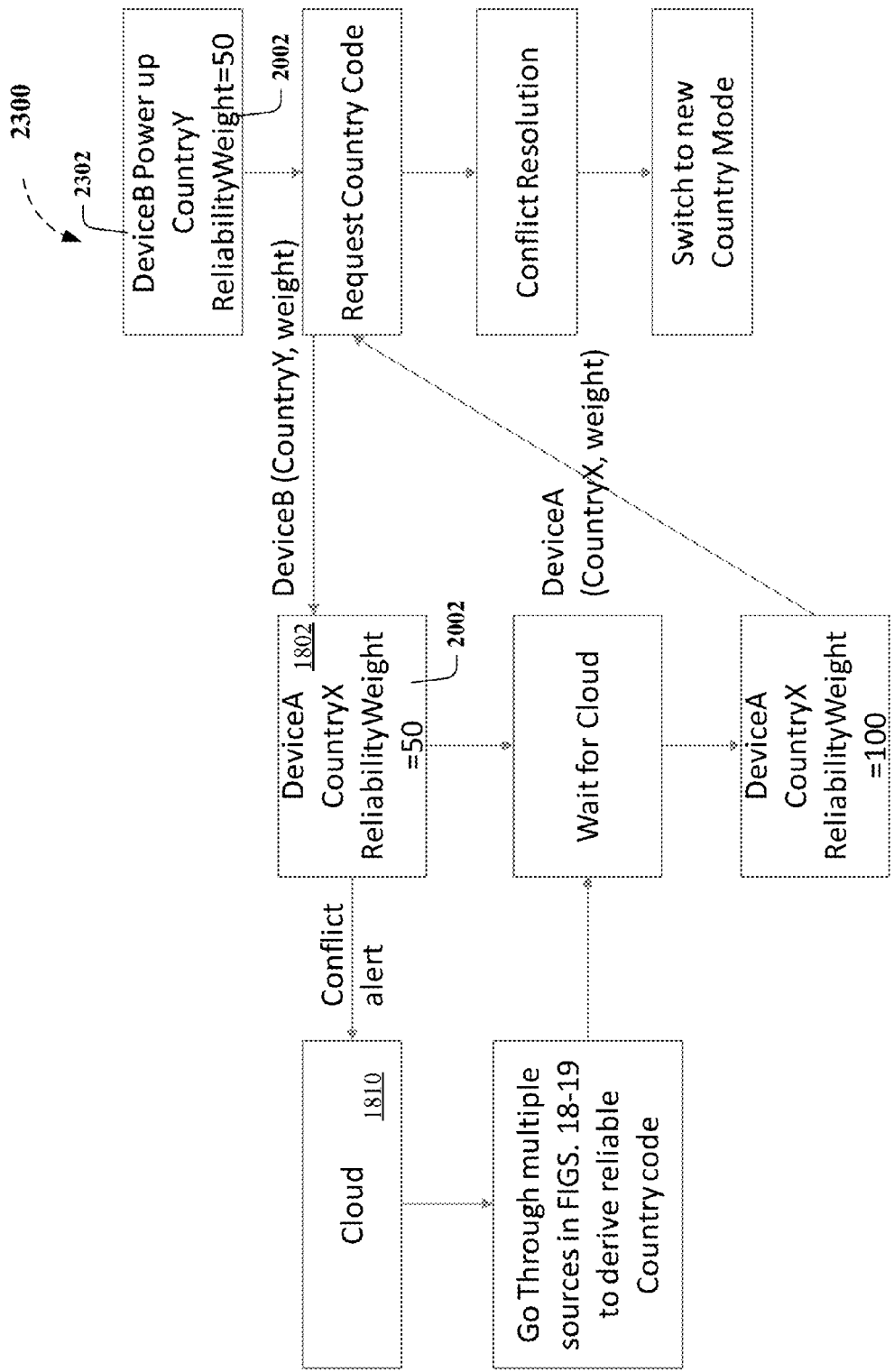
FIG. 23 depicts an exemplary functional block diagram depicting exemplary systems and methods directed to providing or acquiring an exemplary country code identifier or regulatory domain for a non-limiting device operating in a reduced functionality radio frequency (regulatory) mode based on exemplary location factors and exemplary confidence rankings, according to further non-limiting aspects, wherein the non-limiting device acquires a new country code based on an exemplary change associated with the non-limiting device environment.

FIG. 23 depicts an exemplary functional block diagram 2300 depicting exemplary systems and methods directed to providing or acquiring an exemplary country code identifier or regulatory domain for a non-limiting device operating in a reduced functionality radio frequency (regulatory) mode based on exemplary location factors 1902 and exemplary confidence rankings 1904, via an exemplary device 1802 location and overall confidence 2002 as determined herein, according to further non-limiting aspects, wherein the non-limiting device 2302 acquires a new country code based on an exemplary change associated with the non-limiting device 1802 environment. For instance, exemplary device 1802, for which the location, country code identifier or regulatory domain has been determined as described herein, with associated overall confidence (e.g., reliability weight 2002), can be employed to determine the location of the trusted device (e.g., device 2302), for which the associated overall confidence (e.g., reliability weight 2002) is no better than the overall confidence (e.g., reliability weight 2002) associated with exemplary device 1802.

As a non-limiting example, cloud service 1810, regulatory domain selection component 1812, etc. on behalf of exemplary device 1802 and exemplary device 2302, may determine that a conflict exists between determined country code identifier or regulatory domain between exemplary device 1802 and exemplary device 2302, for which it is expected by cloud service 1810, regulatory domain selection component 1812, etc. that exemplary device 1802 and exemplary device 2302 would be identical (e.g., as opposed to CountryX for exemplary device 1802 and CountryY for exemplary device 2302). However, in this instance, the associated overall confidence (e.g., reliability weight 2002) for exemplary device 2302 is no better than the overall confidence (e.g., reliability weight 2002) associated with exemplary device 1802. Accordingly, recognizing such conflict, cloud service 1810, regulatory domain selection component 1812, etc. can be configured to take corrective action, such as, for example, requesting updates to one or more of location factor 1902 associated with one or more of exemplary device 1802 and exemplary device 2302, repeating the weighted location factor 1902, algorithm and overall confidence 2002 calculation, etc. to resolve the conflict.

Thus, in another non-limiting example, cloud service 1810, regulatory domain selection component 1812 can determine that there is a need to update the country code identifier or regulatory domain associated with exemplary device 1802, and after such time, rely on exemplary device 1802 as a proxy for determining the location of exemplary device 2302, for example, as described above. Accordingly, it can be seen how exemplary device 1802 location and overall confidence 2002 can be propagated throughout a network of devices, where the device having the highest overall confidence (e.g., reliability weight 2002) can serve as a location proxy to other trusted devices.

Figure 24:
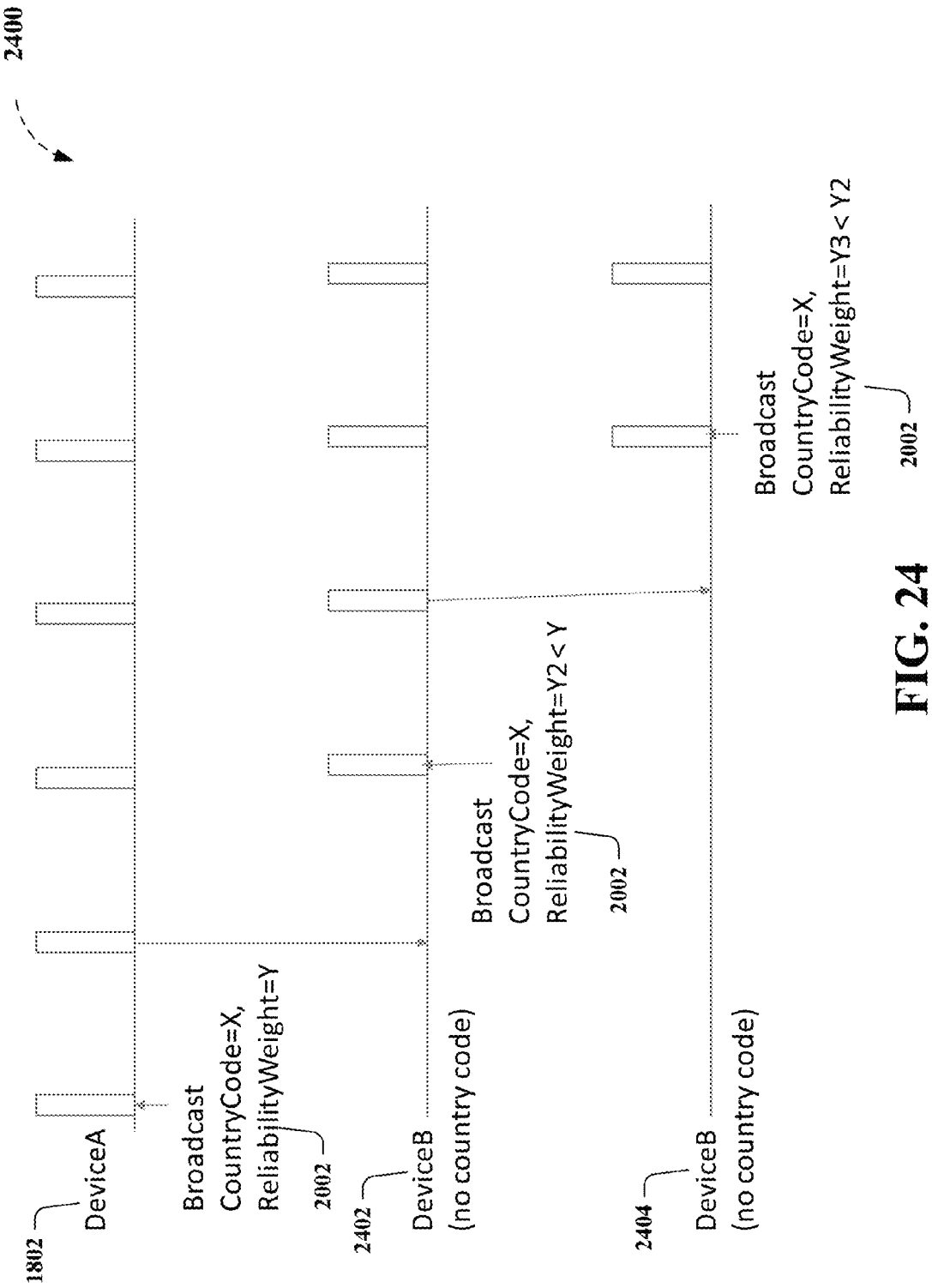
FIG. 24 depicts exemplary systems and methods directed to providing or acquiring an exemplary country code identifier or regulatory domain for a non-limiting device operating in a reduced functionality radio frequency (regulatory) mode based on exemplary location factors and exemplary confidence rankings, via an exemplary device 1802 location and overall confidence 2002 as determined herein, according to further non-limiting aspects.

For example, FIG. 24 depicts exemplary systems and methods directed to providing or acquiring an exemplary country code identifier or regulatory domain for a non-limiting device 2402, 2404 operating in a reduced functionality radio frequency (regulatory) mode based on exemplary location factors 1902 and exemplary confidence rankings 1904, via an exemplary device 1802 location and overall confidence 2002 as determined herein, according to further non-limiting aspects. As depicted in FIG. 24, exemplary device 1802 location, being associated with highest overall confidence (e.g., reliability weight 2002) can be propagated throughout a network of devices (e.g., exemplary devices 2402, 2404, etc.), and thus, exemplary device 1802 can serve as a location proxy to other trusted devices. Further note that overall confidence (e.g., reliability weight 2002) diminishes from exemplary device 1802, to exemplary device 2402, to exemplary device 2404, the further the device is from the provision or acquisition of an exemplary country code identifier or regulatory domain for a non-limiting device operating in a reduced functionality radio frequency (regulatory) mode based on the initial examination of the exemplary location factors 1902 and exemplary confidence rankings 1904.

As a non-limiting example, radar scanners as described herein are traditionally programmed and/or designed at the factory for the destination country. However, such devices need not receive such factory programming. Moreover, such devices need not get such country code identifier or regulatory domain from cloud service 1810, in part because radar scanners can be more loosely tracked than, for example, traditional routers or access points communicating, scanning, or operating in DFS channels based on the country code identifier or the regulatory domain. Instead, such radar scanners (e.g., DFS masters) can get country code identifier or regulatory domain from the router or access point (e.g., exemplary device 1802, etc. It can be understood that the two devices can be two different devices or the former can be a component of the latter.

Accordingly, in various embodiments, the disclosed subject matter provides exemplary systems (e.g., systems 1800, portions thereof, etc.) that can facilitate providing or acquiring an exemplary country code identifier or regulatory domain for exemplary device 1802. As a non-limiting example, an exemplary system as described herein can comprise a regulatory domain selection component 1812 configured to implement a regulatory domain selection algorithm using a two or more of data sources, comprising two or more of a logistics database (e.g., exemplary database of logistics and/or supply chain information 1824), shipping manifest information, a unique device identifier, an Internet protocol (IP) address lookup service, a wireless fidelity (WiFi) positioning lookup service, a WiFi network scan, a location record, or information associated with a global positioning system (GPS), according to various non-limiting aspects. In another non-limiting aspect, an exemplary regulatory domain selection component 1812 can be further configured to weigh two or more location factors 1902 associated with the two or more data sources and the device (e.g., exemplary device 1802, etc.), based on a determined reliability respectively associated with the two or more location factors 1902, and configured to determine an overall confidence (e.g., reliability weight 2002) of one or more of the country code or the regulatory domain for the device, as described herein.

In another non-limiting aspect, an exemplary system can further comprise a device (e.g., exemplary device 1802, etc.) configured to communicate securely with the regulatory domain selection component 1812 to facilitate providing or acquiring one or more of a country code identifier or a regulatory domain for the device (e.g., exemplary device 1802, etc.) based on the two or more of data sources. In yet another non-limiting aspect, an exemplary device (e.g., exemplary device 1802, etc.) can be further configured to operate in a reduced functionality mode until the one or more of the country code identifier or the regulatory domain can be determined by the regulatory domain selection component 1812, and wherein the device (e.g., exemplary device 1802, etc.) can be further configured to communicate in at least one Dynamic Frequency Selection (DFS) channel based on the country code identifier or the regulatory domain.

In addition, an exemplary system can comprise a second device (e.g., exemplary device 1816, etc.) communicatively coupled to and authorized to configure the device (e.g., exemplary device 1802, etc.), wherein the second device (e.g., exemplary device 1816, etc.) is in close proximity to the device (e.g., exemplary device 1802, etc.), and wherein the second device (e.g., exemplary device 1816, etc.) can be configured to transmit the location record to the regulatory domain selection component 1812 on behalf of the device (e.g., exemplary device 1802, etc.), based on the second device (e.g., exemplary device 1816, etc.) being in close proximity to the device (e.g., exemplary device 1802, etc.) and authorized to configure the device (e.g., exemplary device 1802, etc.), in a non-limiting aspect. In another non-limiting aspect, the location record can be based on one or more of the information associated with the GPS or location information associated with a cellular network 1822 communicatively coupled to the second device (e.g., exemplary device 1816, etc.).

In still further non-limiting implementations, the disclosed subject matter provides exemplary systems (e.g., systems 1800, cloud service 1810, portions thereof, etc.) that can facilitate providing or acquiring an exemplary country code identifier or regulatory domain for exemplary device 1802. For instance, an exemplary system as described herein can comprise a cloud service device (e.g., cloud service 1810, portions thereof, etc.) that can be configured to execute computer executable components of the cloud service device (e.g., cloud service 1810, portions thereof, etc.) and a memory to store data and the computer executable components.

In another non-limiting aspect, an exemplary system can further comprise a computer executable regulatory domain selection component 1812 configured to implement a regulatory domain selection algorithm configured to employ a two or more of data sources, wherein the regulatory domain selection component 1812 can be further configured to determine one or more of a country code identifier or a regulatory domain, based on the two or more of data sources, for a second device (e.g., exemplary device 1802) that can be configured to operate in a reduced functionality mode until the one or more of the country code identifier or the regulatory domain can be determined by the regulatory domain selection component 1812, and wherein the second device (e.g., exemplary device 1802) can be further configured to communicate in one or more Dynamic Frequency Selection (DFS) channels based on the country code identifier or the regulatory domain.

In addition, an exemplary system as described herein can comprise one or more of a logistics database (e.g., exemplary database of logistics and/or supply chain information 1824) or a database comprising one or more of the location record or the information associated with the GPS as provided by third device (e.g., exemplary device 1816), wherein the third device (e.g., exemplary device 1816) can be communicatively coupled to and authorized to configure the second device (e.g., exemplary device 1802), wherein the third device (e.g., exemplary device 1816) is in close proximity to the second device (e.g., exemplary device 1802), and wherein the third device (e.g., exemplary device 1816) is configured to transmit the one or more of the location record or the information associated with the GPS to the cloud service device (e.g., cloud service 1810, portions thereof, etc.) on behalf of the second device (e.g., exemplary device 1802), based on the third device (e.g., exemplary device 1816) being in close proximity to the second device (e.g., exemplary device 1802) and authorized to configure the second device (e.g., exemplary device 1802), in a non-limiting aspect.

Accordingly, various embodiments as described herein can comprise exemplary systems (e.g., systems 1800, cloud service 1810, portions thereof, etc.) that can facilitate providing or acquiring an exemplary country code identifier or regulatory domain for exemplary device 1802. For instance, an exemplary system as described herein can comprise one or more of the following: means for dynamically determining one or more of a country code identifier or a regulatory domain for a device (e.g., exemplary device 1802) configured to operate in a reduced functionality radio frequency mode until the one or more of the country code identifier or the regulatory domain can be determined to facilitate the device communicating in one or more Dynamic Frequency Selection (DFS) channels based on the country code identifier or the regulatory domain; means for communicating to the device (e.g., exemplary device 1802) the one or more of the country code identifier or the regulatory domain for the device (e.g., exemplary device 1802); means for updating the one or more of the country code identifier or the regulatory domain for the device (e.g., exemplary device 1802) based on a change in one or more location factors 1902 of a two or more location factors 1902 used by the means for dynamically determining and associated with the device (e.g., exemplary device 1802) as inferred by the means for dynamically determining; means for accessing the two or more location factors 1902 associated with the device (e.g., exemplary device 1802); and/or means for communicating a request to verify the one or more of the country code or the regulatory domain for the device (e.g., exemplary device 1802).

As described above, the two or more location factors 1902 can comprise two or more of a logistics database (e.g., exemplary database of logistics and/or supply chain information 1824), shipping manifest information, unique device identifier information, an Internet protocol (IP) address lookup service, a wireless fidelity (WiFi) positioning lookup service, a WiFi network scan, a location record, or information associated with a global positioning system (GPS), etc., in a non-limiting aspect. In further non-limiting aspect, exemplary means for dynamically determining the one or more of the country code identifier or the regulatory domain for the device (e.g., exemplary device 1802) can further comprise means for weighing the two or more location factors 1902 associated with the device (e.g., exemplary device 1802), based on a determined reliability respectively associated with the two or more location factors 1902, and can further comprise means for determining an overall confidence (e.g., reliability weight 2002) of the one or more of the country code or the regulatory domain for the device (e.g., exemplary device 1802) to determine the location of the device (e.g., exemplary device 1802. In addition, exemplary means for updating the one or more of the country code identifier or the regulatory domain for the device (e.g., exemplary device 1802) can further comprise means for updating the one or more of the country code identifier of the regulatory domain for the device (e.g., exemplary device 1802) based on a degradation in the determined reliability respectively associated with the two or more location factors 1902 or the overall confidence (e.g., reliability weight 2002) of the one or more of the country code or the regulatory domain for the device (e.g., exemplary device 1802).

In still other non-limiting embodiments, the disclosed subject matter provides exemplary devices (e.g., exemplary devices 1802, portions thereof, etc.) that can facilitate providing or acquiring an exemplary country code identifier or regulatory domain for exemplary device 1802. For instance, an exemplary device (e.g., exemplary device 1802) as described herein can comprise a radio 1804 that can be configurable to operate in a reduced functionality radio frequency mode until one or more of a country code identifier or a regulatory domain can be determined for the device (e.g., exemplary device 1802), wherein the radio 1804 can be further configurable to one or more of communicate, scan, or operate in one or more regulatory mode associated with one or more Dynamic Frequency Selection (DFS) channels based on the country code identifier or the regulatory domain.

In another non-limiting aspect, an exemplary device (e.g., exemplary device 1802) can further comprise a regulatory domain database (e.g., regulatory database 1806) comprising a set of radio parameters associated with the one or more of the country code identifier or the regulatory domain for the device (e.g., exemplary device 1802), wherein the set of radio parameters can define the one or more regulatory mode of operation for the device (e.g., exemplary device 1802) consistent with the one or more of the country code identifier or the regulatory domain.

In addition, an exemplary device (e.g., exemplary device 1802) can comprise a control agent (e.g., control agent 1808) that can be configured to acquire one or more of the country code identifier or the regulatory domain and further configured to select the set of radio parameters associated with the one or more of the country code identifier or the regulatory domain for the device (e.g., exemplary device 1802) to configure the radio 1804 in the one or more regulatory mode, in a non-limiting aspect. As a non-limiting example, an exemplary control agent (e.g., control agent 1808), as described herein, can be further configured to notify a regulatory domain selection component 1812 of a cloud service (e.g., cloud service 1810) of the radio 1804 operating in a reduced functionality radio frequency mode to facilitate acquiring the one or more of the country code identifier or the regulatory domain. In addition, as further described herein, an exemplary control agent (e.g., control agent 1808) can be further configured to transmit one or more of two or more location factors 1902 comprising one or more of information associated with a logistics database (e.g., exemplary database of logistics and/or supply chain information 1824), shipping manifest information, a unique device identifier, an Internet protocol (IP) address, a location record, or information regarding a two or more of devices resulting from a wireless fidelity (WiFi) network scan by the device (e.g., exemplary device 1802) to the regulatory domain selection component 1812 of the cloud service (e.g., cloud service 1810) to facilitate acquiring the one or more of the country code identifier or the regulatory domain. In another non-limiting aspect, an exemplary control agent (e.g., control agent 1808) can be further configured to receive one or more of the country code identifier or the regulatory domain via the regulatory domain selection component 1812 of the cloud service (e.g., cloud service 1810) to facilitate acquiring the one or more of the country code identifier or the regulatory domain. In still another non-limiting aspect, an exemplary control agent (e.g., control agent 1808) can be further configured to receive an overall confidence (e.g., reliability weight 2002) of the one or more of the country code or the regulatory domain for the device (e.g., exemplary device 1802), and wherein the control agent (e.g., control agent 1808) can be further configured to transmit the overall confidence (e.g., reliability weight 2002) and the one or more of the country code or the regulatory domain for the device (e.g., exemplary device 1802) to another device (e.g., exemplary device 2102, 2202, 2302, etc.) to facilitate the another device (e.g., exemplary device 2102, 2202, 2302, etc.) operating consistent with the one or more of the country code identifier or the regulatory domain.

In another non-limiting aspect, an exemplary device (e.g., exemplary device 1802) can further comprise a location onboarding component 1814 that can be configured to authorize an associated device (e.g., exemplary device 1816) to configure the device (e.g., exemplary device 1802), wherein the associated device (e.g., exemplary device 1816) is in close proximity to the device (e.g., exemplary device 1802), and wherein the associated device (e.g., exemplary device 1816) is authorized to transmit the location record to the regulatory domain selection component 1812 on behalf of the device (e.g., exemplary device 1802), based on the associated device (e.g., exemplary device 1816) being in close proximity to the device (e.g., exemplary device 1802) and authorized to configure the device (e.g., exemplary device 1802), for example, as described herein. In addition, according to further non-limiting aspects, an exemplary location record can be based on one or more of information associated with a global positioning system (GPS) or location information associated with a cellular network communicatively coupled to the associated device (e.g., exemplary device 1816).

Accordingly, various embodiments as described herein can comprise exemplary devices (e.g., exemplary device 1802, portions thereof, etc.) that can facilitate providing or acquiring an exemplary country code identifier or regulatory domain for exemplary device 1802. For instance, exemplary devices as described herein can comprise one or more of the following: means for operating the device (e.g., exemplary device 1802, portions thereof, etc.) in a reduced functionality radio frequency mode until one or more of a country code identifier or a regulatory domain can be determined for the device (e.g., exemplary device 1802, portions thereof, etc.); means for communicating one or more location factors 1902 associated with the device (e.g., exemplary device 1802, portions thereof, etc.); means for receiving one or more of the country code identifier or the regulatory domain based on a determination of location associated with the device (e.g., exemplary device 1802, portions thereof, etc.); means for operating the device (e.g., exemplary device 1802, portions thereof, etc.) in a regulatory mode consistent with the one or more of the country code identifier or the regulatory domain and the location of the device (e.g., exemplary device 1802, portions thereof, etc.), wherein the means for operating the device (e.g., exemplary device 1802, portions thereof, etc.) in the regulatory mode comprises means for communicating in one or more Dynamic Frequency Selection (DFS) channels based on the country code identifier or the regulatory domain; means for communicating an update to the one or more location factors 1902 associated with the device (e.g., exemplary device 1802, portions thereof, etc.); means for receiving and update in the one or more of the country code identifier or the regulatory domain based on a determination of a change in location associated with the device (e.g., exemplary device 1802, portions thereof, etc.); and/or means for communicating the one or more of the country code identifier or the regulatory domain to a second device (e.g., exemplary device 2102, 2202, 2302, etc.) via a local secure messaging protocol to facilitate operating the second device (e.g., exemplary device 2102, 2202, 2302, etc.) in the regulatory mode consistent with the one or more of the country code identifier or the regulatory domain and the location of the second device (e.g., exemplary device 2102, 2202, 2302, etc.), wherein the operating the second device (e.g., exemplary device 2102, 2202, 2302, etc.) in the regulatory mode comprises one or more of communicating, scanning, or operating in the one or more Dynamic Frequency Selection (DFS) channels based on the country code identifier or the regulatory domain.

In a non-limiting aspect, exemplary means for communicating the one or more location factors 1902 associated with the device (e.g., exemplary device 1802, portions thereof, etc.) can comprise means for communicating one or more of information associated with a logistics database (e.g., exemplary database of logistics and/or supply chain information 1824), shipping manifest information, a unique device identifier, an Internet protocol (IP) address, a wireless fidelity (WiFi) network scan, or a location record, as further described herein. In addition, exemplary means for operating the device (e.g., exemplary device 1802, portions thereof, etc.) in the regulatory mode consistent with the one or more of the country code identifier or the regulatory domain and the location of the device (e.g., exemplary device 1802, portions thereof, etc.) can further comprise means for selecting radio parameters from a set of radio parameters associated with the one or more of the country code identifier or the regulatory domain for the device (e.g., exemplary device 1802, portions thereof, etc.), according to further non-limiting aspects.

Figure 25:
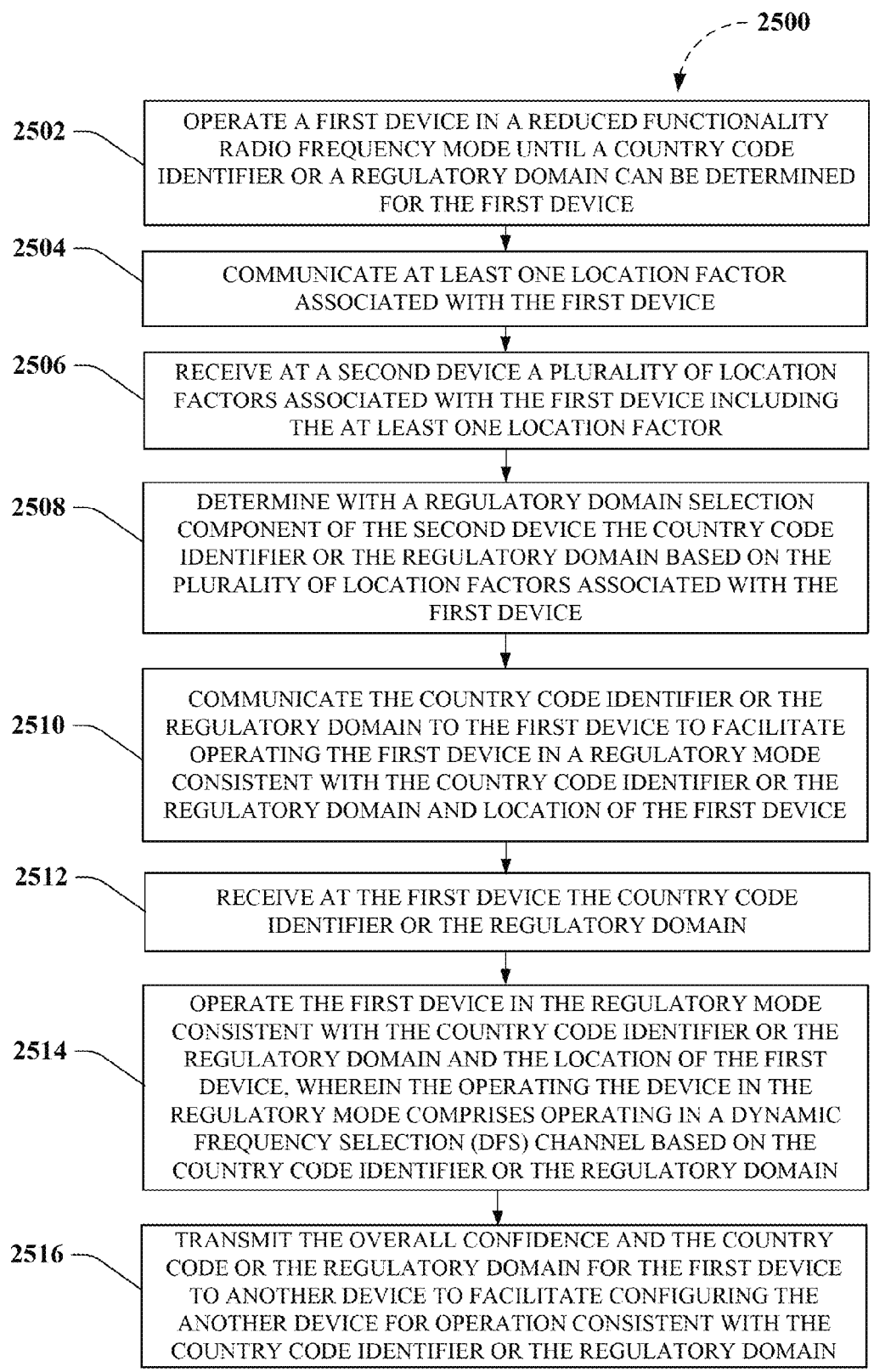
FIG. 25 depicts exemplary methods directed to providing or acquiring an exemplary country code identifier or regulatory domain for a non-limiting device operating in a reduced functionality radio frequency (regulatory) mode based on exemplary location factors and exemplary confidence rankings, according to non-limiting aspects.
Figure 26:
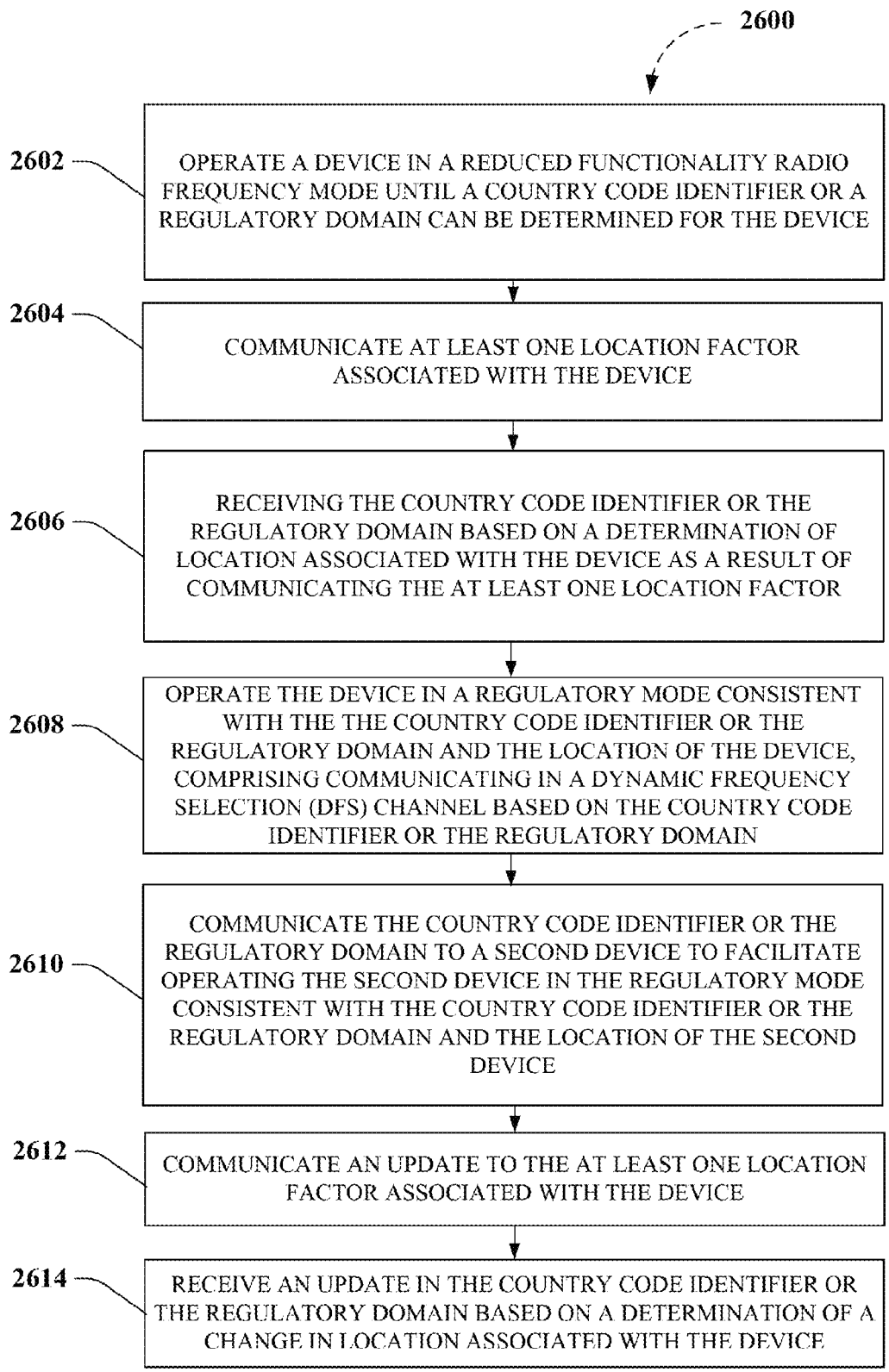
FIG. 26 depicts further exemplary methods directed to providing or acquiring an exemplary country code identifier or regulatory domain for a non-limiting device operating in a reduced functionality radio frequency (regulatory) mode based on exemplary location factors and exemplary confidence rankings, according to further non-limiting aspects.
Figure 27:
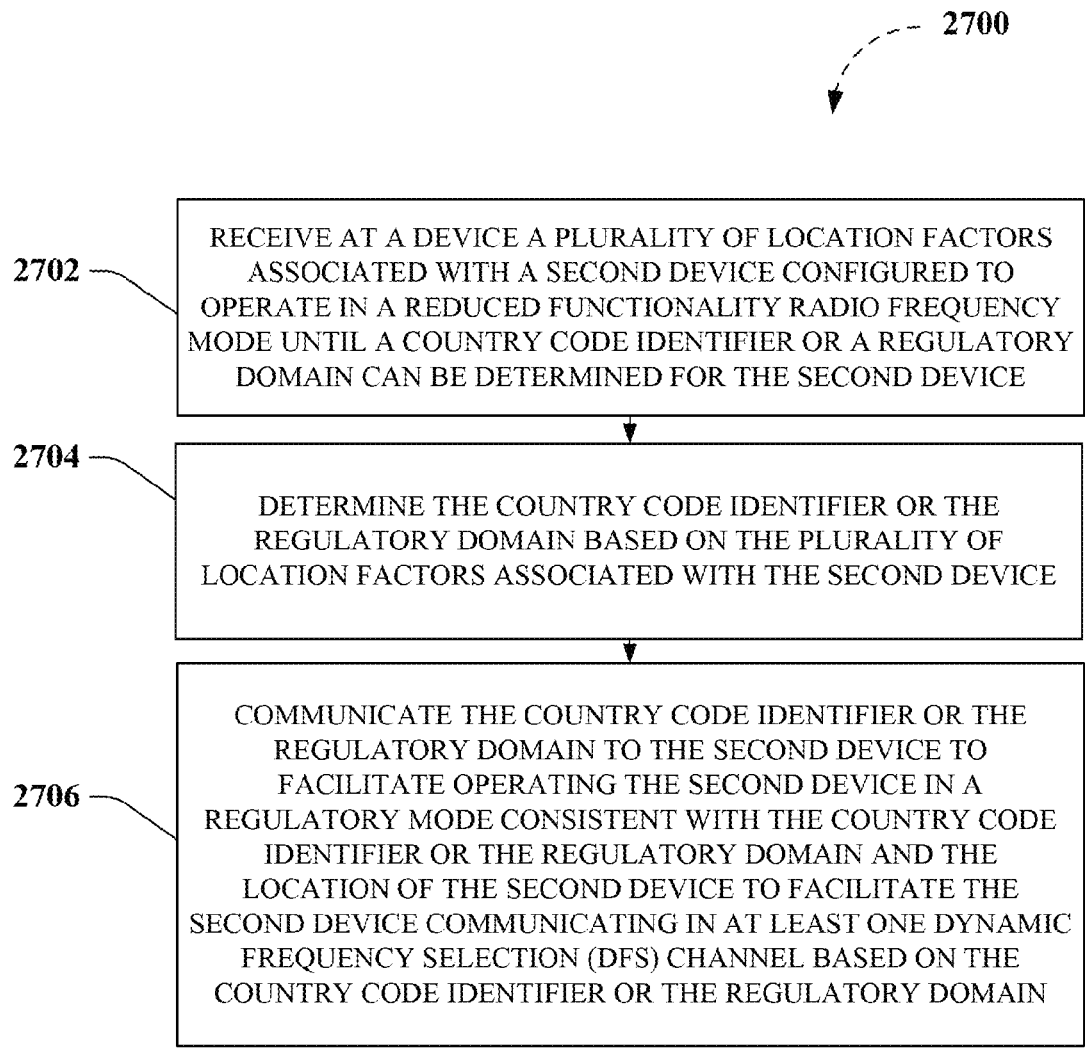
FIG. 27 depicts still further exemplary methods directed to providing or acquiring an exemplary country code identifier or regulatory domain for a non-limiting device operating in a reduced functionality radio frequency (regulatory) mode based on exemplary location factors and exemplary confidence rankings, according to other non-limiting aspects.

In view of the subject matter described herein, methods that can be implemented in accordance with the subject disclosure will be better appreciated with reference to the flowcharts of FIGS. 25-27 and with further reference to FIGS. 28-31. While for purposes of simplicity of explanation, the methods are shown and described as a series of blocks, it is to be understood and appreciated that such illustrations or corresponding descriptions are not limited by the order of the blocks, as some blocks may occur in different orders and/or concurrently with other blocks from what is depicted and described herein. Where non-sequential, or branched, flow illustrated via a flowchart, it can be understood to indicate that various other branches, flow paths, and orders of the blocks, can be implemented which achieve the same or a similar result. Moreover, not all illustrated blocks may be required to implement the methods described hereinafter. Additionally, it should be further understood that the methods and/or functionality disclosed hereinafter and throughout this specification are capable of being stored on an article of manufacture to facilitate transporting and transferring such methods to computers, for example, as further described herein. The terms computer readable medium, article of manufacture, and the like, as used herein, are intended to encompass a computer program accessible from any computer-readable device or media such as a tangible computer readable storage medium.

FIG. 25 depicts exemplary methods 2500 directed to providing or acquiring an exemplary country code identifier or regulatory domain for a non-limiting device 1802 operating in a reduced functionality radio frequency (regulatory) mode based on exemplary location factors 1902 and exemplary confidence rankings 2002, according to non-limiting aspects. For instance, at 2502, exemplary methods 2500 can comprise operating a first device (e.g., exemplary device 1802, etc.) in a reduced functionality radio frequency mode until one or more of a country code identifier or a regulatory domain can be determined for the first device (e.g., exemplary device 1802, etc.). At 2504, exemplary methods 2500 can further comprise communicating one or more location factors 1902 associated with the first device (e.g., exemplary device 1802, etc.), for example, as further described herein.

In addition, at 2506, exemplary methods 2500 can comprise receiving at a second device (e.g., cloud service 1810, or portions thereof, etc.) a two or more of location factors 1902 associated with the first device (e.g., exemplary device 1802, etc.) including the one or more location factors 1902. At 2508, exemplary methods 2500 can comprise determining with a regulatory domain selection component 1812 of the second device (e.g., cloud service 1810, or portions thereof, etc.) one or more of the country code identifier or the regulatory domain based on the two or more of location factors 1902 associated with the first device (e.g., exemplary device 1802, etc.). As a non-limiting example, exemplary methods 2500 can comprise determining with the regulatory domain selection component 1812 one or more of the country code identifier or the regulatory domain based on two or more of the location factors 1902 associated with the first device (e.g., exemplary device 1802, etc.) comprising two or more of logistics information, shipping manifest information, a unique device identifier associated with the first device (e.g., exemplary device 1802, etc.), an Internet protocol (IP) address of the first device (e.g., exemplary device 1802, etc.), a wireless fidelity (WiFi) positioning lookup database response, a location record associated with the first device (e.g., exemplary device 1802, etc.), or information associated with a global positioning system (GPS) associated with the first device (e.g., exemplary device 1802, etc.), and so on, as further described herein. In addition, exemplary methods 2500 can further comprise weighing the two or more location factors 1902 associated with two or more data sources and the first device (e.g., exemplary device 1802, etc.), based on a determined reliability respectively associated with the two or more of location factors 1902, and determining an overall confidence (e.g., reliability weight 2002) of the one or more of the country code or the regulatory domain for the first device (e.g., exemplary device 1802, etc.) to determine location of the first device (e.g., exemplary device 1802, etc.).

At 2510, exemplary methods 2500 can further comprise communicating the one or more of the country code identifier or the regulatory domain to the first device (e.g., exemplary device 1802, etc.) to facilitate operating the first device (e.g., exemplary device 1802, etc.) in a regulatory mode consistent with the one or more of the country code identifier or the regulatory domain and location of the first device (e.g., exemplary device 1802, etc.). In addition, exemplary methods 2500 can comprise receiving at the first device (e.g., exemplary device 1802, etc.) one or more of the country code identifier or the regulatory domain, at 2512.

At 2514, exemplary methods 2500 can further comprise operating the first device (e.g., exemplary device 1802, etc.) in the regulatory mode consistent with the one or more of the country code identifier or the regulatory domain and the location of the first device (e.g., exemplary device 1802, etc.), wherein the operating the device in the regulatory mode comprises one or more of communicating, scanning, or operating in one or more Dynamic Frequency Selection (DFS) channel based on the country code identifier or the regulatory domain. As a non-limiting example, exemplary methods 2500 can further comprise selecting radio parameters from a set of radio parameters associated with the one or more of the country code identifier or the regulatory domain stored in a memory of the first device (e.g., exemplary device 1802, etc.), as further described herein.

In other non-limiting implementations, exemplary methods 2500 can comprise transmitting the overall confidence (e.g., reliability weight 2002) and the one or more of the country code or the regulatory domain for the first device (e.g., exemplary device 1802, etc.) to another device (e.g., exemplary device 2102, 2202, 2302, etc.) to facilitate configuring the another device (e.g., exemplary device 2102, 2202, 2302, etc.) for operation consistent with the one or more of the country code identifier or the regulatory domain, at 2516.

FIG. 26 depicts further exemplary methods 2600 directed to providing or acquiring an exemplary country code identifier or regulatory domain for a non-limiting device 1802 operating in a reduced functionality radio frequency (regulatory) mode based on exemplary location factors 1902 and exemplary confidence rankings 2002, according to further non-limiting aspects. As a non-limiting example, at 2602, exemplary methods 2600 can comprise operating a device (e.g., exemplary device 1802, etc.) in a reduced functionality radio frequency mode until one or more of a country code identifier or a regulatory domain can be determined for the device (e.g., exemplary device 1802, etc.), as further described herein. At 2604, exemplary methods 2600 can further comprise communicating one or more location factors 1902 associated with the device (e.g., exemplary device 1802, etc.). For instance, exemplary methods 2600 can further comprise communicating the one or more location factors 1902 associated with the device (e.g., exemplary device 1802, etc.) comprising communicating one or more of information associated with a logistics database, shipping manifest information, a unique device identifier, an Internet protocol (IP) address, a wireless fidelity (WiFi) network scan, or a location record, as described above.

In addition, at 2606, exemplary methods 2600 can comprise receiving one or more of the country code identifier or the regulatory domain based on a determination of location associated with the device (e.g., exemplary device 1802, etc.) as a result of communicating the one or more location factors 1902. At 2608, exemplary methods 2600 can comprise operating the device (e.g., exemplary device 1802, etc.) in a regulatory mode consistent with the one or more of the country code identifier or the regulatory domain and the location of the device (e.g., exemplary device 1802, etc.), wherein the operating the device (e.g., exemplary device 1802, etc.) in the regulatory mode comprises communicating in one or more Dynamic Frequency Selection (DFS) channels based on the country code identifier or the regulatory domain. In a non-limiting aspect, exemplary methods 2600 can further comprise operating the device (e.g., exemplary device 1802, etc.) in the regulatory mode consistent with the one or more of the country code identifier or the regulatory domain and the location of the device (e.g., exemplary device 1802, etc.) comprising selecting radio parameters from a set of radio parameters associated with the one or more of the country code identifier or the regulatory domain for the device (e.g., exemplary device 1802, etc.), as described herein.

At 2610, exemplary methods 2600 can further comprise communicating the one or more of the country code identifier or the regulatory domain to a second device (e.g., exemplary device 2102, 2202, 2302, etc.) via a local secure messaging protocol to facilitate operating the second device (e.g., exemplary device 2102, 2202, 2302, etc.) in the regulatory mode consistent with the one or more of the country code identifier or the regulatory domain and the location of the second device (e.g., exemplary device 2102, 2202, 2302, etc.), wherein the operating the second device (e.g., exemplary device 2102, 2202, 2302, etc.) in the regulatory mode comprises one or more of communicating, scanning, or operating in one or more Dynamic Frequency Selection (DFS) channel based on the country code identifier or the regulatory domain.

In addition, exemplary methods 2600 can comprise communicating an update to the one or more location factors 1902 associated with the device (e.g., exemplary device 1802, etc.), at 2612. At 2614, exemplary methods 2600 can further comprise receiving an update in the one or more of the country code identifier or the regulatory domain based on a determination of a change in location associated with the device (e.g., exemplary device 1802, etc.) as a result of communicating the update to the one or more location factors 1902.

FIG. 27 depicts still further exemplary methods directed to providing or acquiring an exemplary country code identifier or regulatory domain for a non-limiting device 1802 operating in a reduced functionality radio frequency (regulatory) mode based on exemplary location factors 1902 and exemplary confidence rankings 2002, according to other non-limiting aspects. In a non-limiting aspect, at 2702, exemplary methods 2700 can comprise receiving at a device (e.g., cloud service 1810, or portions thereof, etc.) two or more location factors 1902 associated with a second device (e.g., exemplary device 1802, etc.) configured to operate in a reduced functionality radio frequency mode until one or more of a country code identifier or a regulatory domain can be determined for the second device (e.g., exemplary device 1802, etc.). For instance, exemplary methods 2700 can comprise receiving the two or more location factors 1902 comprising receiving information regarding two or more devices resulting from a wireless fidelity (WiFi) WiFi network scan by the second device (e.g., exemplary device 1802, etc.). IN addition, exemplary methods 2700 can further comprise receiving one or more of logistics information, shipping manifest information, a unique device identifier, an Internet protocol (IP) address, a wireless fidelity (WiFi) positioning lookup database response, location record, or information associated with a global positioning system (GPS) associated with the second device (e.g., exemplary device 1802, etc.), as further described herein.

At 2704, exemplary methods 2700 can further comprise determining one or more of the country code identifier or the regulatory domain based on the two or more of location factors 1902 associated with the second device (e.g., exemplary device 1802, etc.). As a non-limiting example, exemplary methods 2700 can comprise weighing the two or more location factors 1902 associated with two or more data sources and the second device (e.g., exemplary device 1802, etc.), based on a determined reliability respectively associated with the two or more location factors 1902, and determining an overall confidence of the one or more of the country code or the regulatory domain for the second device (e.g., exemplary device 1802, etc.) to determine the location of the second device (e.g., exemplary device 1802, etc.).

In addition, at 2706, exemplary methods 2700 can comprise communicating the one or more of the country code identifier or the regulatory domain to the second device (e.g., exemplary device 1802, etc.) to facilitate operating the second device (e.g., exemplary device 1802, etc.) in a regulatory mode consistent with the one or more of the country code identifier or the regulatory domain and the location of the second device (e.g., exemplary device 1802, etc.) to facilitate the second device (e.g., exemplary device 1802, etc.) communicating in at least one Dynamic Frequency Selection (DFS) channel based on the country code identifier or the regulatory domain. As a non-limiting example, exemplary methods 2700 can comprise communicating the one or more of the country code identifier or the regulatory domain to the second device (e.g., exemplary device 1802, etc.) further comprising communicating the overall confidence of the one or more of the country code or the regulatory domain for the second device (e.g., exemplary device 1802, etc.), communicating an update to the one or more of the country code or the regulatory domain for the second device (e.g., exemplary device 1802, etc.) based on a change in one or more of the two or more location factors 1902 associated with the second device (e.g., exemplary device 1802, etc.) or one or more of the determined reliability respectively associated with the two or more location factors 1902, and/or communicating a request to verify the one or more of the country code or the regulatory domain for the second device (e.g., exemplary device 1802, etc.) based on the change in one or more of the two or more location factors 1902 associated with the second device (e.g., exemplary device 1802, etc.) or the one or more of the determined reliability respectively associated with the two or more location factors 1902.

Figure 28:
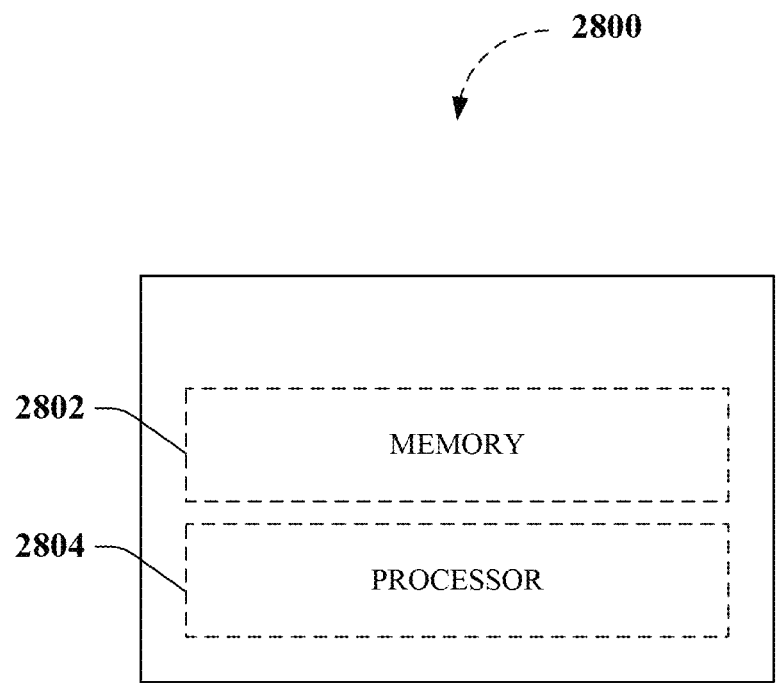
FIG. 28 depicts an example non-limiting device or system suitable for performing various aspects of the disclosed subject matter.

FIG. 28 depicts an example non-limiting device or system 2800, or portions thereof, suitable for performing various aspects of the disclosed subject matter. The device or system 2800, or portions thereof, can be a stand-alone device or a portion thereof, a specially programmed computing device or a portion thereof (e.g., a memory retaining instructions for performing the techniques as described herein coupled to a processor), and/or a composite device or system comprising one or more cooperating components distributed among several devices, as further described herein. As an example, example non-limiting device or system 2800, or portions thereof, can comprise example devices and/or systems regarding FIGS. 18, 20-24, etc., as described above, or portions thereof, for example, exemplary device 200, cloud service 300, and so on.

Accordingly, device or system 2800 can comprise a memory 2802 that retains various instructions with respect to facilitating various operations, for example, as described herein, directed to exemplary methods described above regarding FIGS. 25-27, or as otherwise described above regarding means for performing particular functions directed to devices and systems herein, including but not limited to exemplary cloud service 1810, or portions thereof, exemplary device 1802, or portions thereof, and so on. Additionally, memory 2802 can retain further and/or alternative instructions for performing various functions and/or operations described herein including instructions associated with performing exemplary methods described herein, for example, as further described herein, regarding FIGS. 18, 20-24, etc., or portions thereof. Thus, the above example instructions and other suitable instructions for functionalities and/or operations as described herein can be retained within memory 2802, and a processor 2804 can be utilized in connection with executing the instructions, without limitation.

Example Networked and Distributed Environments

One of ordinary skill in the art can appreciate that the various embodiments of the disclosed subject matter and related systems, devices, and/or methods described herein can be implemented in connection with any computer or other client or server device, which can be deployed as part of a communications system, a computer network, and/or in a distributed computing environment, and can be connected to any kind of data store. In this regard, the various embodiments described herein can be implemented in any computer system or environment having any number of memory or storage units, and any number of applications and processes occurring across any number of storage units or volumes, which may be used in connection with communication systems using the techniques, systems, and methods in accordance with the disclosed subject matter. The disclosed subject matter can apply to an environment with server computers and client computers deployed in a network environment or a distributed computing environment, having remote or local storage. The disclosed subject matter can also be applied to standalone computing devices, having programming language functionality, interpretation and execution capabilities for generating, receiving, storing, and/or transmitting information in connection with remote or local services and processes.

Distributed computing provides sharing of computer resources and services by communicative exchange among computing devices and systems. These resources and services can include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices can have applications, objects or resources that may utilize disclosed and related systems, devices, and/or methods as described for various embodiments of the subject disclosure.

Figure 29:
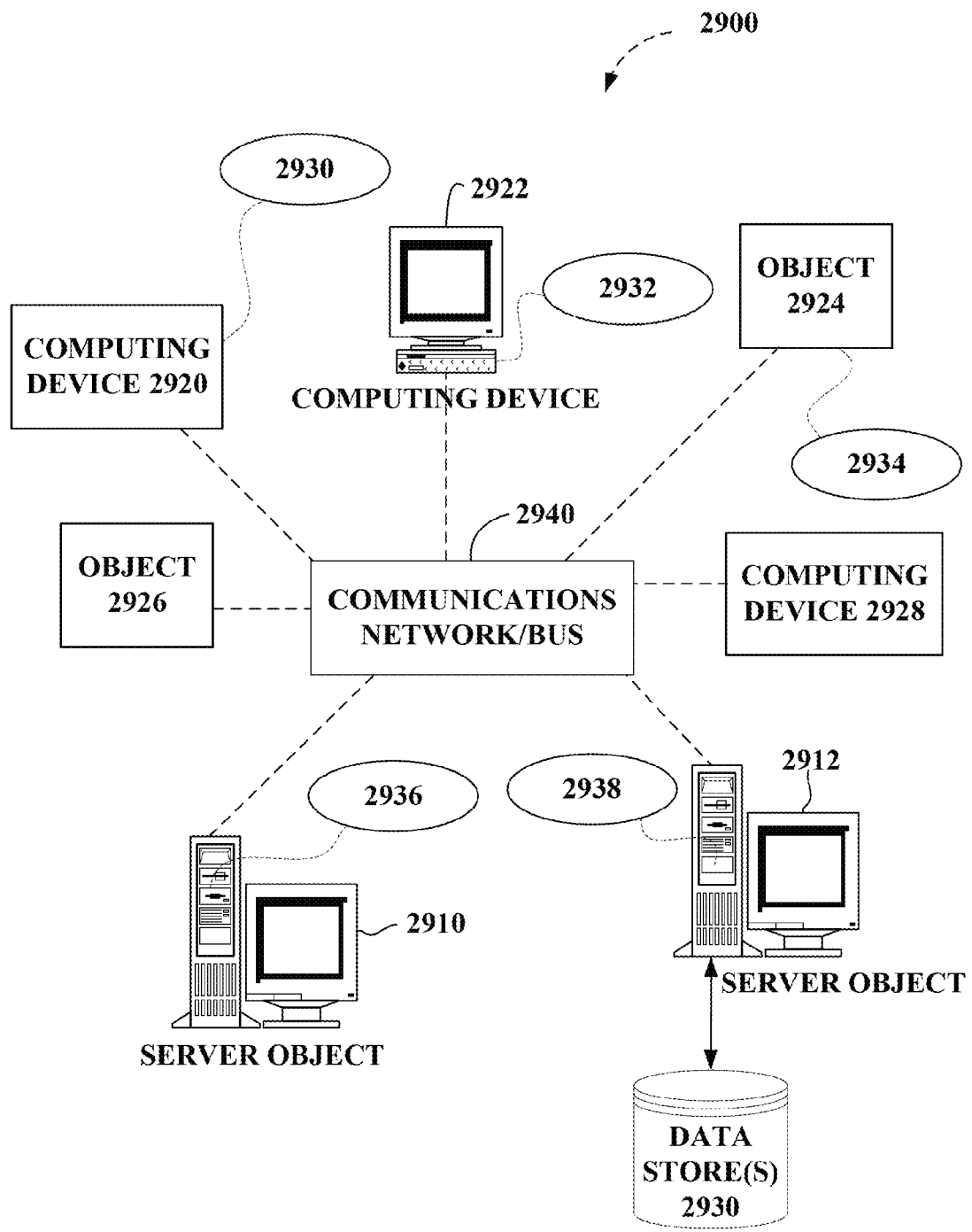
FIG. 29 is a block diagram representing example non-limiting networked environments in which various embodiments described herein can be implemented.

FIG. 29 provides a schematic diagram of an example networked or distributed computing environment. The distributed computing environment comprises computing objects 2910, 2912, etc. and computing objects or devices 2920, 2922, 2924, 2926, 2928, etc., which may include programs, methods, data stores, programmable logic, etc., as represented by applications 2930, 2932, 2934, 2936, 2938. It can be understood that objects 2910, 2912, etc. and computing objects or devices 2920, 2922, 2924, 2926, 2928, etc. may comprise different devices, such as PDAs, audio/video devices, mobile phones, MP3 players, personal computers, laptops, etc.

Each object 2910, 2912, etc. and computing objects or devices 2920, 2922, 2924, 2926, 2928, etc. can communicate with one or more other objects 2910, 2912, etc. and computing objects or devices 2920, 2922, 2924, 2926, 2928, etc. by way of the communications network 2940, either directly or indirectly. Even though illustrated as a single element in FIG. 29, network 2940 may comprise other computing objects and computing devices that provide services to the system of FIG. 29, and/or may represent multiple interconnected networks, which are not shown. Each object 2910, 2912, etc. or 2920, 2922, 2924, 2926, 2928, etc. can also contain an application, such as applications 2930, 2932, 2934, 2936, 2938, that can make use of an API, or other object, software, firmware and/or hardware, suitable for communication with or implementation of disclosed and related systems, devices, methods, and/or functionality provided in accordance with various embodiments of the subject disclosure. Thus, although the physical environment depicted may show the connected devices as computers, such illustration is merely example and the physical environment may alternatively be depicted or described comprising various digital devices, any of which can employ a variety of wired and/or wireless services, software objects such as interfaces, COM objects, and the like.

There are a variety of systems, components, and network configurations that support distributed computing environments. For example, computing systems can be connected together by wired or wireless systems, by local networks or widely distributed networks. Currently, many networks are coupled to the Internet, which can provide an infrastructure for widely distributed computing and can encompass many different networks, though any network infrastructure can be used for example communications made incident to employing disclosed and related systems, devices, and/or methods as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 29, as a non-limiting example, computers 2920, 2922, 2924, 2926, 2928, etc. can be thought of as clients and computers 2910, 2912, etc. can be thought of as servers where servers 2910, 2912, etc. provide data services, such as receiving data from client computers 2920, 2922, 2924, 2926, 2928, etc., storing of data, processing of data, transmitting data to client computers 2920, 2922, 2924, 2926, 2928, etc., although any computer can be considered a client, a server, or both, depending on the circumstances. Any of these computing devices may be processing data, forming metadata, synchronizing data or requesting services or tasks that may implicate disclosed and related systems, devices, and/or methods as described herein for one or more embodiments.

A server is typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to disclosed and related systems, devices, and/or methods can be provided standalone, or distributed across multiple computing devices or objects.

In a network environment in which the communications network/bus 2940 is the Internet, for example, the servers 2910, 2912, etc. can be Web servers with which the clients 2920, 2922, 2924, 2926, 2928, etc. communicate via any of a number of known protocols, such as the hypertext transfer protocol (HTTP). Servers 2910, 2912, etc. may also serve as clients 2920, 2922, 2924, 2926, 2928, etc., as may be characteristic of a distributed computing environment.

Example Computing Device

Figure 30:
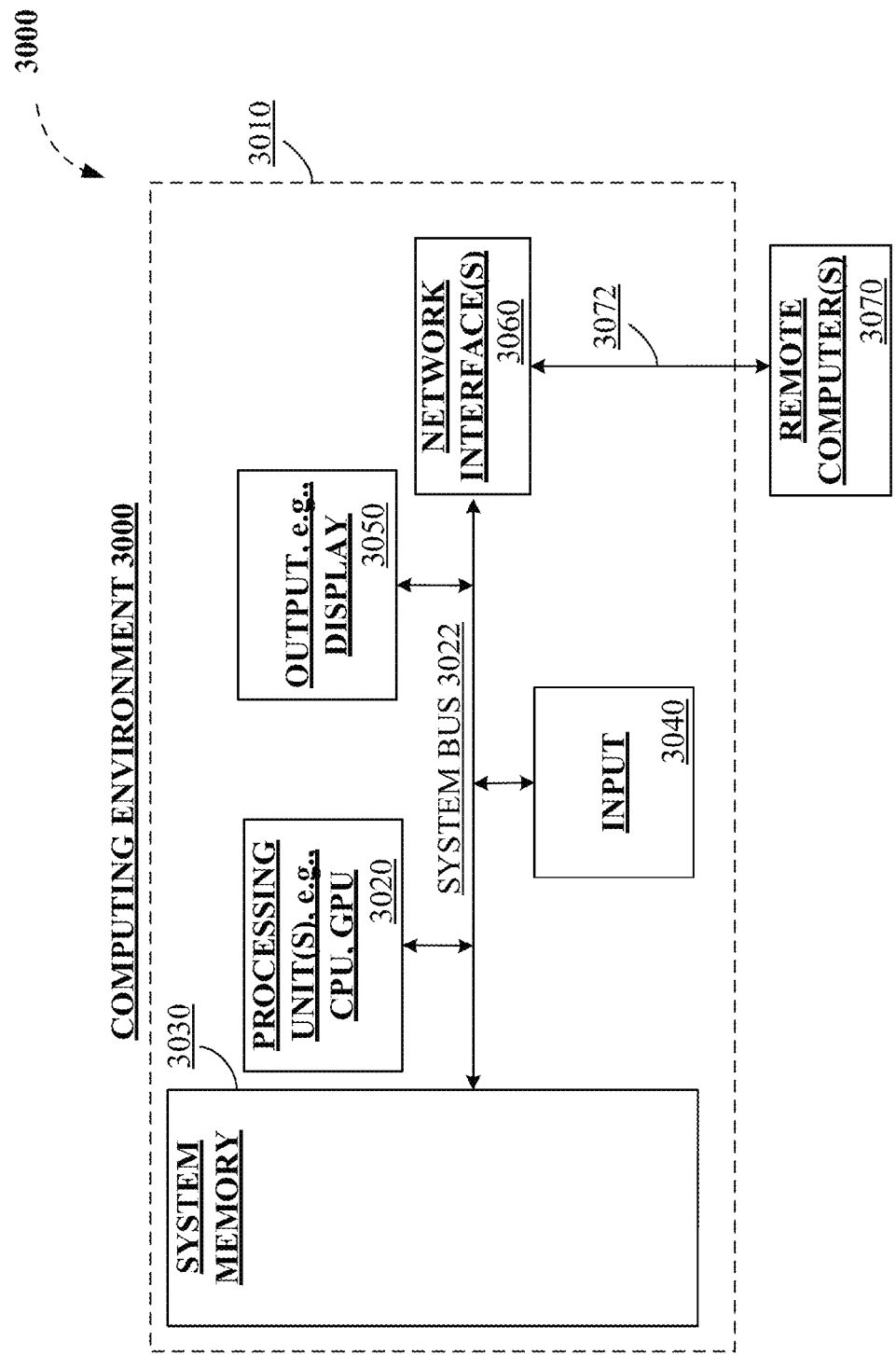
FIG. 30 is a block diagram representing an example non-limiting computing system or operating environment in which one or more aspects of various embodiments described herein can be implemented.

As mentioned, advantageously, the techniques described herein can be applied to devices or systems where it is desirable to employ disclosed and related systems, devices, and/or methods. It should be understood, therefore, that handheld, portable and other computing devices and computing objects of all kinds are contemplated for use in connection with the various disclosed embodiments. Accordingly, the below general purpose remote computer described below in FIG. 30 is but one example of a computing device. Additionally, disclosed and related systems, devices, and/or methods can include one or more aspects of the below general purpose computer, such as display, storage, analysis, control, etc.

Although not required, embodiments can partly be implemented via an operating system, for use by a developer of services for a device or object, and/or included within application software that operates to perform one or more functional aspects of the various embodiments described herein. Software can be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

FIG. 30 thus illustrates an example of a suitable computing system environment 3000 in which one or aspects of the embodiments described herein can be implemented, although as made clear above, the computing system environment 3000 is only one example of a suitable computing environment and is not intended to suggest any limitation as to scope of use or functionality. Neither should the computing environment 3000 be interpreted as having any dependency or requirement relating to any one or combination of components illustrated in the example operating environment 3000.

With reference to FIG. 30, an example remote device for implementing one or more embodiments includes a general purpose computing device in the form of a computer 3010. Components of computer 3010 can include, but are not limited to, a processing unit 3020, a system memory 3030, and a system bus 3022 that couples various system components including the system memory to the processing unit 3020.

Computer 3010 typically includes a variety of computer readable media and can be any available media that can be accessed by computer 3010. The system memory 3030 can include computer storage media in the form of volatile and/or nonvolatile memory such as read only memory (ROM) and/or random access memory (RAM). By way of example, and not limitation, memory 3030 can also include an operating system, application programs, other program modules, and program data.

A user can enter commands and information into the computer 3010 through input devices 3040. A monitor or other type of display device is also connected to the system bus 3022 via an interface, such as output interface 3050. In addition to a monitor, computers can also include other peripheral output devices such as speakers and a printer, which can be connected through output interface 3050.

The computer 3010 can operate in a networked or distributed environment using logical connections to one or more other remote computers, such as remote computer 3070. The remote computer 3070 can be a personal computer, a server, a router, a network PC, a peer device or other common network node, or any other remote media consumption or transmission device, and can include any or all of the elements described above relative to the computer 3010. The logical connections depicted in FIG. 30 include a network 3072, such local area network (LAN) or a wide area network (WAN), but can also include other networks/buses. Such networking environments are commonplace in homes, offices, enterprise-wide computer networks, intranets and the Internet.

As mentioned above, while example embodiments have been described in connection with various computing devices and network architectures, the underlying concepts can be applied to any network system and any computing device or system in which it is Also, there are multiple ways to implement the same or similar functionality, e.g., an appropriate API, tool kit, driver code, operating system, control, standalone or downloadable software object, etc. which enables applications and services to use disclosed and related systems, devices, methods, and/or functionality. Thus, embodiments herein are contemplated from the standpoint of an API (or other software object), as well as from a software or hardware object that implements one or more aspects of disclosed and related systems, devices, and/or methods as described herein. Thus, various embodiments described herein can have aspects that are wholly in hardware, partly in hardware and partly in software, as well as in software.

Example Mobile Device

Figure 31:
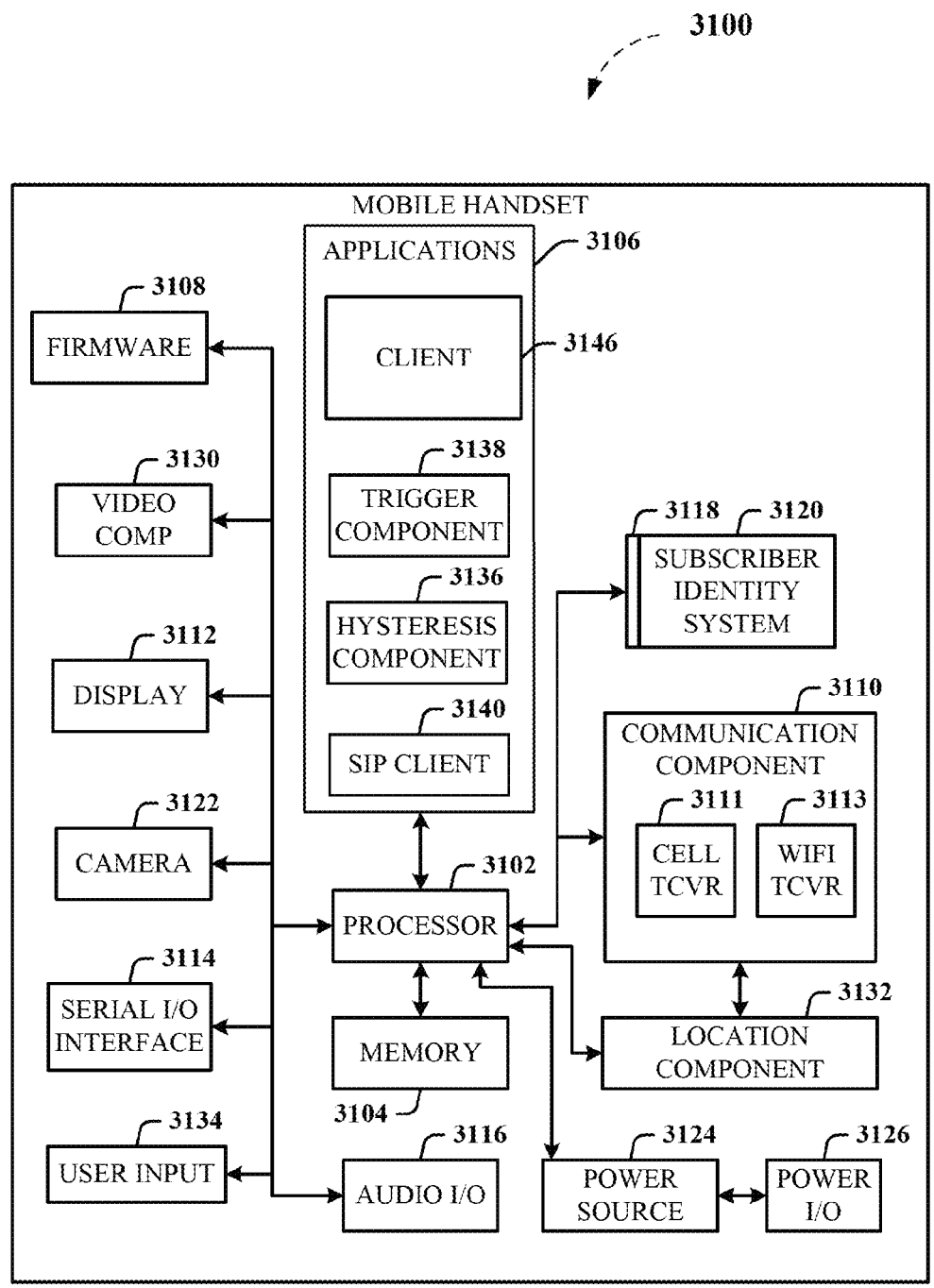
FIG. 31 illustrates a schematic diagram of an example mobile device that can facilitate various non-limiting aspects of the disclosed subject matter in accordance with the embodiments described herein.

FIG. 31 depicts a schematic diagram of an example mobile device 3100 (e.g., a mobile handset or smartphone) that can facilitate various non-limiting aspects of the disclosed subject matter in accordance with the embodiments described herein. Although mobile handset 3100 is illustrated herein, it will be understood that other devices can be a mobile device, as described herein, for instance, and that the mobile handset 3100 is merely illustrated to provide context for the embodiments of the subject matter described herein. The following discussion is intended to provide a brief, general description of an example of a suitable environment 3100 in which the various embodiments can be implemented. While the description includes a general context of computer-executable instructions embodied on a tangible computer readable storage medium, those skilled in the art will recognize that the subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer readable media. Computer readable media can comprise any available media that can be accessed by the computer and includes both volatile and non-volatile media, removable and non-removable media. By way of example and not limitation, computer readable media can comprise tangible computer readable storage and/or communication media. Tangible computer readable storage can include volatile and/or non-volatile media, removable and/or non-removable media implemented in any method or technology for storage of information, such as computer readable instructions, data structures, program modules, or other data. Tangible computer readable storage can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media, as contrasted with tangible computer readable storage, typically embodies computer readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable communications media as distinguishable from computer-readable storage media.

The handset 3100 can include a processor 3102 for controlling and processing all onboard operations and functions. A memory 3104 interfaces to the processor 3102 for storage of data and one or more applications 3106 (e.g., communications applications such as browsers, apps, etc.). Other applications can support operation of communications and/or financial communications protocols. The applications 3106 can be stored in the memory 3104 and/or in a firmware 3108, and executed by the processor 3102 from either or both the memory 3104 or/and the firmware 3108. The firmware 3108 can also store startup code for execution in initializing the handset 3100. A communications component 3110 interfaces to the processor 3102 to facilitate wired/wireless communication with external systems, e.g., cellular networks, VoIP networks, and so on. Here, the communications component 3110 can also include a suitable cellular transceiver 3111 (e.g., a GSM transceiver) and/or an unlicensed transceiver 3113 (e.g., Wireless Fidelity (WiFi™), Worldwide Interoperability for Microwave Access (WiMax®)) for corresponding signal communications. The handset 3100 can be a device such as a cellular telephone, a PDA with mobile communications capabilities, and messaging-centric devices. The communications component 3110 also facilitates communications reception from terrestrial radio networks (e.g., broadcast), digital satellite radio networks, and Internet-based radio services networks.

The handset 3100 includes a display 3112 for displaying text, images, video, telephony functions (e.g., a Caller ID function), setup functions, and for user input. For example, the display 3112 can also be referred to as a "screen" that can accommodate the presentation of multimedia content (e.g., music metadata, messages, wallpaper, graphics, etc.). The display 3112 can also display videos and can facilitate the generation, editing and sharing of video quotes. A serial I/O interface 3114 is provided in communication with the processor 3102 to facilitate wired and/or wireless serial communications (e.g., Universal Serial Bus (USB), and/or Institute of Electrical and Electronics Engineers (IEEE) 3194) through a hardwire connection, and other serial input devices (e.g., a keyboard, keypad, and mouse). This supports updating and troubleshooting the handset 3100, for example. Audio capabilities are provided with an audio I/O component 3116, which can include a speaker for the output of audio signals related to, for example, indication that the user pressed the proper key or key combination to initiate the user feedback signal. The audio I/O component 3116 also facilitates the input of audio signals through a microphone to record data and/or telephony voice data, and for inputting voice signals for telephone conversations.

The handset 3100 can include a slot interface 3118 for accommodating a SIC (Subscriber Identity Component) in the form factor of a card Subscriber Identity Module (SIM) or universal SIM 3120, and interfacing the SIM card 3120 with the processor 3102. However, it is to be appreciated that the SIM card 3120 can be manufactured into the handset 3100, and updated by downloading data and software.

The handset 3100 can process Internet Protocol (IP) data traffic through the communication component 3110 to accommodate IP traffic from an IP network such as, for example, the Internet, a corporate intranet, a home network, a person area network, etc., through an ISP or broadband cable provider. Thus, VoIP traffic can be utilized by the handset 3100 and IP-based multimedia content can be received in either an encoded or a decoded format.

A video processing component 3122 (e.g., a camera and/or associated hardware, software, etc.) can be provided for decoding encoded multimedia content. The video processing component 3122 can aid in facilitating the generation and/or sharing of video. The handset 3100 also includes a power source 3124 in the form of batteries and/or an alternating current (AC) power subsystem, which power source 3124 can interface to an external power system or charging equipment (not shown) by a power input/output (I/O) component 3126.

The handset 3100 can also include a video component 3130 for processing video content received and, for recording and transmitting video content. For example, the video component 3130 can facilitate the generation, editing and sharing of video. A location-tracking component 3132 facilitates geographically locating the handset 3100 and employing associated location information. A user input component 3134 facilitates the user inputting data and/or making selections as previously described. The user input component 3134 can also facilitate selecting perspective recipients for fund transfer, entering amounts requested to be transferred, indicating account restrictions and/or limitations, as well as composing messages and other user input tasks as required by the context. The user input component 3134 can include such conventional input device technologies such as a keypad, keyboard, mouse, stylus pen, and/or touch screen, for example.

Referring again to the applications 3106, a hysteresis component 3136 facilitates the analysis and processing of hysteresis data, which is utilized to determine when to associate with an access point. A software trigger component 3138 can be provided that facilitates triggering of the hysteresis component 3138 when a WiFi™ transceiver 3113 detects the beacon of the access point. A SIP client 3140 enables the handset 3100 to support SIP protocols and register the subscriber with the SIP registrar server. The applications 3106 can also include a communications application or client 3146 that, among other possibilities, can be target for transfer money plugin or user interface component functionality as described above.

The handset 3100, as indicated above related to the communications component 3110, includes an indoor network radio transceiver 3113 (e.g., WiFi™ transceiver). This function supports the indoor radio link, such as IEEE 802.11, for the dual-mode Global System for Mobile Communications (GSM) handset 3100. The handset 3100 can accommodate at least satellite radio services through a handset that can combine wireless voice and digital radio chipsets into a single handheld device.

In the present specification, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should generally be construed to mean "one or more" unless specified otherwise or clear from context to be directed to a singular form.

In addition, the terms "example" and "such as" are utilized herein to mean serving as an instance or illustration. Any embodiment or design described herein as an "example" or referred to in connection with a "such as" clause is not necessarily to be construed as preferred or advantageous over other embodiments or designs. Rather, use of the terms "example" or "such as" is intended to present concepts in a concrete fashion. The terms "first," "second," "third," and so forth, as used in the claims and description, unless otherwise clear by context, is for clarity only and does not necessarily indicate or imply any order in time.

What has been described above includes examples of one or more embodiments of the disclosure. It is, of course, not possible to describe every conceivable combination of components or methodologies for purposes of describing these examples, and it can be recognized that many further combinations and permutations of the present embodiments are possible. Accordingly, the embodiments disclosed and/or claimed herein are intended to embrace all such alterations, modifications and variations that fall within the spirit and scope of the detailed description and the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   a regulatory domain selection component configured to implement a regulatory domain selection algorithm using a plurality of data sources, comprising at least two of a logistics database, shipping manifest information, a unique device identifier, an Internet protocol (IP) address lookup service, a wireless fidelity (WiFi) positioning lookup service, a WiFi network scan, a location record, or information associated with a global positioning system (GPS); and
   a device, comprising a processor, configured to communicate securely with the regulatory domain selection component to facilitate providing or acquiring at least one of a country code identifier or a regulatory domain for the device based at least in part on the plurality of data sources; wherein,
   the device is further configured to operate in a reduced functionality mode until the at least one of the country code identifier or the regulatory domain can be determined by the regulatory domain selection component, and wherein the device is further configured to communicate in at least one Dynamic Frequency Selection (DFS) channel based at least in part on the country code identifier or the regulatory domain.

2. A system comprising:
   a regulatory domain selection component configured to implement a regulatory domain selection algorithm using a plurality of data sources, comprising at least two of a logistics database, shipping manifest information, a unique device identifier, an Internet protocol (IP) address lookup service, a wireless fidelity (WiFi) positioning lookup service, a WiFi network scan, a location record, or information associated with a global positioning system (GPS); and a device, comprising a processor, configured to communicate securely with the regulatory domain selection component to facilitate providing or acquiring at least one of a country code identifier or a regulatory domain for the device based at least in part on the plurality of data sources; wherein,
   the regulatory domain selection component is further configured to weigh a plurality of location factors associated with the plurality of data sources and the device, based at least in part on a determined reliability respectively associated with the plurality of location factors, and configured to determine an overall confidence of at least one of the country code or the regulatory domain for the device.

3. The system of claim 2, further comprising:
   a second device, comprising another processor, communicatively coupled to and authorized to configure the device, wherein the second device is in close proximity to the device, and wherein the second device is configured to transmit the location record to the regulatory domain selection component on behalf of the device, based at least in part on the second device being in close proximity to the device and authorized to configure the device.

4. The system of claim 3, wherein the location record is based on at least one of the information associated with the GPS or location information associated with a cellular network communicatively coupled to the second device.

5. A method comprising:
operating a first device, comprising a processor, in a reduced functionality radio frequency mode until at least one of a country code identifier or a regulatory domain can be determined for the first device;
communicating at least one location factor associated with the first device;
receiving, at a second device comprising another processor, a plurality of location factors associated with the first device including the at least one location factor;
determining with a regulatory domain selection component of the second device at least one of the country code identifier or the regulatory domain based at least in part on the plurality of location factors associated with the first device;
communicating the at least one of the country code identifier or the regulatory domain to the first device to facilitate operating the first device in a regulatory mode consistent with the at least one of the country code identifier or the regulatory domain and location of the first device;
receiving at the first device at least one of the country code identifier or the regulatory domain; and
operating the first device in the regulatory mode consistent with the at least one of the country code identifier or the regulatory domain and the location of the first device, wherein the operating the device in the regulatory mode comprises at least one of communicating, scanning, or operating in at least one Dynamic Frequency Selection (DFS) channel based at least in part on the country code identifier or the regulatory domain.

6. The method of claim 5, wherein the determining comprises determining with the regulatory domain selection component at least one of the country code identifier or the regulatory domain based at least in part on the plurality of location factors associated with the first device comprising at least a plurality of logistics information, shipping manifest information, a unique device identifier associated with the first device, an Internet protocol (IP) address of the first device, a wireless fidelity (WiFi) positioning lookup database response, a location record associated with the first device, or information associated with a global positioning system (GPS) associated with the first device.

7. The method of claim 5, wherein the determining comprises weighing the plurality of location factors associated with a plurality of data sources and the first device, based at least in part on a determined reliability respectively associated with the plurality of location factors, and determining an overall confidence of the at least one of the country code or the regulatory domain for the first device to determine location of the first device.

8. The method of claim 7, further comprising:
transmitting the overall confidence and the at least one of the country code or the regulatory domain for the first device to another device to facilitate configuring the another device for operation consistent with the at least one of the country code identifier or the regulatory domain.

9. The method of claim 5, wherein the operating the first device in the regulatory mode consistent with the at least one of the country code identifier or the regulatory domain and the location of the first device comprises selecting radio parameters from a set of radio parameters associated with the at least one of the country code identifier or the regulatory domain stored in a memory of the first device.

10. A system comprising:
a cloud service device comprising at least one processor configured to execute computer executable components of the cloud service device;
a memory to store data and the computer executable components; and
a computer executable regulatory domain selection component configured to implement a regulatory domain selection algorithm configured to employ a plurality of data sources, wherein the regulatory domain selection component is further configured to determine at least one of a country code identifier or a regulatory domain, based at least in part on the plurality of data sources, for a second device configured to operate in a reduced functionality mode until the at least one of the country code identifier or the regulatory domain can be determined by the regulatory domain selection component, and wherein the second device is further configured to communicate in at least one Dynamic Frequency Selection (DFS) channel based at least in part on the country code identifier or the regulatory domain.

11. The system of claim 10, wherein the plurality of data sources comprises at least two of a logistics database, shipping manifest information, a unique device identifier, an Internet protocol (IP) address lookup service, a wireless fidelity (WiFi) positioning lookup service, a WiFi network scan, a location record, or information associated with a global positioning system (GPS).

12. The system of claim 11, further comprising:
the logistics database.

13. The system of claim 11, further comprising:
a database comprising at least one of the location record or the information associated with the GPS as provided by third device, wherein the third device is communicatively coupled to and authorized to configure the second device, wherein the third device is in close proximity to the second device, and wherein the third device is configured to transmit the at least one of the location record or the information associated with the GPS to the cloud service device on behalf of the second device, based at least in part on the third device being in close proximity to the second device and authorized to configure the second device.

14. A device comprising:
a radio configurable to operate in a reduced functionality radio frequency mode until at least one of a country code identifier or a regulatory domain can be determined for the device, wherein the radio is further configurable to at least one of communicate, scan, or operate in at least one regulatory mode associated with at least one Dynamic Frequency Selection (DFS) channel based at least in part on the country code identifier or the regulatory domain;
a regulatory domain database comprising at least a set of radio parameters associated with the at least one of the country code identifier or the regulatory domain for the device, wherein the set of radio parameters defines the at least one regulatory mode of operation for the device consistent with the at least one of the country code identifier or the regulatory domain; and
a control agent configured to acquire at least one of the country code identifier or the regulatory domain and further configured to select the at least the set of radio parameters associated with the at least one of the country code identifier or the regulatory domain for the device to configure the radio in the at least one regulatory mode.

15. The device of claim 14, wherein the control agent is further configured to notify a regulatory domain selection component of a cloud service of the radio operating in a reduced functionality radio frequency mode to facilitate acquiring the at least one of the country code identifier or the regulatory domain.

16. The device of claim 15, wherein the control agent is further configured to transmit at least one of a plurality of location factors comprising at least one of information associated with a logistics database, shipping manifest information, a unique device identifier, an Internet protocol (IP) address, a location record, or information regarding a plurality of devices resulting from a wireless fidelity (WiFi) network scan by the device to the regulatory domain selection component of the cloud service to facilitate acquiring the at least one of the country code identifier or the regulatory domain.

17. The device of claim 16, further comprising:
a location onboarding component configured to authorize an associated device to configure the device, wherein the associated device is in close proximity to the device, and wherein the associated device is authorized to transmit the location record to the regulatory domain selection component on behalf of the device, based at least in part on the associated device being in close proximity to the device and authorized to configure the device.

18. The device of claim 17, wherein the location record is based on at least one of information associated with a global positioning system (GPS) or location information associated with a cellular network communicatively coupled to the associated device.

19. The device of claim 15, wherein the control agent is further configured to receive at least one of the country code identifier or the regulatory domain via the regulatory domain selection component of the cloud service to facilitate acquiring the at least one of the country code identifier or the regulatory domain.

20. The device claim 19, wherein the control agent is further configured to receive an overall confidence of the at least one of the country code or the regulatory domain for the device, and wherein the control agent is further configured to transmit the overall confidence and the at least one of the country code or the regulatory domain for the device to another device to facilitate the another device operating consistent with the at least one of the country code identifier or the regulatory domain.

* * * * *